United States Patent
Youn et al.

(10) Patent No.: US 12,408,226 B2
(45) Date of Patent: Sep. 2, 2025

(54) COMMUNICATION RELATED TO PS DATA OFF

(71) Applicant: LG ELECTRONICS INC., Seoul (KR)

(72) Inventors: Myungjune Youn, Seoul (KR); Sungduck Chun, Seoul (KR); Hyunsook Kim, Seoul (KR); Laeyoung Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 17/796,257

(22) PCT Filed: Feb. 15, 2021

(86) PCT No.: PCT/KR2021/001907
§ 371 (c)(1),
(2) Date: Jul. 28, 2022

(87) PCT Pub. No.: WO2021/167304
PCT Pub. Date: Aug. 26, 2021

(65) Prior Publication Data
US 2023/0084094 A1  Mar. 16, 2023

(30) Foreign Application Priority Data
Feb. 17, 2020 (KR) .................. 10-2020-0019224

(51) Int. Cl.
*H04W 76/20* (2018.01)
*H04W 48/02* (2009.01)
(Continued)

(52) U.S. Cl.
CPC ........... *H04W 76/20* (2018.02); *H04W 48/02* (2013.01); *H04W 76/16* (2018.02); *H04W 76/27* (2018.02)

(58) Field of Classification Search
None
See application file for complete search history.

(56) References Cited

U.S. PATENT DOCUMENTS

2018/0199395 A1* 7/2018 Huang-Fu ........... H04L 65/1086
2019/0313327 A1* 10/2019 Huang-Fu ........... H04M 1/2535
(Continued)

FOREIGN PATENT DOCUMENTS

| CN | 108702724 A | 10/2018 |
| KR | 10-2019-0065385 A | 6/2019 |

(Continued)

OTHER PUBLICATIONS

LG Electronics, "Clarification on handover failure between 3GPP and non-3GPP accesses", 3GPP Draft; S2-1909614, 3rd Generation Partnership Project (3GPP), Mobile Competence Centre; 650, Route Des Lucioles; F-06921 Sophia-Antipo-Lis Cedex; France, SA WG2, Split, Croatia; Oct. 14, 2019-Oct. 18, 2019, Oct. 4, 2019 (Oct. 4, 2019).

(Continued)

*Primary Examiner* — Christine T Duong
(74) *Attorney, Agent, or Firm* — BRYAN CAVE LEIGHTON PAISNER LLP

(57) ABSTRACT

One disclosure of the present specification provides a method in which a UE performs communication related to PS Data Off. The method may comprise: a step for transmitting a first PDU session establishment request message in order to establish a PDU session associated with non-3GPP access or 3GPP access; and a step for transmitting a second PDU session establishment request message in order to (Continued)

perform a handover between the non-3GPP access and the 3GPP access for the PDU.

13 Claims, 23 Drawing Sheets

(51) Int. Cl.
*H04W 76/16* (2018.01)
*H04W 76/27* (2018.01)

(56) References Cited

U.S. PATENT DOCUMENTS

2019/0394833 A1    12/2019  Talebi Fard et al.
2020/0383033 A1*   12/2020  Foti ..................... H04W 76/16

FOREIGN PATENT DOCUMENTS

| WO | 2018/009025 A1 | 1/2018 |
| WO | 2018155934 A1 | 8/2018 |
| WO | 2019159132 A | 8/2019 |
| WO | 2020/165864 A1 | 8/2020 |

OTHER PUBLICATIONS

Ericsson, "Applicability of Data Off to Non-3GPP PDU Session and Multi Access PDU Session", 3GPP Draft; S2-2000287, 3rd Generation Partnership Project (3GPP), Mobile Competence Centre; 650, Route Des Lucioles; F-06921 Sophia-Antipo-Lis Cedex; France, SA WG2, Incheon, South Korea; Jan. 13, 2020-Jan. 17, 2020, Jan. 7, 2020 (Jan. 7, 2020).

Qualcomm Incorporated et al, "PS Data Off status update when congestion control is applied in AMF", 3GPP Draft; S2-1901259, 3rd Generation Partnership Project (3GPP), Mobile Competence Centre; 650, Route Des Lucioles; F-06921 Sophia-Antipolis Cedex; France, SA WG2, Kochi, India; Jan. 21, 2019-Jan. 25, 2019, Jan. 24, 2019 (Jan. 24, 2019).

LG Electronics et al, "PS Data Off status report for non-3GPP access", 3GPP Draft; CP-201102, 3rd Generation Partnership Project (3GPP), Mobile Competence Centre; 650, Route Des Lucioles; F-06921 Sophia-Antipolis Cedex; France, CT WG1, Electronic meeting; Apr. 16, 2020-Apr. 24, 2020, Jun. 19, 2020 (Jun. 19, 2020).

International Search Report from PCT/KR2021/001907, dated Jun. 1, 2021.

"3rd Generation Partnership Project; Technical Specification Group Services and System Aspects; System architecture for the 5G System (5GS); Stage 2 (Release 16)", 3GPP TS 23.501 V16.3.0., (Dec. 2019), see sections 5.3.3.2.2, 5.15.2.2, 5.17.3, 5.24 and 6.3.3.3.

"3rd Generation Partnership Project; Technical Specification Group Services and System Aspects; Procedures for the 5G System (5GS); Stage 2 (Release 16)", 3GPP TS 23.502 V16.3.0, (Dec. 2019), see section 4.2.3.

3rd Generation Partnership Project; Technical Specification Group Services and System Aspects; System architecture for the 5G System (5GS); Stage 2 (Release 16), 3GPP TS 23.501 V16.3.0, 243 pages, Dec. 2019.

3rd Generation Partnership Project; Technical Specification Group Services and System Aspects; Procedures for the 5G System (5GS); Stage 2 (Release 16), 3GPP TS 23.502 V16.3.0, 558 pages, Dec. 2019.

Office Action for CN Patent Application No. 202180015236.0 dated Oct. 8, 2024.

Patent Certificate for EP Patent Application No. 217576495 dated Aug. 21, 2024.

Oppo, "Applicability of PS data off to ATSSS and MA PDU sessions", 3GPP TSG-SA2 Meeting #135, Split, Croatia, Oct. 14-18, 2019, S2-1909211.

Noka, et al., "Controlling non-SIP based services which are not 3GPP PS Data Off Exempt Services", SA WG2 Meeting #121, May 15-19, 2017, Hangzhou, China, S2-173179.

Office Action of Chinese Patent Office in Application No. 202180015236.0, dated Feb. 28, 2025.

* cited by examiner

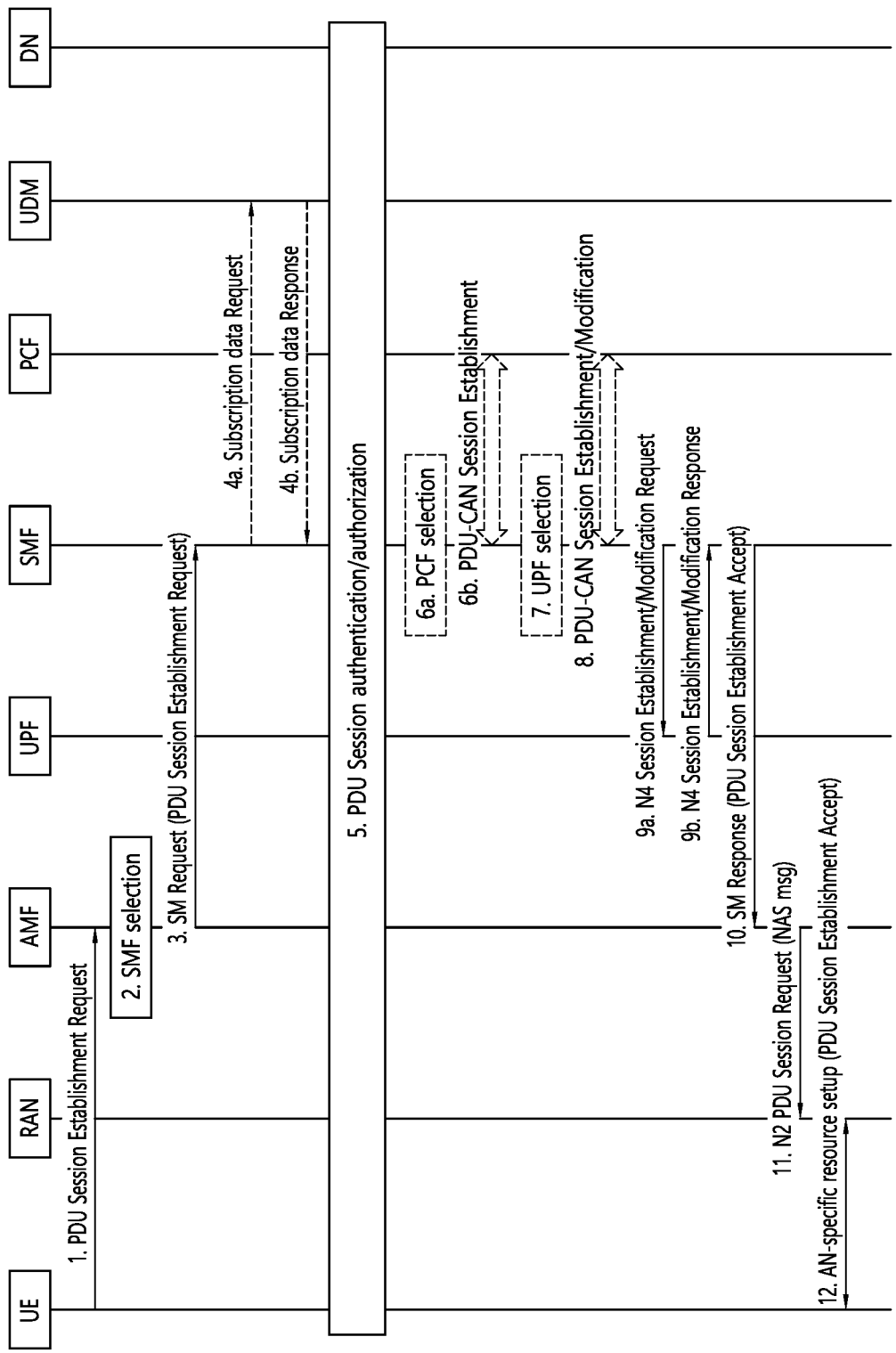

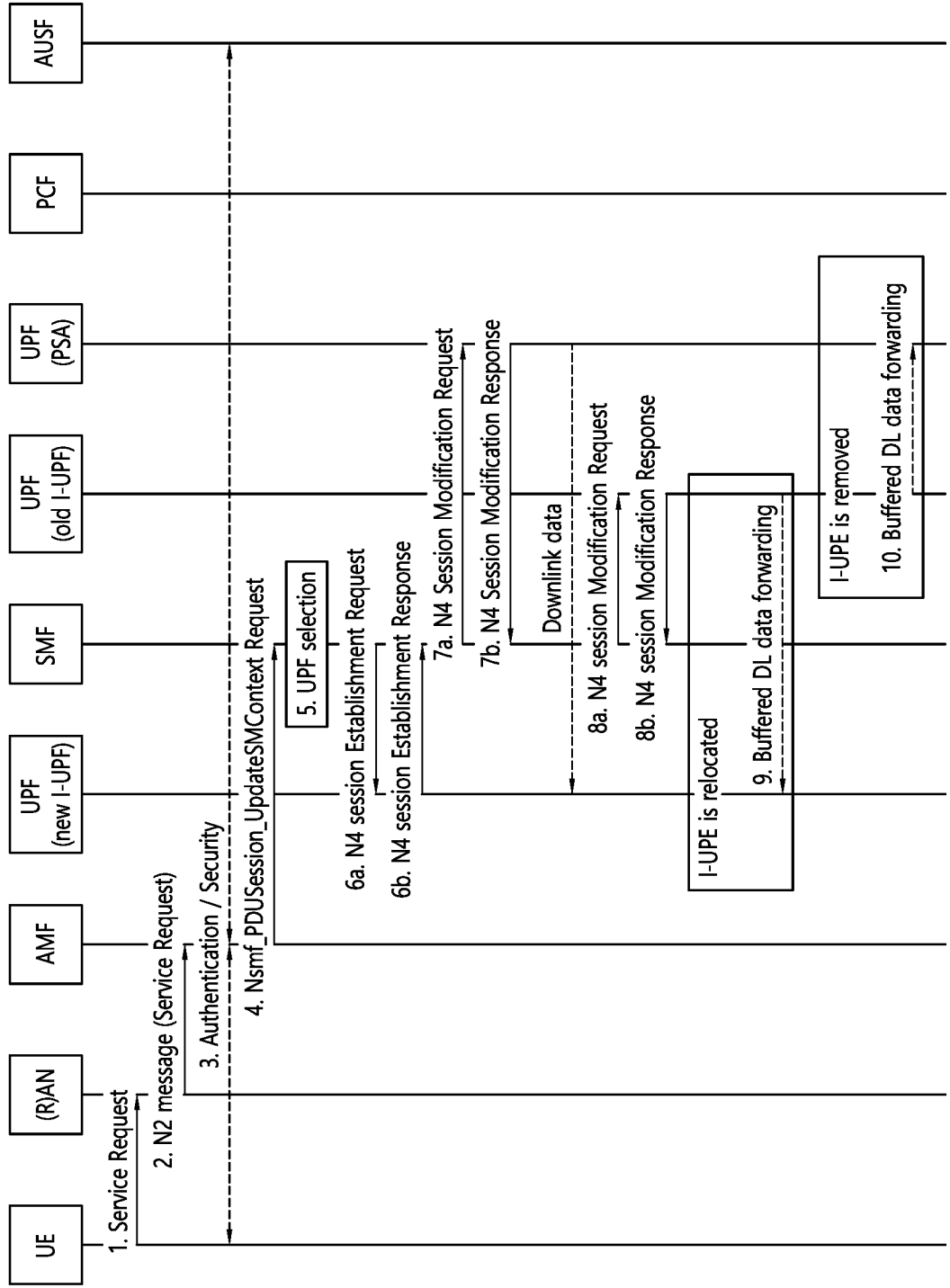

COMMUNICATION RELATED TO PS DATA OFF

This application is the National Stage filing under 35 U.S.C. 371 of International Application No. PCT/KR2021/001907, filed on Feb. 15, 2021, which claims the benefit of and priority to Korean Application No. 10-2020-0019224, filed on Feb. 17, 2020, the contents of which are all hereby incorporated by reference herein in their entirety.

TECHNICAL FIELD

The present disclosure generally relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, in 5G mobile communication, the 3rd Generation Partnership Project (3GPP) Packet Switch (PS) Data Off function may be used. However, conventionally, when 3GPP PS Data Off is used for a Packet Data Unit (PDU) session associated with non-3GPP access, a method for supporting efficient communication has not been discussed.

SUMMARY

Accordingly, a disclosure of the present specification has been made in an effort to solve the aforementioned problem.

In order to solve the above problems, one disclosure of the present specification provides a method for a UE to perform communication related to PS Data Off. The method may include sending a first PDU session establishment request message to establish a PDU session associated with non-3GPP access or 3GPP access.

In order to solve the above problems, one disclosure of the present specification provides a method for a network node to perform PS Data Off-related communication. The method includes: receiving last report information related to the PS Data Off state from the UE; and determining whether to apply the PS Data Off to the PDU session based on the last report information and the access type of the PDU session of the UE.

In order to solve the above-mentioned problems, one disclosure of the present specification provides a UE performing communication related to PS Data Off. The UE includes at least one processor; and at least one memory for storing instructions and operably electrically connectable with the at least one processor, wherein the operations performed based on the instructions being executed by the at least one processor include: to establish PDU session related to non-3GPP access or 3GPP access, transmitting a first PDU session establishment request message.

In order to solve the above problems, one disclosure of the present specification provides a network node that performs communication related to PS Data Off. The network node includes at least one processor; and at least one memory for storing instructions and operably electrically connectable with the at least one processor, wherein the operations performed based on the instructions being executed by the at least one processor include: receiving last report information related to the PS Data Off state; and determining whether to apply the PS Data Off to the PDU session based on the last report information and the access type of the PDU session of the UE.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operation may include: to establish a PDU session associated with non-3GPP access or 3GPP access, generating a first PDU session establishment request message.

In order to solve the above problems, one disclosure of the present specification provides a non-volatile computer-readable storage medium in which instructions are recorded. The instructions, when executed by one or more processors, cause the one or more processors to: generate a first PDU session establishment request message to establish a PDU session associated with a non-3GPP access or a 3GPP access.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 9a and 9b is a signal flowchart illustrating an exemplary PDU session establishment procedure.

FIGS. 11a-11c are signal flow diagrams illustrating an exemplary UE initiated service request procedure.

DESCRIPTION OF EXEMPLARY EMBODIMENTS

Figure 1:
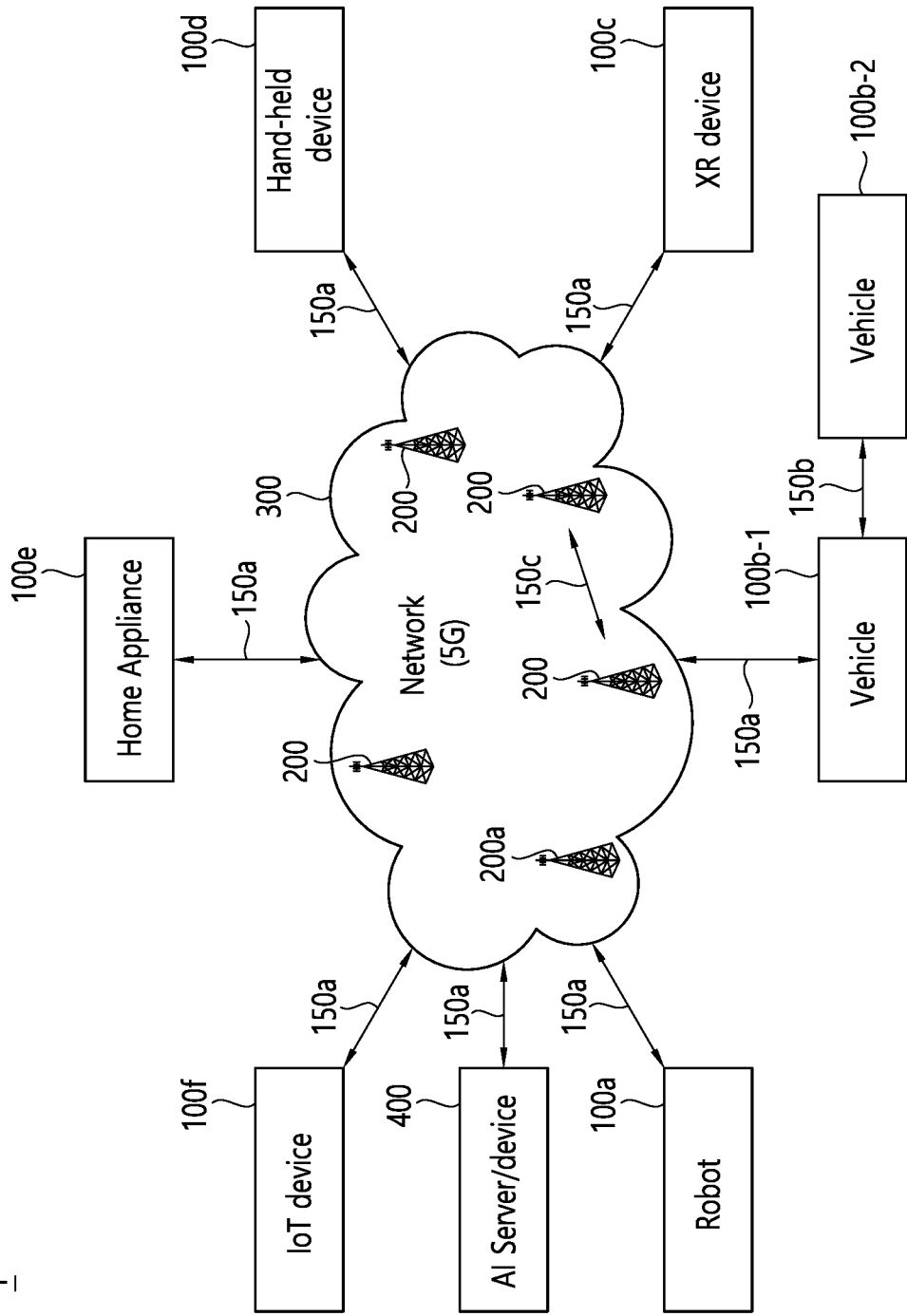
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
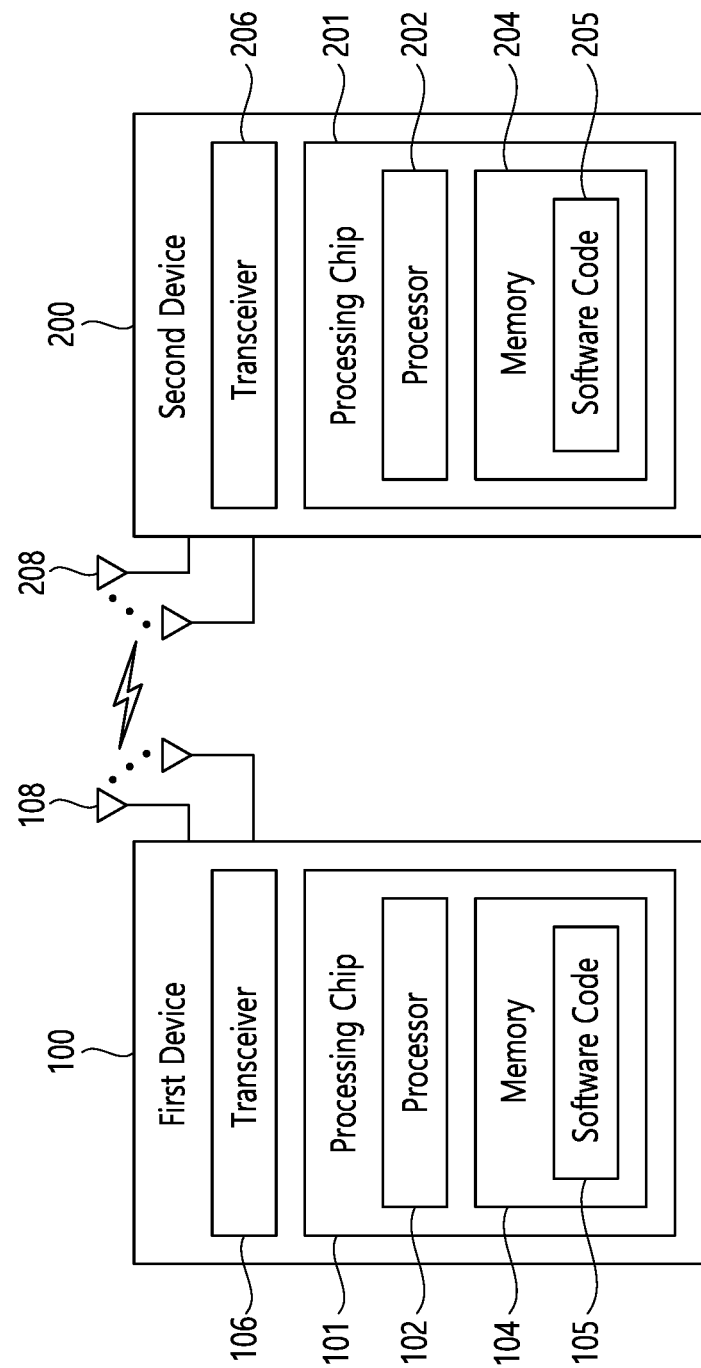
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
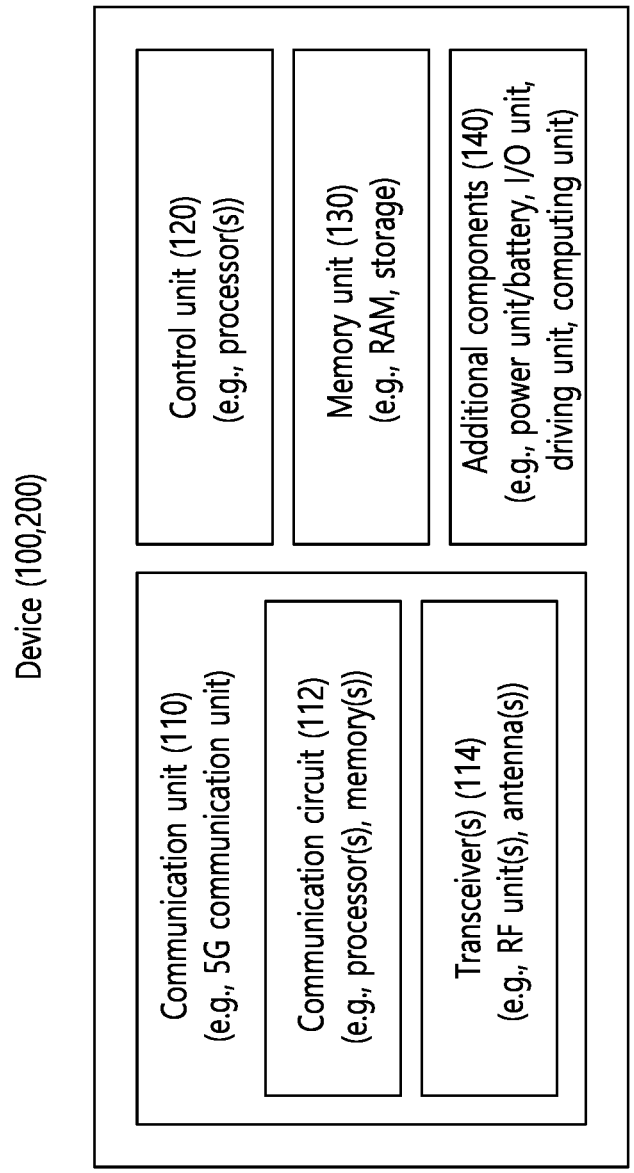
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use—example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
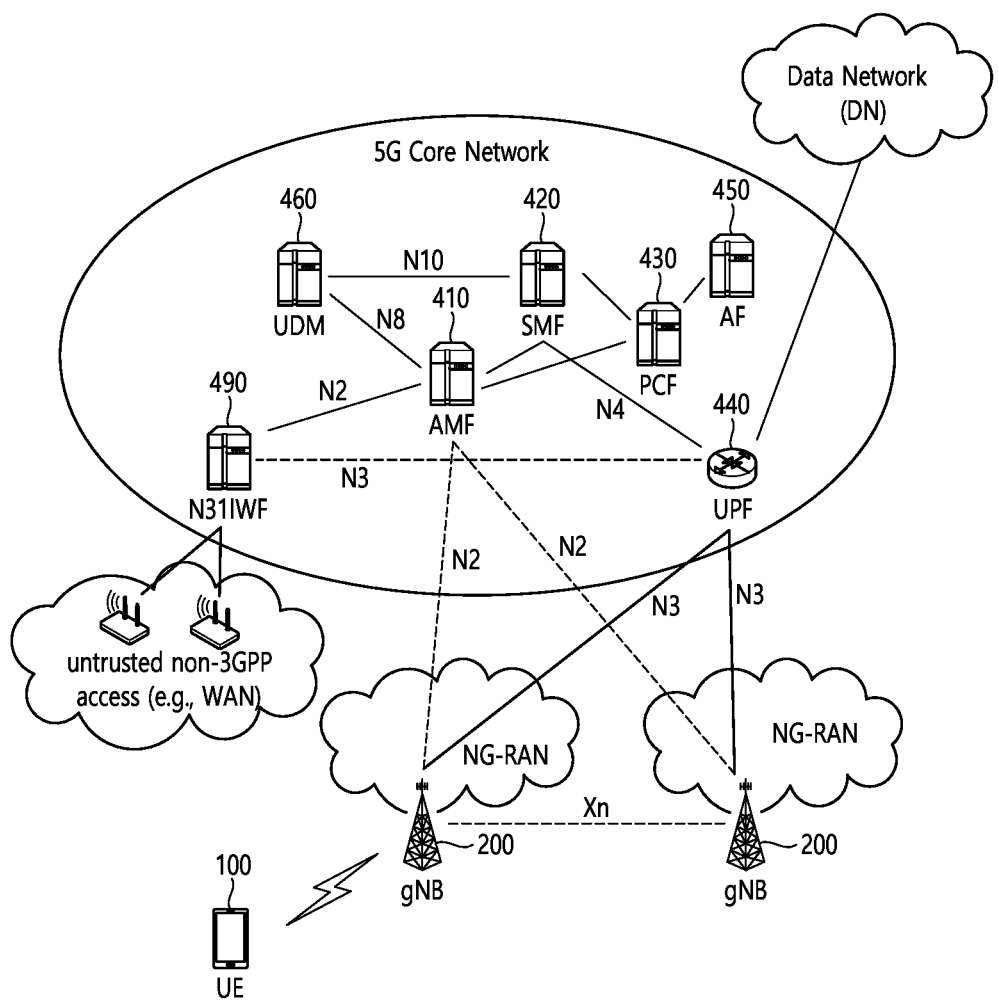
FIG. 4 is a structural diagram of a next-generation mobile communication network.

FIG. 4 is a structural diagram of a next-generation mobile communication network.

5GC(5G Core) may include various components, part of which are shown in FIG. 4, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP(3rd Generation Partnership Project) interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The 5$^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

Figure 5:
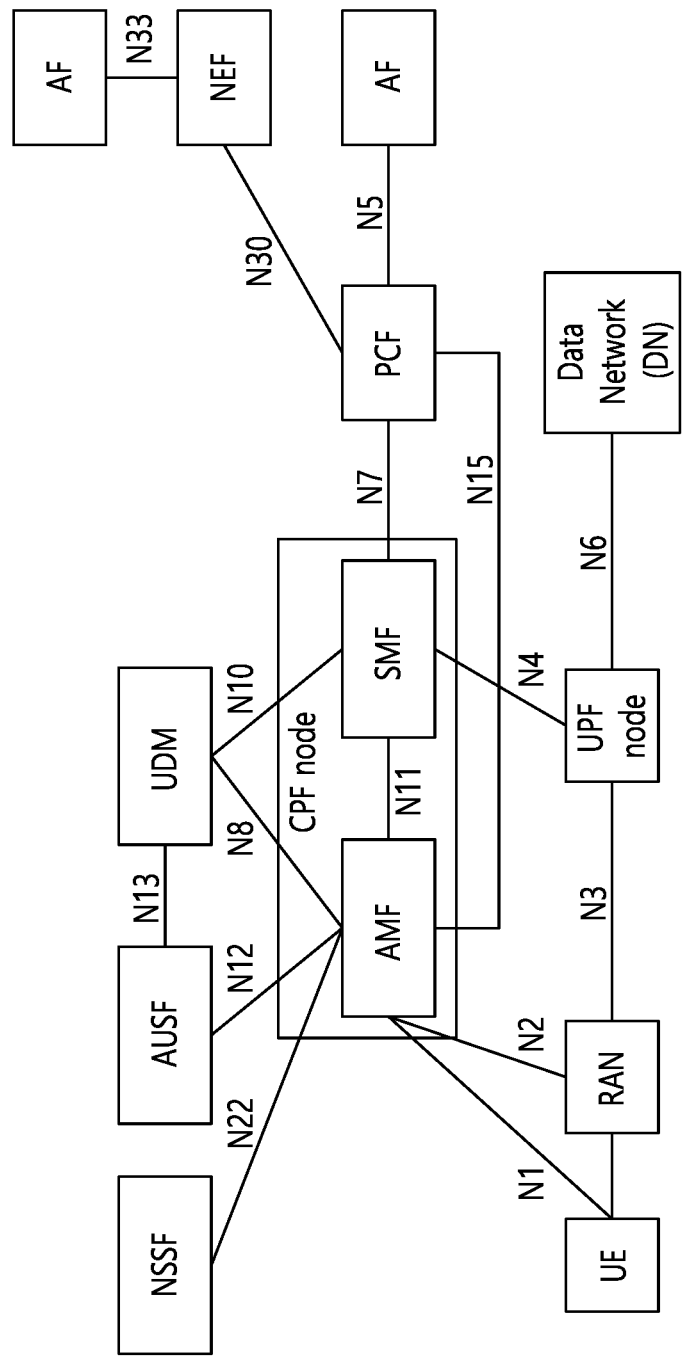
FIG. 5 is an exemplary diagram illustrating a predicted structure of a next generation mobile communication in terms of a node.

FIG. 5 is an exemplary diagram illustrating a predicted structure of a next generation mobile communication in terms of a node.

Referring to FIG. 5, the UE is connected to a data network (DN) through a next generation RAN (Radio Access Network).

The Control Plane Function (CPF) node shown in FIG. 5 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 5 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 6:
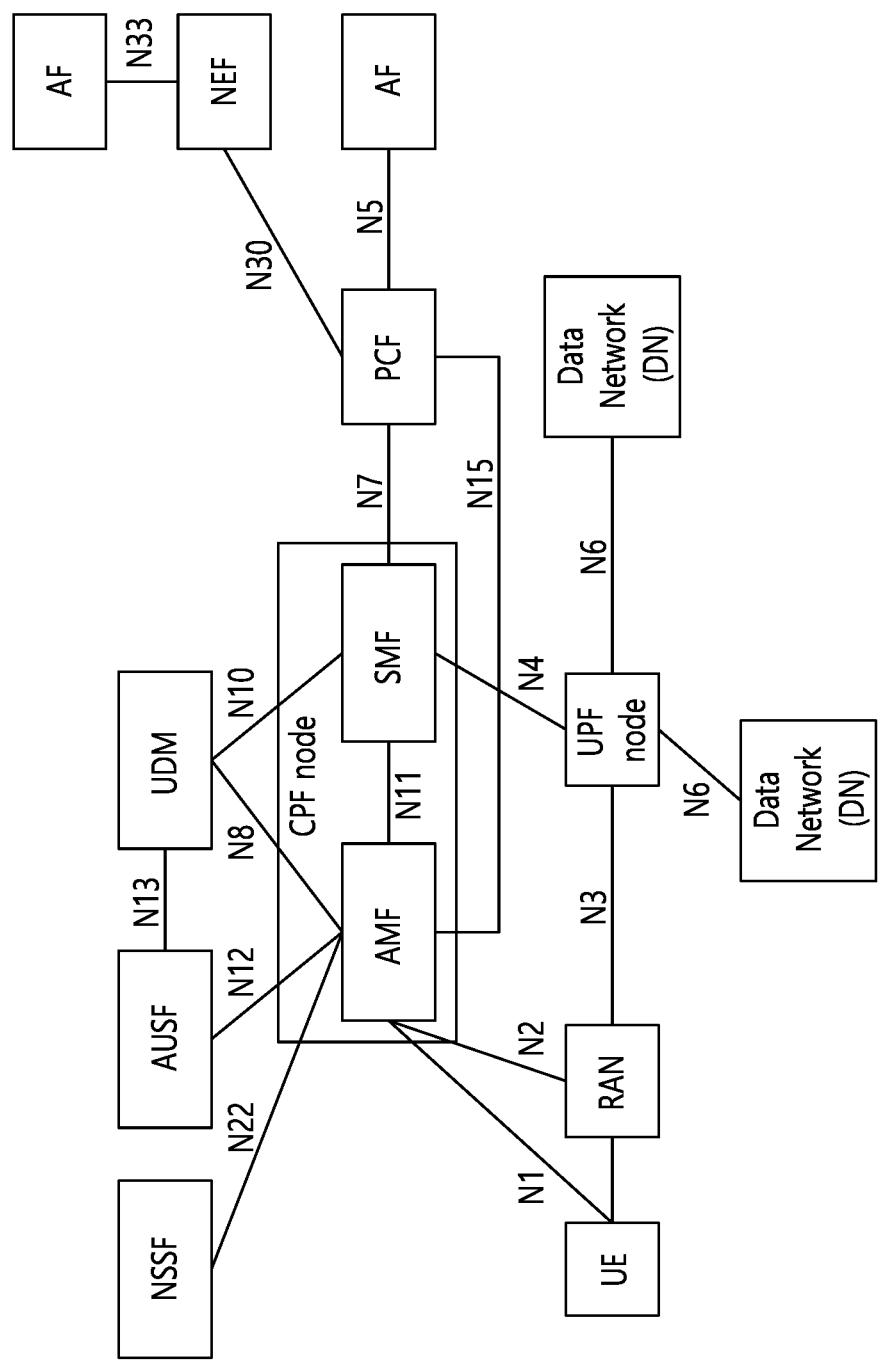
FIG. 6 is an exemplary diagram illustrating an architecture that allows the UE to simultaneously access two data networks using one PDU session.

In FIG. 6, the UE may simultaneously access two data networks using multiple PDU sessions.

FIG. 6 is an exemplary diagram illustrating an architecture that allows the UE to simultaneously access two data networks using one PDU session.

FIG. 6 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and
reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 7:
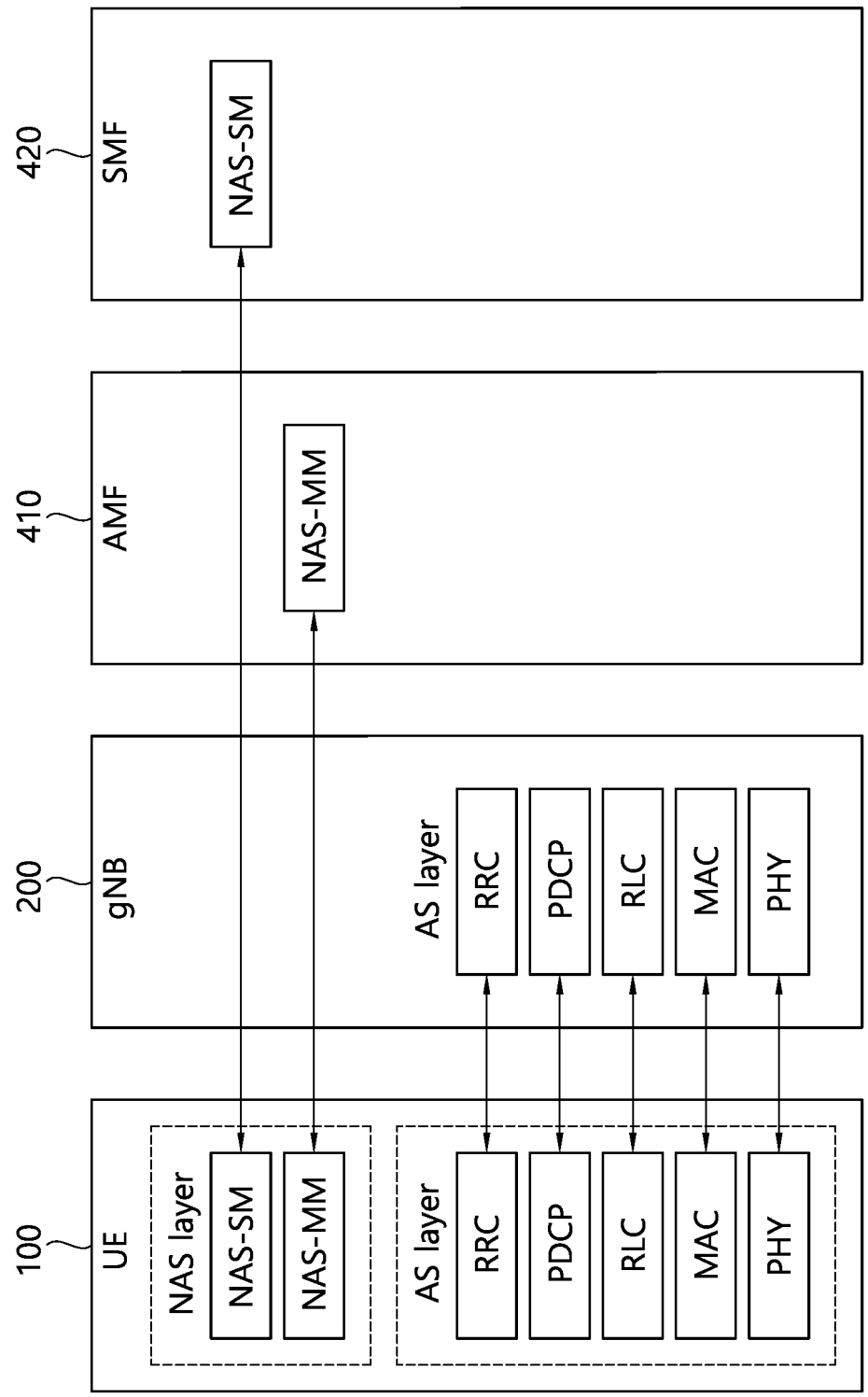
FIG. 7 is another exemplary diagram showing a structure of a radio interface protocol between a UE and a gNB.

FIG. 7 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 7, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking and to receive data, and to receive services. For this, the UE must register with the network. The registration procedure is performed when the UE needs to do initial registration with the 5G system. In addition, the registration procedure is performed when the UE performs periodic registration update, when the UE is in an idle mode and moving to a new tracking area (TA), and when the UE needs to perform periodic registration update.

During the initial registration procedure, the ID of the UE may be obtained from the UE. AMF may pass PEI (IMEISV) to UDM, SMF and PCF.

Figure 8A:
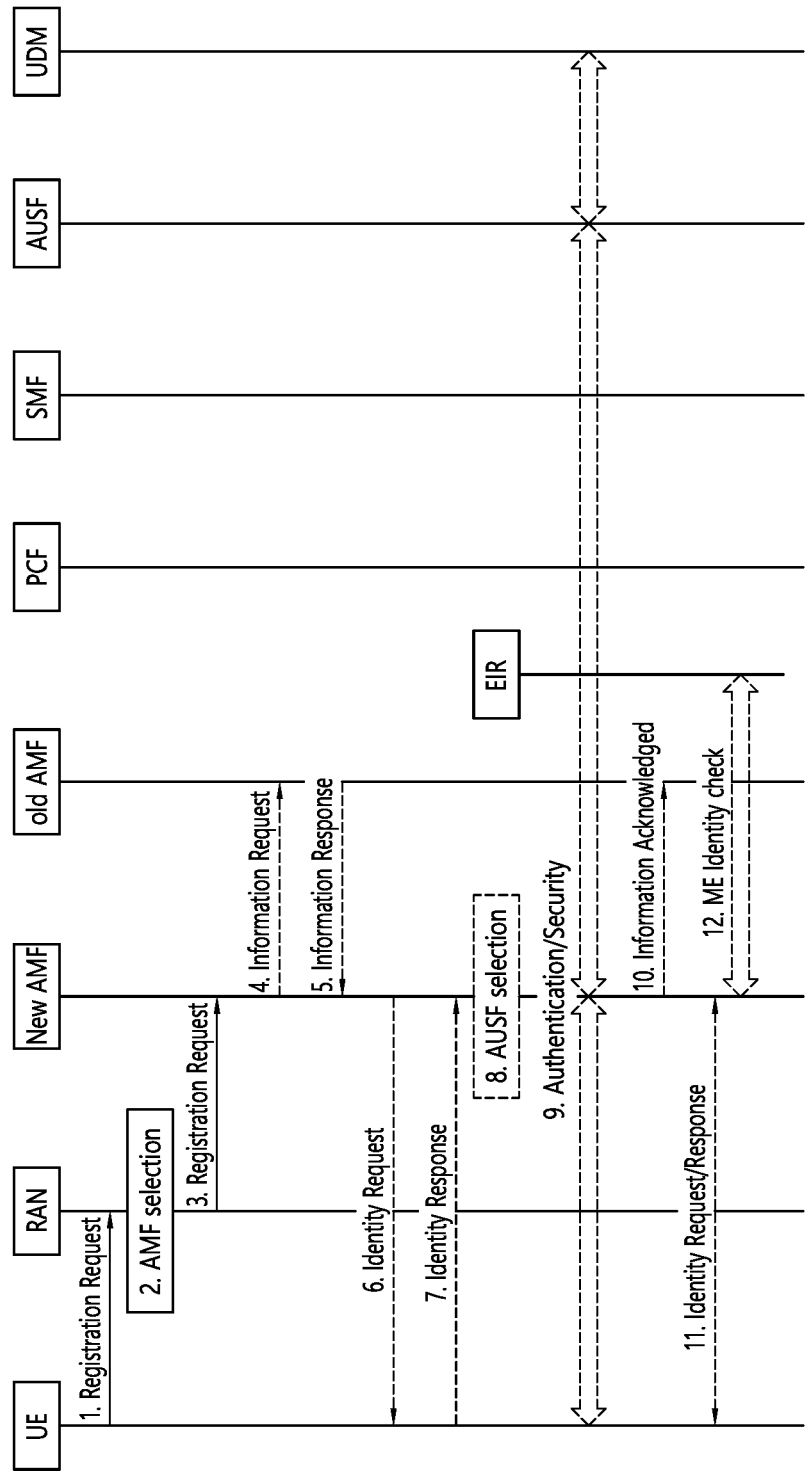
FIGS. 8a and 8b are signal flow charts showing an exemplary registration procedure.
Figure 8B:
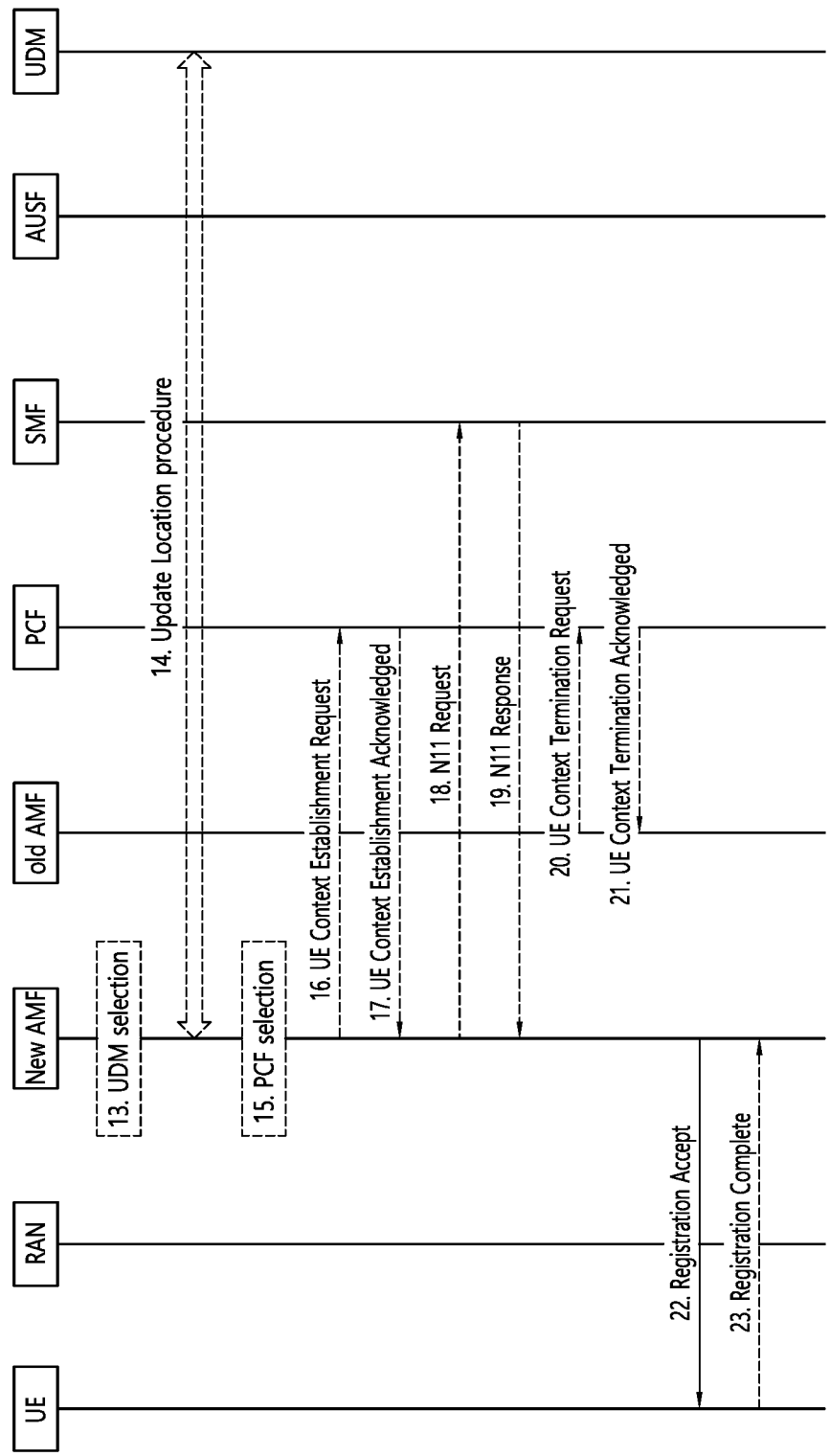

FIGS. 8a and 8b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN (Public Land Mobile Network) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 9B:
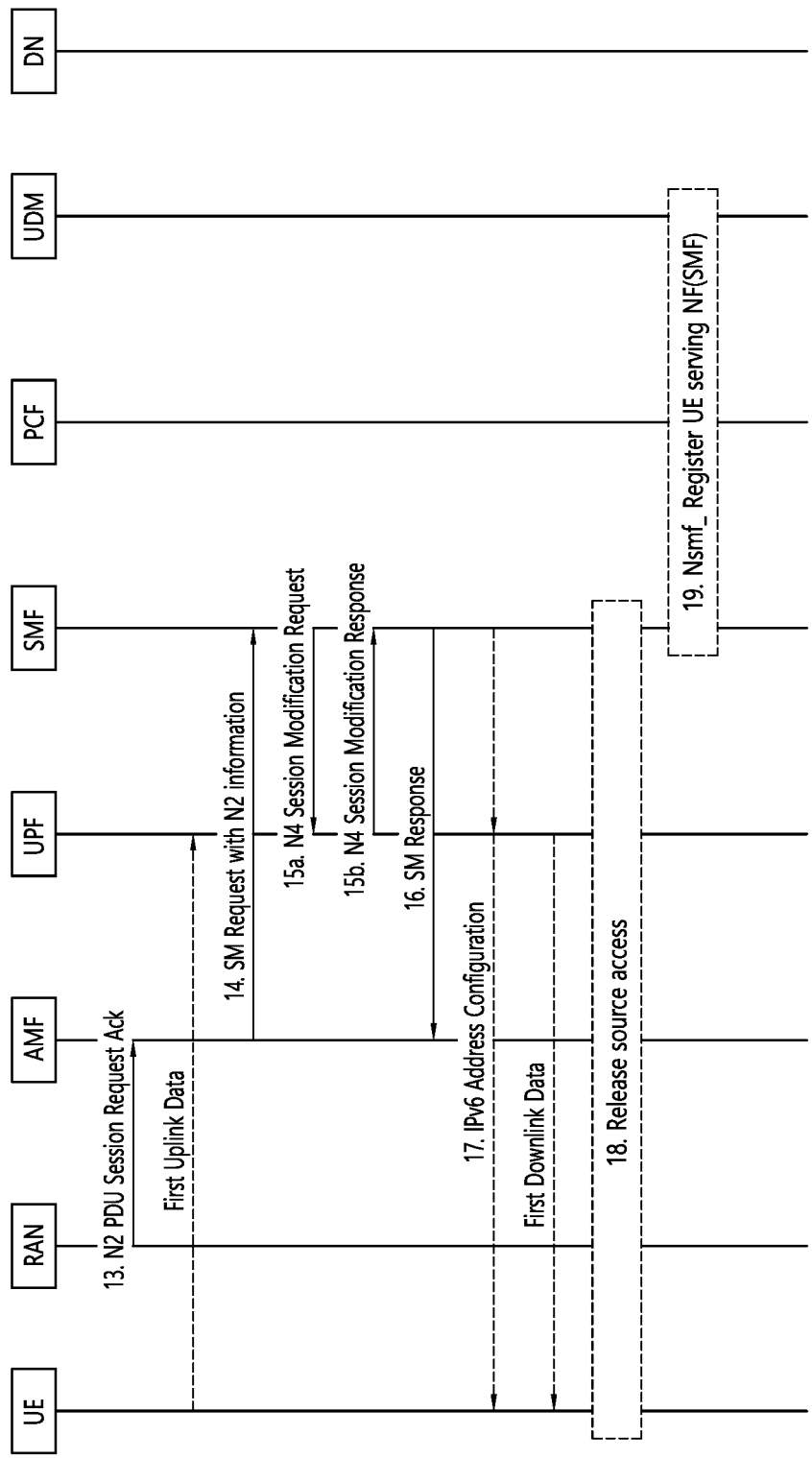

FIGS. 9a and 9b are a signal flowchart illustrating an exemplary PDU session establishment procedure.

The procedure shown in FIGS. 9a and 9b assumes that the UE has already registered on the AMF according to the registration procedure shown in FIGS. 8a and 8b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 8a and 8b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.
CN Tunnel information: This corresponds to a core network address of an N3 tunnel corresponding to the PDU session.
QoS Profile: This is used for providing mapping between a QoS parameter and a QoS flow identifier (QFI) to the RAN.
PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<PDU Session Modification Procedure>

Figure 10A:
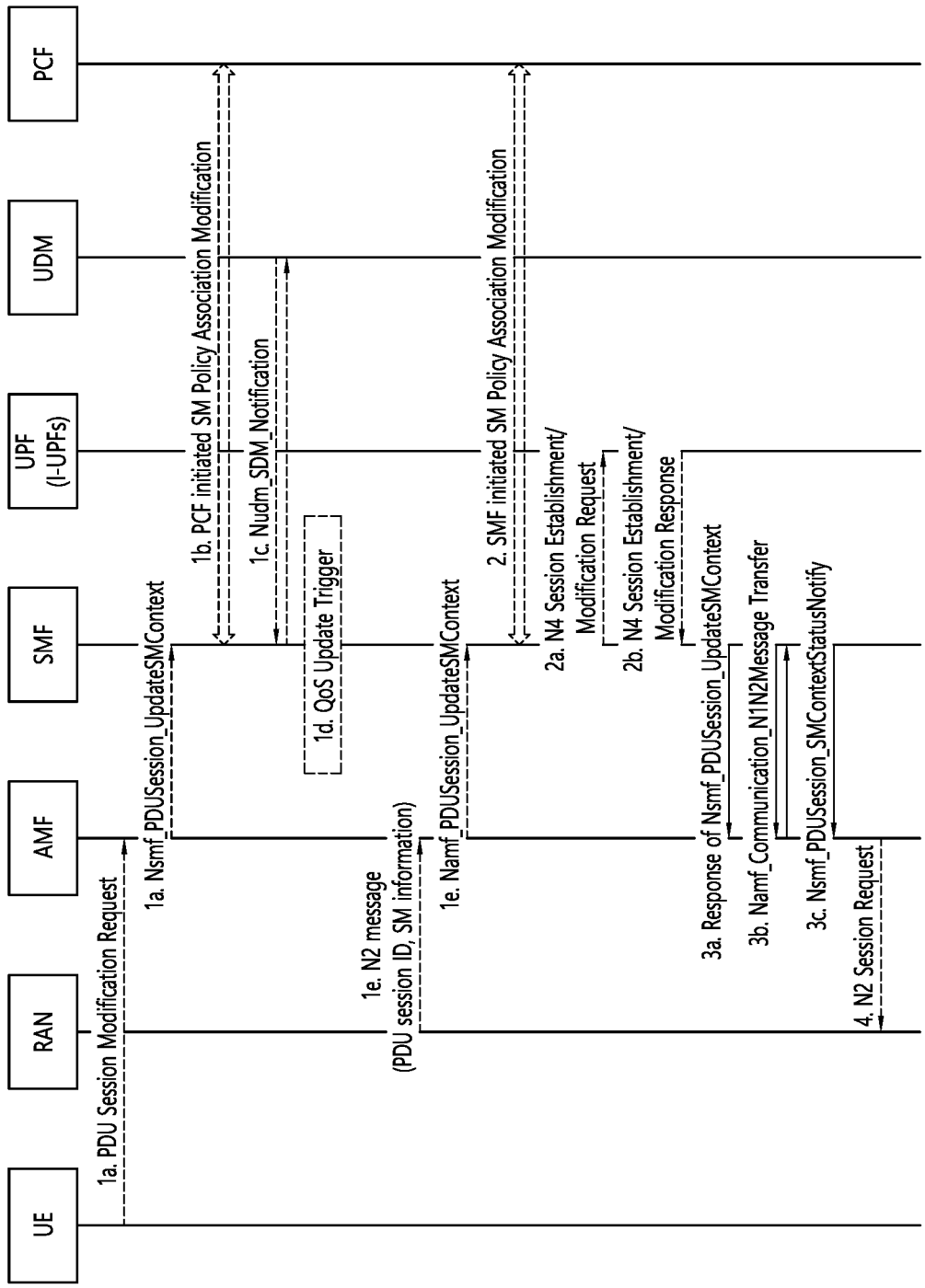
FIGS. 10a and 10b are signal flow diagrams illustrating an exemplary PDU session modification procedure.
Figure 10B:
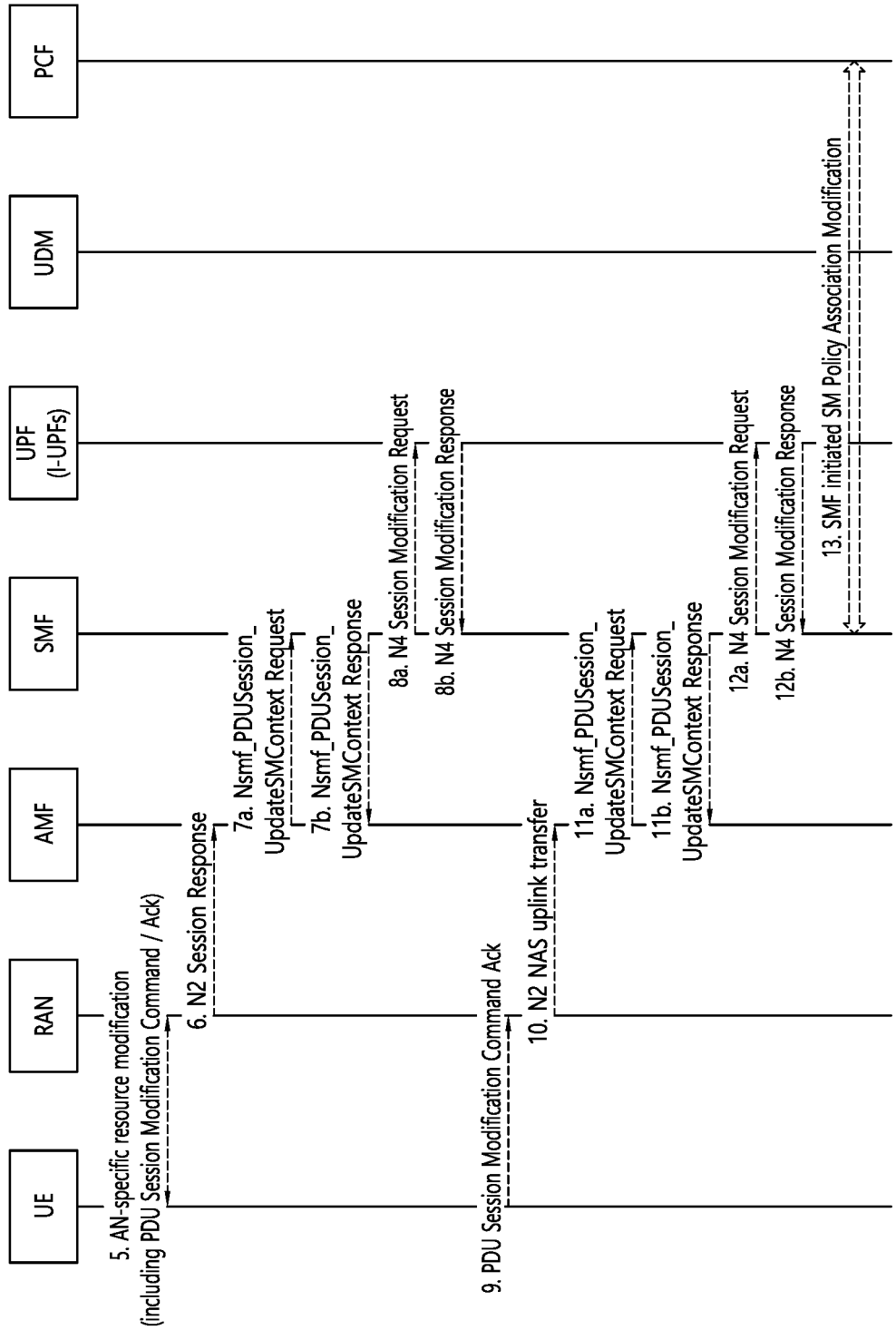

FIGS. 10a and 10b are signal flow diagrams illustrating an exemplary PDU session modification procedure.

The PDU session modification procedure may be used when one or more Quality of Service (QoS) parameters exchanged between the UE and the network are modified.

The signal flow diagram shown in FIGS. 10a and 10b is an example of a PDU session modification procedure, and specifically, a UE or network requested PDU Session Modification procedure (non-roaming case and roaming with local breakout case) is shown as an example.

An example of a PDU session modification procedure may be triggered by the following exemplary events (steps 1a) to 1e)):

1a) (UE-initiated modification) The UE may initiate a PDU session modification procedure by sending a NAS message.

For example, the UE may send a PDU session modification request message. Here, the NAS message may include an N1 SM container, a PDU session ID, and a UE Integrity Protection Maximum Data Rate. N1 SM container may include PDU session modification request (PDU Session ID, Packet Filters, Operation, Requested QoS, Segregation, 5GSM Core Network Capability, Number of Packet Filters, if Always-on PDU Session is requested, Always-on PDU Session Requested).

Depending on the access type, if the UE was in the CM-IDLE state, a service request procedure may be preceded before this SM-NAS message is transmitted. (Depending on the Access Type, if the UE was in CM-IDLE state, this SM-NAS message is preceded by the Service Request procedure.) (R) AN is delivered to the AMF along with the indication of the user location information (User location Information).

The AMF may invoke the SM context associated with the PDU session update. For example, AMF may call Nsmf_PDUSession_UpdateSMContext. Nsmf_PDUSession_UpdateSMContext may include an SM context ID and an N1 SM container (including a PDU session modification request).

When the UE requests a specific QoS handling for the selected Service Data Flow (SDF), the PDU session establishment request may include a packet filter describing the SDF, the requested packet filter operation (add, modify or delete) for the indicated packet filter, and the requested QoS. The PDU session establishment request may optionally include a Segregation indication. When the UE requests the network to bind the applicable SDF to a distinct and dedicated QoS Flow (eg, even if an existing QoS flow can support the requested QoS), segregation indication may be included in the PDU session establishment request. The network must comply with the UE's request, but the network may bind the selected SDF for the existing QoS flow instead of the UE's request.

Note 1: Only one QoS flow can be used for traffic segregation. When the UE makes a subsequent request for segregation of the additional SDF, the additional SDF is multiplexed in the existing QoS flow used for segregation.

If the UE is outside the availability area of the LADN (Local Area Data Network), the UE does not trigger a PDU session modification procedure for the PDU session corresponding to the LADN.

For a PDU session established in EPS, when the UE first moves from EPS to 5GS, when the UE wants to change the PDU session to an always-on PDU session, the UE may include an indication that an Always-on PDU session is requested in the PDU session modification request message.

1b) (Modification requested by PCF) The PCF may perform a PCF initiated SM Policy Association Modification procedure to notify the SMF of the modification of the policy. The PCF-initiated SM policy association modification procedure may be triggered, for example, by a policy decision or may be triggered when an application function (AF) requests.

1c) (Modification requested by SMF) The UDM may use Subscriber Data Management (SDM) notifications to update the subscription data of the SMF. For example, the SDM notification may be Nudm_SDM_Notification (including Subscription Permanent Identifier (SUPI) and Session Management Subscription Data). The SMF may acknowledge by updating the session management subscription data and returning SUPI and Ack.

1d) (Modification requested by SMF) The SMF may decide to modify the PDU session. Step 1d) may also be triggered from a locally configured policy or (R)AN. Step 1d) may also be triggered when the SMF marks that the UP (User Plane) connection is active and the status of one or more QoS flows has been deleted in 5GC but not synchronized with the UE.

When the SMF receives one of the triggers of steps 1b) to 1d), the SMF may initiate a PDU session modification procedure requested by the SMF.

1e) (AN-initiated modification) Regardless of whether a notification control is set or not, when an AN resource to which a QoS flow is mapped is released, (R)AN must indicate to the SMF. (R) AN may transmit an N2 message (including PDU session ID and N2 SM information) to the AMF. The N2 SM information may include a QoS flow ID (QFI), user location information, and an indication that a QoS flow has been released.

The AMF may call the SM context request associated with the update of the PDU session. For example, the AMF may invoke Nsmf_PDUSession_UpdateSMContext (including SM context ID and N2 SM information).

(AN Initiated Notification Control) When notification control is set for a GBR flow, if (R)AN determines that the QoS target of the QoS flow cannot be met or that the QoS target of the QoS flow can be met again, respectively, (R)AN may transmit an N2 message (including PDU session ID and N2 SM information) to the SMF. The N2 SM information may include an indication that the QoS target of the QFI and QoS flow cannot be met or an indication that the QoS target of the QoS flow may be met again, respectively. The AMF may call the SM context request associated with the update of the PDU session. For example, the AMF may invoke Nsmf_PDUSession_UpdateSMContext (including SM context ID and N2 SM information). When the PCF subscribed to the event, the SMF may report this event to the PCF for each PCC rule for which notification control is set (see step 2). Alternatively, if the dynamic PCC does not apply to this DNN and depends on a locally set policy, the SMF may initiate the PDU session modification procedure requested by the SMF as in the example of step 3b).

2) The SMF may report some subscribed events to the PCF by performing the SMF initiation SM policy association modification procedure. Step 2) may be omitted when the PDU session modification procedure is triggered by step 1b or 1d. If the dynamic PCC is not deployed (deployed), the SMF may apply a local policy to determine whether to change the QoS profile.

Steps 3) to 7) may not be invoked when only an operation (eg gating) in UPF is required for PDU session modification.

3a) For UE-initiated modification or AN-initiated modification, SMF may respond to AMF via PDU session update SM context. For example, the PDU session update SM context may be Nsmf_PDUSession_UpdateSMContext. Nsmf_PDUSession_UpdateSMContext may include N2 SM information (PDU session ID, QFI, QoS profile, session-Aggregate Maximum Bit Rate (AMBR)), and N1 SM container (including PDU Session Modification Command) PDU session modification command may include PDU session ID, QoS rule, QoS rule operation, QoS flow level QoS parameters if necessary for QoS related to QoS rule, Session-AMBR, Always-on PDU Session Requested if Always-on PDU Session is requested.

When PDU session modification has been requested by the UE, in order to modify the PDU session always-on PDU session, the SMF may include an Always-on PDU Session Granted indication in the PDU session modification command. The Always-on PDU session grant indication may be included to indicate whether the PDU session is changed to an Always-on PDU session or not.

The N2 SM information may carry information to be provided by the AMF to the (R)AN. To notify the (R)AN that one or more QoS flows have been added or modified, the N2 SM information may include a QoS profile and a corresponding QFI. The N2 SM information may include only the QFI to notify the (R)AN that one or more QoS flows have been removed. If the PDU session modification is triggered by the (R)AN release of step 1e), the SM information may carry the acknowledgment of the (R)AN release. When the UE requests a PDU session modification for a PDU session without an established user plane resource, the N2 SM information provided to (R)AN may include information for establishing a user plane resource.

The N1 SM container carries the PDU session modification command that the AMF should provide to the UE. In order to notify the UE that one or more QoS rules have been added, removed, or modified, the N1 SM container may include QoS rules, QoS rules and QoS related QoS rules operations, if necessary, QoS flow level QoS parameters and QoS flow level QoS parameter operation.

3b) For the modification requested by the SMF, the SMF may invoke Namf_Communication_N1N2 MessageTransfer. Namf_Communication_N1N2MessageTransfer may include N2 SM information (PDU session ID, QFI(s), QoS Profile(s), session-AMBR), and N1 SM container (including PDU session modification command) The PDU session modification command may include PDU session ID, QoS rules, QoS rules and QoS flow-level QoS parameters if necessary for QoS related to QoS rules operation and QoS rules, session-AMBR.

When the UE is in the CM-IDLE state and Asynchronous Type Communication (ATC) is activated, the AMF may update and store the UE context based on Namf_Communication_N1N2MessageTransfer, and steps 4) to 7) may be omitted. For reference, when the ATC mode is activated, paging is not performed for the UE in the IDLE state. When the UE is reachable (eg, when the UE enters the CM-CONNECTED state), the AMF may forward an N1 message to synchronize the UE and the UE context.

4) AMF may transmit an N2 PDU session request message to (R)AN. The N2 PDU session request may include N2 SM information received from the SMF, a NAS message (including a PDU session ID, and an N1 SM container (including a PDU session modification command)).

5) (R)AN may issue an AN specific signaling exchange with the UE related to information received from the SMF. For example, in the case of NG-RAN, RRC Connection Reconfiguration may occur when the UE modifies necessary (R)AN resources related to the PDU session.

(R)AN may acknowledge the N2 PDU session request by sending an N2 PDU session Ack message to the AMF. The N2 PDU session Ack message may include N2 SM information (list of accepted/rejected QFIs, AN tunnel information, PDU session ID, Secondary RAT using data) and user location information. In the case of Dual Connectivity, when one or more QFIs are added to a PDU session, the master RAN node transmits one or more QFIs of these QFIs to the NG-RAN node (the NG-RAN that was not previously involved in the PDU session) node) can be assigned. In this case, the AN tunnel information may include a new N3 tunnel endpoint for the QFI allocated to the new NG-RAN node. Accordingly, when one or more QFIs are removed from the PDU session, the (R)AN node is no longer involved in the PDU session, and the corresponding tunnel endpoint is removed from the AN tunnel information. If the QFI cannot meet the user plane security enhancement information for the corresponding QoS profile (eg, due to the UE Integrity Protection Maximum Data Rate being exceeded), the NG-RAN may reject the QFI.

When the PLMN sets a second RAT usage reporting, the NG-RAN node may provide a RAN usage data report.

7) AMF may deliver N2 SM information and user location information received from AN to SMF through Nsmf_PDUSession_UpdateSMContext service operation. The SMF may reply to the AMF with an Nsmf_PDUSession_UpdateSMContext response. The N2 SM information may include second RAT usage data.

When (R)AN rejects the QFI, the SMF is responsible for updating the QoS flow level QoS parameters if necessary for the QoS rules at the UE and the QoS flows associated with the QoS rules.

8) The SMF may update the N4 session of the UPF related to the PDU session modification by sending the N4 session modification request message to the UPF (refer to Note 3).

When a new QoS flow is generated, the SMF may update the UPF with UL Packet Detection Rules of the new QoS flow.

Note 2: UL packets with QFI of new QoS flow may be delivered via update.

9) The UE may acknowledge the PDU session modification command by sending a NAS message. The NAS message may include a PDU session ID and an N1 SM container (including PDU session modification command Ack).

10) (R)AN may forward NAS message to AMF.

11) AMF may transmit N1 SM container (including PDU session modification command Ack) and user location information received from AN to SMF through Nsmf_PDUSession_UpdateSMContext service operation.

The SMF may reply using the Nsmf_PDUSession_UpdateSMContext response.

If the SMF-initiated PDU session modification procedure is to delete QoS flows that do not contain QoS flows associated with the default QoS rules (eg, when triggered by PCF), and the SMF does not receive a response from the UE, the SMF marks the state of these QoS flows to be synchronized with the UE.

12) The SMF may update the N4 session of the UPF that is not related to the modification of the PDU session by sending the N4 session modification request message (including the N4 session ID) to the UPF. For a PDU session of the Ethernet PDU session type, the SMF may notify the UPF to add or remove an Ethernet Packet Filter Set and a forwarding rule(s).

Note 3: UPFs affected by the PDU session modification procedure depend on the modified QoS parameters and deployment. For example, when the session AMBR of a PDU session having a UL CL (Uplink Classifier) is changed, only the UL CL may be related. This note can also be applied to step 8).

13) When the SMF interacts with the PCF in step 1b) or 2), the SMF may perform the SMF-initiated SM policy association modification procedure to notify the PCF whether the PCC decision is enforced or cannot be enforced.

The SMF may notify any entity subscribed to the user location information related to the PDU session change.

When step 1b) is triggered to perform an application function effect on traffic routing, the SMF may re-establish the user plane of the PDU session.

<Service Request Procedures>

The service request procedure is used to request establishment of a secure connection to AMF by a UE or a 5G core network (5GC). The service request procedure is used to activate the user plane connection of the established PDU session even when the UE is in a CM-IDLE state and a CM-CONNECTED state. For reference, in order to reflect NAS signaling connection between the AMF and the UE, two CM states of the CM-IDLE state and the CM-CONNECTED state are used.

The UE does not initiate a service request procedure if there is an ongoing service request procedure.

The service request procedure includes a service request procedure initiated by the UE (i.e., a UE triggered service request) and a service request procedure initiated by the network (i.e., a network triggered service request).

Hereinafter, an example of the UE triggered service request procedure will be described with reference to FIGS. 11a to 11c, and an example of the network triggered service request procedure will be described with reference to FIG. 12. The service request procedure described in FIGS. 11a to 11c and 9 is only an example, and the service request procedure in the present disclosure includes all the service request procedures triggered by the UE and all the service request procedures triggered by the network.

Figure 11B:
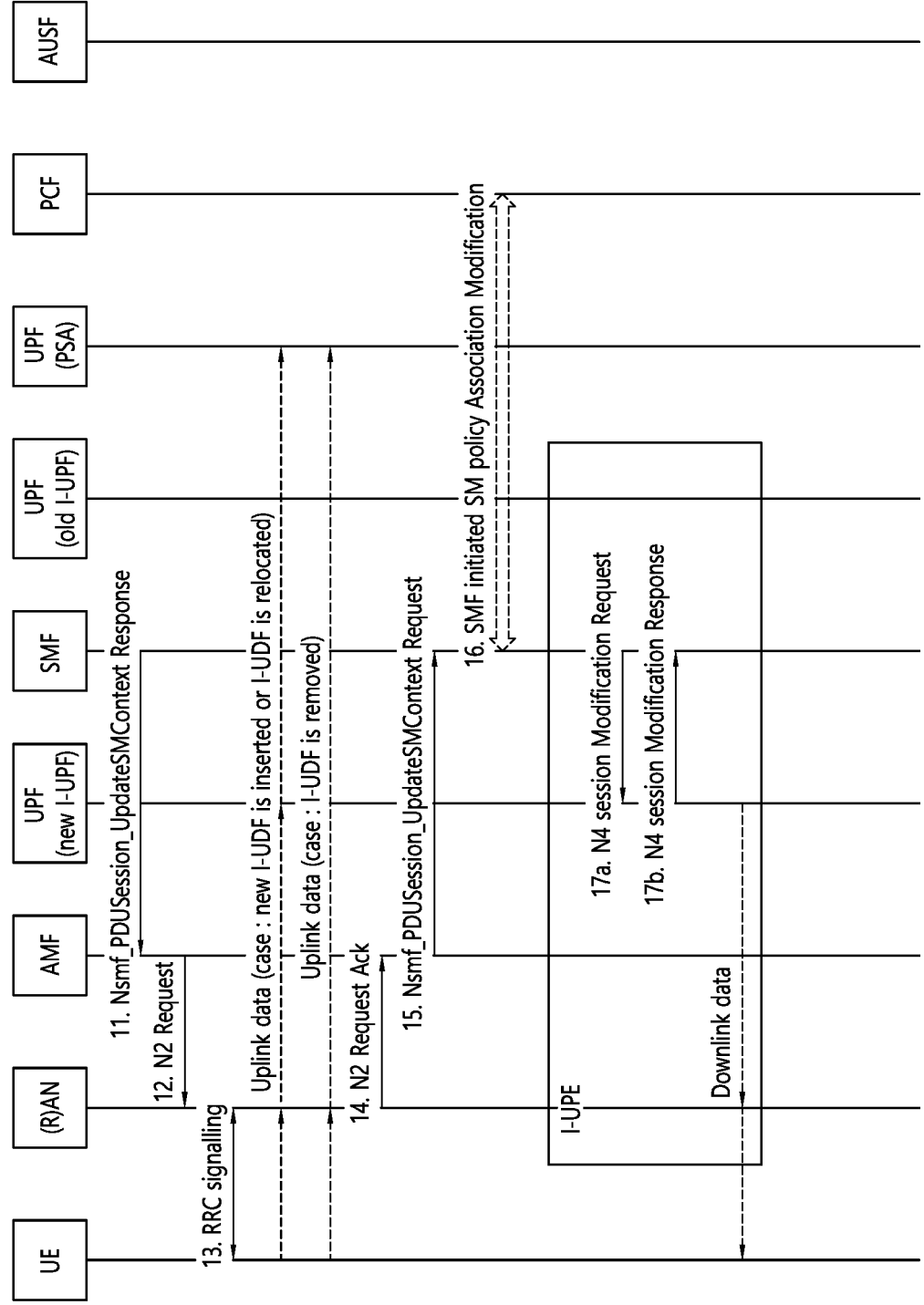
Figure 11C:
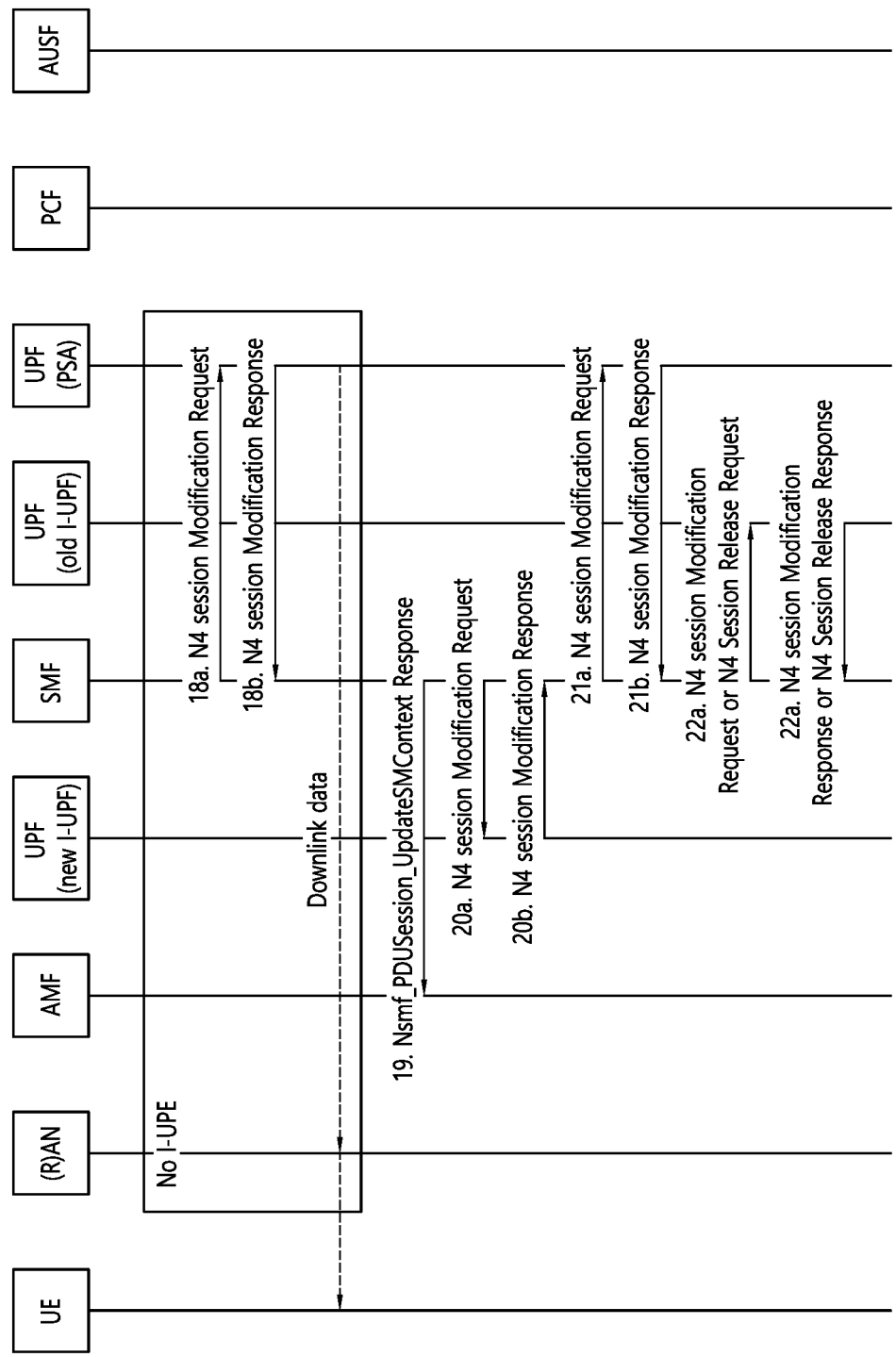

FIGS. 11a to 11c are signal flowcharts illustrating an exemplary UE triggered service request procedure.

The UE in the CM-ILDE state initiates a service request procedure to transmit a response on an uplink signaling message, user data, or network paging request. After receiving the service request message, the AMF may perform authentication. After establishing a signaling connection for AMF, the UE or the network may transmit a signaling message (e.g., establishment of a PDU session from the UE to the SMF through the AMF).

The service request procedure may be used by a UE in CM-CONNECTED state to request activation of a user plane connection for a PDU session and to respond to a NAS notification message received from the AMF.

For any service request procedure, if necessary, the AMF may include state information of the PDU session in a service accept message to synchronize a PDU session state between the UE and the network.

If the service request is not accepted by the network, the AMF responds to the UE with a service reject message. The service rejection message may include an indication or a cause code for requesting that the UE perform a registration update procedure.

In the UE triggered service request procedure, both SMF and UPF belong to a PLMN that serves the UE. For example, in a home routed roaming case, the SMF and UPF of the HPLMN are not affected by the service request procedure (that is, the SMF and UPF of the HPLMN are not involved in the service request procedure).

In response to a service request according to user data, the network may take additional action if the user plane connection activation is not successful.

The UE triggered service request procedure may be applied to a scenario with or without an intermediate UPF and a scenario with or without an intermediate UPF reselection.

1) Signaling from UE to (R)AN: the UE may transmit an access network (AN) message (including AN parameters, service request (list of PDU sessions to be activated, list of allowed PDU sessions), security parameters and PDU session status (status)) to the (R)AN.

The list of PDU sessions to be activated is provided by the UE when the UE attempts to re-activate the PDU session. The list of allowed PDU sessions is provided by the UE when the service request is a response to a NAS notification or paging of a PDU session related to non-3GPP access. And, the list of allowed PDU sessions identifies PDU sessions that may be moved to 3GPP access.

In case of NG-RAN:
AN parameters include the selected PLMN ID and establishment cause. The establishment cause provides a reason for requesting establishment of an RRC connection.
The UE transmits a service request message (message to AMF) encapsulated in an RRC message to the NG-RAN. The RRC message may be used to carry 5G system architecture evolution (SAE)-temporary mobile subscriber identity) (5G-S-TMSI).

When a service request is triggered for user data, the UE notifies a PDU session in which a user plane (UP) connection is to be activated in a service request message using a list of PDU sessions to be activated.

When the service request is triggered only for signaling, the UE does not include a list of PDU sessions to be activated.

When a service request procedure is triggered for a paging response and the UE has user data to be transmitted at the same time, the UE may inform about the PDU session with a UP connection to be activated in the service request message using the list of PDU sessions to be activated. Otherwise, the UE does not inform about any PDU session in the service request for paging response.

In a specific case, if there is no pending uplink data of PDU sessions, if a service request is triggered only for signaling, or if a service request is triggered for a paging response, the UE may include the PDU session to the list of PDU sessions to be activated.

Figure 12:
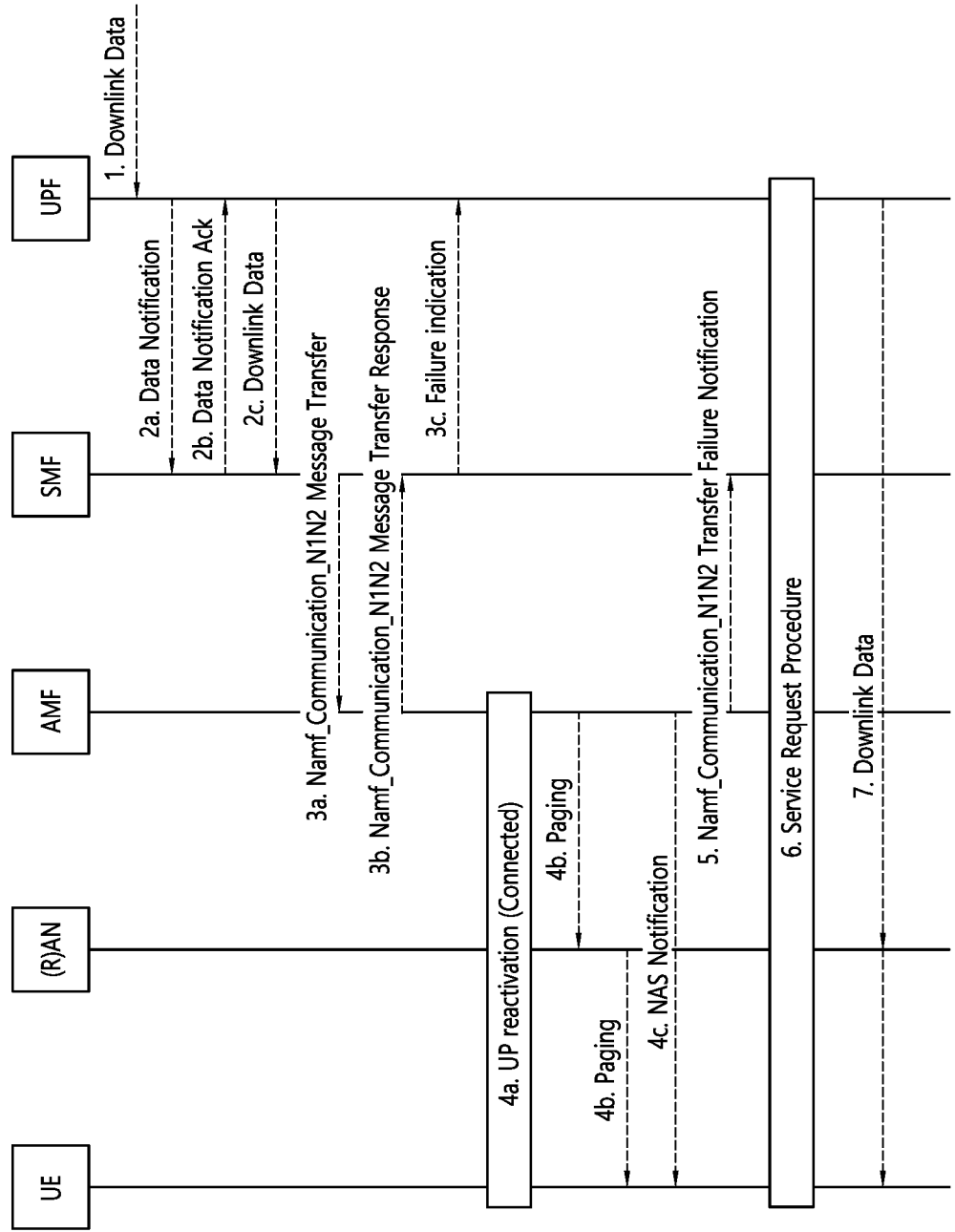
FIG. 12 is a signal flow diagram illustrating an exemplary network initiated service request procedure.

When a service request through 3GPP access is triggered in response to a NAS notification indicating paging or non-3GPP access, the UE includes the non-3GPP PDU session that may be reactivated through 3GPp in the allowed PDU session list (See the example to be described in step 6 of FIG. 12).

The PDU session state indicates a PDU session available in the UE.

When the UE is located outside an available area of the LADN, the UE does not trigger a service request procedure for a PDU session corresponding to the LADN. Also, when the service request is triggered for other reasons, the UE does not include the PDU session in the list of PDU sessions to be activated.

When the UE is in the CM-CONNECTED state, only a list of PDU sessions to be activated and a list of allowed PDU sessions may be included in the service request.

2) (R)AN to AMF signaling: (R)AN may transmit an N2 message to AMF. The N2 message may include N2 parameters, a service request, and a UE context request.

If the AMF cannot handle the service request, the AMF will reject the service request.

When NG-RAN is used, N2 parameter may include 5G-S-TMSI, the selected PLMN ID, location information, and establishment cause.

When the UE is in the CM-IDLE state, the NG-RAN may acquire 5G-S-TMSI in the RRC procedure. The NG-RAN may select AMF based on 5G-S-TMSI. The location information is related to a cell on which the UE camps.

Based on the PDU session state, the AMF may perform a PDU session release procedure for PDU sessions indicated by the UE that the PDU session ID is not available in the network.

3a) Signaling from AMF to (R)AN: AMF may transmit an N2 request to (R)AN. Here, the N2 request may include a security context, a handover restriction list, and a list of recommended cells/TAs/NG-RAN node identifiers.

When the 5G-AN requests for the UE context or the AMF needs to provide the UE context (e.g., when the AMF needs to initiate a fallback procedure for an emergency service), the AMF may initiate an NG application protocol (NGAP) procedure. For a UE in a CM-IDLE state, the 5G-AN stores security context in the UE AN context. The handover restriction list is related to mobility restrictions.

The 5G-AN uses the security context to protect messages exchanged with the UE.

When the NG-RAN node provides a list of recommended cells/TAs/NG-RAN node identifiers during the AN release procedure, the AMF may include the list of recommended cells/TAs/NG-RAN node identifiers in the N2 request. When the RAN determines to enable the RRC inactive state for the UE, the RAN may use this information to allocate a RAN notification area.

3) If the service request is not transmitted as being integrity protected or integrity protection verification failed, the AMF may initiate a NAS authentication/security procedure.

When the UE in the CM-IDLE state initiates a service request only for signaling connection, the UE and the network may exchange NAS signaling after successful establishment of the signaling connection, and steps 4 to 11 and steps 15 to 22 of FIGS. 11a to 11c may be omitted.

4) [Conditional Operation] Signaling from AMF to SMF: The AMF may transmit an Nsmf_PDUSession_UpdateSMContext Request to the SMF. Here, the Nsmf_PDUSession_UpdateSMContext Request may include a PDU session ID, operation type, UE location information, access type, RAT type, and UE presence in LADN service area.

Nsmf_PDUSession_UpdateSMContext Request is invoked in the following cases:
When the UE includes a list of PDU sessions to be activated in the service request message;
When this procedure is triggered by the SMF but a PDU session identified by the UE is correlated with a PDU session ID different from the PDU session ID that triggers this procedure;
When this procedure is triggered by the SMF but a current UE location is outside the "area of validity for the N2 SM information" provided by the SMF (see step 3a in FIG. 12). In this case, the AMF does not transmit the N2 information provided by the SMF (see step 3a in FIG. 12). If the current UE location is outside the "available area of N2 SM information", steps 4 to 11 are omitted.

If the DNN corresponds to the LADN, "the presence of the UE in the LADN service area" indicates whether the UE is inside (IN) or outside (OUT) the LADN service area. If the AMF does not provide an indication of "the presence of a UE in the LADN service area" and the SMF determines that the DNN corresponds to the LADN, the SMF considers the UE to be outside the LADN service area.

The AMF determines whether the PDU session(s) will be activated. In addition, the AMF transmits the Nsmf_P-DUSession_UpdateSMContext Request related to the PDU session to the SMF along with an operation type set to "UP active" to indicate establishment of the user plane resource for the PDU session. The AMF determines an access type and an RAT type based on a global RAN node ID related to an N2 interface.

If this procedure is triggered in response to a paging or NAS notification indicating non-3GPP access and the UE is not on the list (provided by the UE) of PDU sessions allowed in the paged or notified PDU session, the AMF may notify the SMF that the user plane for the PDU session cannot be reactivated. The service request procedure may be terminated without reactivation of the user plane for other PDU sessions in the list of allowed PDU sessions.

While the previous NAS signaling connection through the NG-RAN is maintained, the AMF may receive a service request through the NG-RAN to establish another NAS signaling connection. In this case, in order to release the previous NAS signaling connection, AMF may trigger an AN release procedure for the old NG-RAN according to the following logic:

For the PDU session indicated in the "list of PDU sessions to be activated", the AMF may request the SMF to immediately activate the PDU session by performing this step 4.

For a PDU session included in the "list of PDU session ID(s) with active N3 user plane" but not included in the "list of PDU sessions to be activated", the AMF may request the SMF to deactivate the PDU session.

5) If the PDU session ID corresponds to the LADN and the SMF determines that the UE is located outside the available area of the LADN based on the "UE presence in the LADN service area" provided by the AMF, the SMF may determine to perform the following actions (based on a local policy).

SMF may maintain the PDU session. However, the SMF may reject the activation of the user plane connection of the PDU session and notify the AMF accordingly. When the service request procedure is triggered by the network initiated service request of FIG. 12, the SMF may notify the UPF (UPF that has sent data notification) that the UPF should discard downlink data for the PDU session and/or should not provide an additional data notification message; or The SMF may release the PDU session: The SMF may release the PDU session and inform the AMF that the PDU session has been released.

In the above two cases, the SMF responds to the AMF with an appropriate reject cause, and user plane activation of the PDU session may be stopped.

When the SMF determines that the UE is located in the LADN available area, the SMF may check a UPF selection criterion based on the location information received from the AMF and determine to perform one of the following operations:

The SMF accepts the activation of the UP connection and may continue to use the current UPF;

When the UE moves outside the service area of the UPF (the UPF previously connected to the AN), the SMF, while maintaining the UPF acting as a PDU session anchor, may accept activation of the UP connection and select a new intermediate UPF (or may add/remove intermediate UPFs (I-UPF)). The steps to perform the addition/change/removal of the I-UPF are described below through conditional steps.

NOTE 1: When old and/or new I-UPF implements a UL uplink classifier (CL) or branching point (BP) function and a PDU session anchor for connectivity of local access to the data network, the signaling described in this figure is intended as signaling for adding, removing, or changing a PDU session anchor, and signaling for adding, releasing, or changing UL CL or BP, should be performed by a different procedure.

The SMF may reject activation of the UP connection of the PDU session in session and service continuity (SSC) mode 2. In addition, after the service request procedure, the SMF may trigger re-establishment of a PDU session in order to perform allocation of a new UPF (UPF acting as a PDU session anchor). (This operation may be performed, for example, when the UE is moved outside the service area of the anchor UPF connected to the NG-RAN)

6a) [Conditional operation] Signaling from SMF to new UPF (or new I-UPF): The SMF may transmit an N4 session establishment request to the UPF.

When the SMF selects a new UPF acting as an I-UPF for a PDU session or when the SMF chooses to insert an I-UPF for a PDU session (which did not have an I-UPF), the SMF may transmit a N4 session establishment request to the UPF. Here, the N4 establishment request provides packet detection to be installed in the I-UPF, data forwarding, enforcement, and reporting rules. PDU session anchor addressing information for a PDU session (PDU session anchor addressing information at an N9 reference point (a reference point between two UPFs)) is also provided to the I-UPF.

When a service request is triggered by the network, and the SMF selects a new UPF to replace the existing UPF (or the existing I-UPF), the SMF may include a data forwarding indication in the N4 session establishment request. The data forwarding indication may indicate to the UPF that second tunnel endpoint needs to be reserved for DL data buffered after being provided from the previous I-UPF.

6b) Signaling from new UPF (or I-UPF) to the SMF: The new UPF (or I-UPF) may transmit an N2 session establishment response (N4 Session establishment response) to the SMF.

The new I-UPF may transmit an N4 session establishment response to the SMF. When the UPF allocates CN tunnel information, the new I-UPF may transmit DL core network (CN) tunnel information for the UPF acting as a PDU session anchor and UL tunnel information of the new I-UPF to the SMF. When a data transfer indication is received, a new UPF (or I-UPF) operating as an N3 terminating point may transmit DL tunnel information of the new I-UPF to the SMF for data transmission from the existing UPF (or I-UPF) to the SMF. If the previous I-UPF resource exists, the SMF may drive a timer to be used in step 22a to release the corresponding resource.

7a) [Conditional operation] Signaling from SMF to UPF (PSA: PDU session anchor) signaling: SMF may transmit an N4 session modification request to the UPF.

When the SMF selects a new UPF to operate as an I-UPF for a PDU session, the SMF may transmit an N4 session modification request message to the PDU session anchor UPF to provide DL tunnel information received from the new I-UPF. When a new I-UPF is added for a PDU session, the UPF (PSA) may provide DL data to the new I-UPF as indicated in the DL tunnel information.

If a service request is triggered by the network and the SMF removes the existing I-UPF and does not replace the existing I-UPF with a new I-UPF, the SMF may include the data forwarding indication in the N4 session modification request. The data forwarding indication may indicate to the UPF (PSA) that the second tunnel endpoint needs to be reserved for buffered DL data received from the existing I-UPF. In this case, the UPF (PSA) may start buffering DL data that may be simultaneously received from the N6 interface.

7b) The UPF (PSA) may transmit an N4 session modification response message to the SMF.

When the UPF (PSA) receives the data forwarding indication, the UPF (PSA) becomes an N3 endpoint and the UPF (PSA) may transmit CN DL tunnel information for the previous UPF (or I-UPF) to the SMF. The SMF may start a timer. If the previous I-UPF resource exists, the SMF may drive a timer to be used in step 22a in order to release the corresponding resource.

When the UPF connected to the RAN is a UPF(PSA) and the SMF receives Nsmf_PDUSession_UpdateSMContext Request (including operation type set to "UP activate" to indicate establishment of user plane resource for the PDU session), if the SMF finds that the PDU session is active, the SMF may initiate an N4 session modification procedure to remove the AN tunnel information and remove the AN tunnel information from the UPF.

8a) [Conditional operation] Signaling from SMF to existing UPF (or I-UPF): The SMF may transmit N4 session modification (including new UPF address, new UPF DL tunnel ID) to the existing UPF (or I-UPF).

When a service request is triggered by the network and the SMF removes the existing UPF (or I-UPF), the SMF may transmit an N4 session modification request message to the existing UPF (or I-UPF) to provide DL tunnel information for buffered DL data. When the SMF allocates a new I-UPF, the DL tunnel information is received from a new UPF (or I-UPF) operating as an N3 endpoint. If the SMF does not allocate a new I-UPF, the DL tunnel information is transmitted from the UPF (PSA) operating as an N3 endpoint. The SMF may drive a timer for monitoring a forwarding tunnel as in step 6b or 7b.

When the SMF receives the Nsmf_PDUSession_UpdateSMContext Request of step 4 (including an operation type set to "UP activate" to instruct establishment of user plane resources for the PDU session), if the SMF knows that the PDU session has been activated, the SMF may remove the AN tunnel information to remove tunnel information of the AN in the UPF and may initiate an N4 session modification procedure.

8b) Signaling from the existing UPF (or I-UPF) to the SMF: The existing UPF (or I-UPF) may transmit an N4 session modification response message to the SMF.

9) [Conditional operation] Signaling from an existing UPF (or I-UPF) to a new UPF (or I-UPF): The existing UPF (or I-UPF) may deliver downlink data buffered with a new UPF (or I-UPF).

When the I-UPF is changed and a forwarding tunnel is established for a new I-UPF, the existing UPF (or I-UPF) transfers the buffered data to the new UPF (or I-UPF) operating as an N3 endpoint.

10) [Conditional operation] Signaling from the existing UPF (or I-UPF) to the UPF (PSA): The existing UPF (or I-UPF) may transfer buffered downlink data to the UPF (PSA).

When the existing I-UPF is removed, the new I-UPF is not allocated t the PDU session, and a forwarding tunnel is established for the UPF (PSA), the existing UPF (or I-UPF) may transfer the data buffered to the existing UPF (or I-UPF) to a new UPF (PSA) acting as an N3 endpoint.

11) [Conditional Operation] Signaling from SMF to AMF: SMF may transmit Nsmf_PDUSession_UpdateSMContext Response to AMF. Nsmf_PDUSession_UpdateSMContext Response may include N2 SM information (PDU session ID, QFI(s) (QoS Flow ID), quality of service (QoS) profile, CN N3 tunnel information, S-NSSAI, user plane security enforcement, UE integrity protection maximum data rate, and a cause. When the UPF connected to the RAN is UPF (PSA), the CN N3 tunnel information is UL tunnel information of UPF (PS A). When the UPF connected to the RAN is a new I-UPF, the CN N3 tunnel information is UL tunnel information of the I-UPF.

For the PDU session in which the SMF determines to accept the activation of the UP connection in step 5, the SMF may generate only N2 SM information and transmit an Nsmf_PDUSession_UpdateSMContext Response to the AMF to establish a user plane. The N2 SM information may include information to be provided by AMF to the NG-RAN. When the SMF determines to change the PSA UPF for the SSC mode 3 PDU session, the SMF may trigger a change of the SSC mode 3 PDU session anchor as an independent procedure after accepting UP activation of the PDU session.

The SMF may reject the activation of the UP of the PDU session by including the cause in the Nsmf_PDUSession_UpdateSMContext Response. The SMF may reject activation of the UP of the PDU session in the following cases, for example:

When the PDU session corresponds to the LADN and the UE is located outside the available area of the LADN as in step 5;

When the AMF informs the SMF that the UE is reachable only for a regulatory prioritized service and the PDU session to be activated is not for the regulatory prioritized service; or When the SMF determines to change the PSA UPF for the requested PDU session as in step 5. In this case, after the SMF transmits the Nsmf_PDUSession_UpdateSMContext Response, the SMF may perform another procedure to instruct the UE to re-establish the PDU session for SSC mode 2.

If the SMF receives a negative response in step 6b due to UPF resource unavailability.

When an EPS bearer ID is assigned to a PDU session, the SMF maps the EPS bearer ID and QFI to N2 SM information and transmits the same to the NG-RAN.

User plane security enforcement information is determined by the SMF during a PDU session establishment procedure. When integrity protection indicates "preferred" or "required", the SMF may also include UE integrity protection maximum data rate in the user plane security enforcement information.

12) Signaling from AMF to (R)AN: The AMF may transmit an N2 request to (R)AN. N2 request may include N2 SM information received from the SMF, security context, handover restriction list, subscribed UE-aggregate maximum bit rate (AMBR), MM NAS service acceptance (a list of recommended cells/TAs/NG-RAN node identifiers, and UE radio capability. Allowed NSSAI for the access type of the UE may be included in the N2 message.

When the UE triggers a service request while in the CM-CONNECTED state, only N2 SM information received from the SMF and MM NAS service acceptance may be included in the N2 request.

While the UE is in the CM-CONNECTED state, when a service request procedure is triggered by the network, only N2 SM information received from the SMF may be included in the N2 request.

When the service request procedure is triggered, the NG-RAN may store the security context and the NAS signaling connection Id for the UE in the CM-IDLE state. When the service request is not triggered by the UE only for the signaling connection, the RAN may store QoS information for a QoS flow of the activated PDU session, an N3 tunnel ID of the UE RAN context, and a handover restriction list.

MM NAS service acceptance may include a PDU session state of the AMF. During the session request procedure, certain local PDU session release may be notified to the UE through the PDU session state. The service accept message includes a PDU session reactivation result. The PDU session reactivation result provides an activation result for the PDU session of the allowed PDU session list which has generated a PDU session in the list of allowed PDU sessions and paging or NAS notification. If the PDU session reactivation result of the PDU session is failure, a cause of the failure may also be provided.

When there are a plurality of PDU sessions related to a plurality of SMFs, the AMF does not need to wait for a response from all SMFs in step 11. However, the AMF must wait for all responses from the plurality of SMFs before transmitting an MM NAS service accept message to the UE.

When step 12 is triggered for PDU session user plane activation, the AMF may include at least one N2 SM information received from the SMF in the N2 request. When there is additional N2 SM information received from the SMF, the AMF may include the additional N2 SM information received from the SMF in a separate N2 message (e.g., N2 tunnel setup request) and transmit the same. Alternatively, when a plurality of SMFs are involved, after all Nsmf_PDUSession_UpdateSMContext response service operations related to the UE are received from the SMF, the AMF may transmit one N2 request message to the (R)AN.

When the NG-RAN node provides a list of recommended cells/TAs/NG-RAN node identifiers during the AN release procedure, the AMF may include a list of recommended cells/TAs/NG-RAN node identifiers in the N2 request. When the NG-RAN determines to enable the RRC inactive state for the UE, the NG-RAN may use this information to allocate the RAN notification area.

The AMF based on the network configuration may include "RRC inactive assistance information" of the UE in the N2 request.

If possible, the AMF may include UE radio capability information in the N2 request and transmit the same to the NG-RAN node.

13) Signaling from (R)AN to UE: The NG-RAN may perform RRC connection reconfiguration with the UE. Specifically, the NG-RAN may perform RRC connection reconfiguration with the UE according to QoS information on all QoS flows of a data radio bearer and a PDU session in which the UP connection is activated. For the UE that was in the CM-IDLE state, if the service request is not triggered by the UE only for a signaling connection, user plane security may be established in this step. For the UE in the CM-IDLE state, when a service request is triggered by the UE only for signaling connection, the AS security context may be established in this step.

When the N2 request includes a NAS message, the NG-RAN may deliver the NAS message to the UE. The UE deletes the context of the PDU session that is not available in 5GC locally.

NOTE 2: The reception of the service accept message may not mean that the user plane radio resource has been successfully activated.

After the user plane radio resource is set up, uplink data from the UE may now be delivered to the NG-RAN. The NG-RAN may transmit uplink data to the UPF address and tunnel ID provided in step 11.

14) [Conditional operation] Signaling from (R)AN to AMF: The (R)AN may transmit acknowledgement for N2 request to the AMF. For example, the (R)AN may transmit an N2 request Ack to the AMF. Here, the N2 request Ack may include N2 SM information (including AN tunnel information, list of accepted QoS flows for the PDU sessions whose UP connections are activated and a list of rejected QoS Flows for the PDU Sessions whose UP connections are activated) and a PDU session ID.

The message including the N2 request Ack may include N2 SM information (e.g., AN tunnel information). When the AMF transmits a separate N2 message in step 11, the NG-RAN may respond to N2 SM information with a separate N2 message.

When a plurality of N2 SM messages are included in the N2 request message of step 12, the N2 request Ack may include a plurality of N2 SM information and information enabling the AMF to associate a response with a related SMF.

15) [Conditional operation] Signaling from AMF to SMF: The AMF may transmit an Nsmf_PDUSession_UpdateSM-Context request (including N2 SM information, RAT type, and access type) per PDU session to the SMF. The AMF may determine the access type and the RAT type based on the global RAN node ID associated with the N2 interface.

When the AMF receives the N2 SM information (one or more) in step 14, the AMF may deliver the N2 SM information to the related SMF per PDU session ID. When a UE time zone is changed compared to a previously reported UE time zone, the AMF may include UE time zone information element (IE) in the Nsmf_PDUSession_UpdateSMContext request.

16) [Optional action] Signaling from SMF to PCF: When dynamic PCC is distributed, SMF performs SMF initiated SM policy modification procedure to initiate notification of new location information to the PCF (if subscribed). The PCF may provide updated policies.

17a) [Conditional operation] Signaling from the SMF to new I-UPF: The SMF may transmit an N4 session modification request to a new I-UPF. The N4 session modification request may include AN tunnel information and a list of accepted QFIs.

When the SMF selects a new SMF to operate as an I-UPF for the PDU session in step 5, the SMF may initiate an N4 session modification procedure for the new I-UPF and provide AN tunnel information. Downlink data from the new I-UPF may be delivered to the NG-RAN and UE.

17b) [Conditional Operation] Signaling from UPF to SMF: The UPF may transmit an N4 session modification response to the SMF.

18a) [Conditional operation] Signaling from SMF to UPF (PSA): The SMF may transmit an N4 session modification request to UPF (PSA). The N4 session modification request may include AN tunnel information and a list of rejected QoS flows.

If the user plane is set up or modified and if there is no I-UPF after modification, the SMF may initiate the N4 session modification procedure for the UPF (PSA) and provide AN tunnel information. Downlink data from the UPF (PSA) may now be delivered to the NG-RAN and UE.

For QoS flows in the list of rejected QoS flows, the SMF may instruct the UPF to remove rules related to the corresponding QoS flow (e.g., packet detection rules, etc.).

18b) [Conditional operation] Signaling from UPF to SMF: The UPF may transmit an N4 session modification response to the SMF.

19) [Conditional operation] Signaling from SMF to AMF: The SMF may transmit an Nsmf_PDUSession_UpdateSM-Context response to the AMF.

20a) [Conditional operation] Signaling from SMF to new UPF (or I-UPF): The SMF may transmit an N4 session modification request to a new UPF (or I-UPF).

When the forwarding tunnel is established for the new I-UPF and when the timer set by the SMF for the forwarding tunnel in step 8a expires, the SMF may transmit an N4 session modification request to the new UPF (or I-UPF) operating as an N3 endpoint to release the forwarding tunnel.

20b) [Conditional operation] Signaling from new UPF (or I-UPF) to SMF: The new UPF (or I-UPF) may transmit an N4 session modification response to the SMF.

The new UPF (or I-UPF) operating as the N3 endpoint may transmit an N4 session modification response to the SMF.

21a) [Conditional operation] Signaling from SMF to UPF (PSA): The SMF may transmit an N4 session modification request to the UPF (PSA).

When the forwarding tunnel is established for the UPF (PSA) and when the timer set by the SMF for the forwarding tunnel in step 7b expires, the SMF may transmit an N4 session modification request to the UPF (PSA) operating as the N3 endpoint to release the forwarding tunnel.

21b) [Conditional operation] Signaling from UPF (PSA) to SMF: UPF (PSA) may transmit an N4 session modification response to the SMF.

UPF (PSA) operating as an N3 endpoint may transmit an N4 session modification response to the SMF.

22a) [Conditional operation] Signaling from SMF to previous UPF: The SMF may transmit an N4 session modification request or an N4 session release request to the previous UPF.

When the SMF determines to continue to use the previous UPF in step 5, the SMF may transmit the N4 session modification request to the previous UPF and provide AN tunnel information.

When the SMF selects a new UPF operating as an I-UPF in step 5 and the previous UPF is not a PSA UPF, the SMF may initiate resource release by transmitting an N4 session release request (including release cause) to the previous I-UPF after the timer in step 6b or 7b expires.

22b) Signaling from previous I-UPF to the SMF: The previous I-UPF may transmit an N4 session modification response or an N4 session release response to the SMF.

The previous UPF checks the modification or release of resources through a N4 session modification response or a N4 session release response.

An example of the UE initiated service request procedure is the same as steps 1 to 22b described above.

For mobility-related events, the AMF may invoke an Namf_EventExposure_Notify service operation after step 4.

When Namf_EventExposure_Notify is received with an indication that the UE is reachable, if the SMF has pending DL data, the SMF may invoke the Namf_Communication_N1N2MessageTransfer service operation for the AMF to establish a user plane for the PDU session. In other cases, the SMF may resume transmitting the DL data notification to the AMF in the case of DL data.

FIG. 12 is a signal flowchart illustrating an exemplary network initiated service request procedure.

The network initiated service request procedure is used when there is a need for activating a user plane for the PDU session to transfer signaling (e.g., N1 signaling to the UE, mobile-terminated short message service (SMS)), mobile terminating (a destination of data is UE) user data with the UE.

When the network initiated service request procedure is triggered by a short message service function (SMSF), PCF, location management function (LMF), gateway mobile location center (GMLC), NEF or UDM, the SMF in FIG. 12 may be replaced by a corresponding NF. For example, when the network initiated service request procedure is triggered by the PCF, the PCF may perform operations performed by the SMF of FIG. 12.

When the UE is in the CM-IDLE state or the CM-CONNECTED state in 3GPP access, the network initiates a network service request procedure.

When the UE is in the CM-IDLE state and asynchronous type communication is not activated, the network may transmit a paging request to the (R)AN/UE. The paging request triggers a UE initiated service request procedure in the UE. When asynchronous type communication is activated, the network stores the received message, and when the UE enters the CM-CONNECTED state, the network may transfer the received message to the (R)AN and/or the UE.

When the UE is in the CM-IDLE state in non-3GPP access and the UE is simultaneously registered for 3GPP access and non-3GPP access in one public land mobile network (PLMN), the network may initiate the network initiated service request procedure via 3GPP access.

When the UE is in the CM-IDLE state in 3GPP access, in the CM-CONNECTED state in non-3GPP access, and the UE is simultaneously registered for 3GPP access and non-3GPP access in one PLMN, the network may initiate the network initiated service request procedure through 3GPP access.

In the network initiated service request procedure, both SMF and UPF belong to a PLMN serving the UE. For example, in a home routed roaming case, the SMF and UPF of a HPLMN are not affected by a service request procedure (that is, the SMF and UPF of the HPLMN are not involved in the service request procedure).

The procedure of FIG. 12 deals with a non exhaustive list of use-cases for 3GPP access as follows (detailed conditions to which each step is applied are described in the procedure below.):

When the SMF needs to set up an N3 tunnel in order to deliver a downlink packet for a PDU session to the UE and the UE is in the CM-IDLE state: Step 3a includes an N2 message and step 4b (paging) may be performed.

When the SMF needs to set up an N3 tunnel in order to deliver a downlink packet for a PDU session to the UE and the UE is in a CM-CONNECTED state: Step 3a includes an N2 message and step 4a (UP activation) may be performed.

If an NF (e.g., SMF, SMSF, LMF or NEF) needs to transmit an N1 message to the UE and the UE is in the CM-IDLE state: Step 3a includes an N1 message, step 3b includes a cause "Attempting to reach UE", and step 4b (paging) occurs.

When the NF (e.g., SMSF, PCF, or UDM) triggers the AMF to set up a NAS connection with the UE and the UE is in the CM-IDLE state: Trigger differ according to procedures, step 4b (paging) is occurs.

1) When the UPF receives downlink data for the PDU session and AN tunnel information for the PDU session is not stored in the UPF, the UPF may buffer the downlink data or transfer the downlink data to the SMF based on an instruction received from the SMF.

2a) Signaling from the UPF to the SMF: The UPF may transmit a data notification to the SMF. The data notification may include an N4 session ID, information for identifying a QoS flow for a DL data packet, and DSCP.

When the first downlink data for a certain QoS flow arrives, if the SMF has not previously informed the UPF not to transmit a data notification to the SMF, the UPF may transmit a data notification message to the SMF. For reference, if the SMF previously informs the UPF not to transmit the data notification to the SMF, follow-up steps may be omitted.

When the UPF receives a downlink data packet for a different QoS flow in the same PDU session, the UPF may transmit another data notification message to the SMF.

When a paging policy differentiation feature is supported by the UPF and a PDU session type is IP, the UPF may include a DSCP of a TOS (Type of Service)(IPv4)/TC (Traffic Class)(IPv6) received from an IP header of the downlink data packet and information for identifying QoS flows for DL data packets in the data notification.

2b) Signaling from SMF to UPF: A data notification Ack may be transmitted.

2c) When the SMF instructs the UPF that it will buffer the data packet, the UPF may deliver the downlink data packet to the SMF.

When the paging policy differentiation feature is supported by the SMF, the SMF may determine a paging policy indication based on the DSCP of the TOS(IPv4)/TC(IPv6) value received from the IP header of the downlink data packet and identify a QFI of the QoS flow for the DL data packet.

3a) [Conditional operation] i) Signaling from SMF to AMF: The SMF may transmit a Namf_ Communication_ N1N2MessageTransfer (including SUPI, PDU session ID, N2 SM information (including QFI(s), QoS profile(s), CN N3 tunnel information, S-NSSAI, and paging policy indication), area of validity for N2 SM information, ARP (Allocation and Retention Priority) including paging policy indication, 5QI and N1N2TransferFailure notification target address) to the AMF. Or, ii) signaling from NF to AMF: NF may transmit Namf_Communication_ N1N2Message Transfer (including SUPI and N1 messages) to the AMF.

Upon receiving the data notification message, the SMF may perform an operation to support the LADN for a PDU session corresponding to the LADN. The SMF may notify the UPF that transmitted the data notification to discard downlink data for the PDU session and/or not to provide an additional data notification message.

In other cases, the SMF may determine whether to contact the AMF. The SMF may not contact the AMF in the following cases:

If the SMF previously notified that the UE is unreachable; or

If the UE is reachable only for a regulatory prioritized service and the PDU session is not a regulatory prioritized service.

The SMF determines the AMF, and the SMF may invoke Namf_Communication_N1N2MessageTransfer to the AMF by including the PDU session ID derived from the N4 session ID received in step 2a.

If the SMF receives any additional data notification message or downlink data packet while waiting for the user plane connection to be activated and if the SMF buffers a data packet for a QoS flow related to a priority (e.g., ARP priority level) higher than the priority related to the previous data notification message or downlink data packet, the SMF may invoke a new Namf_Communication_ N1N2 MessageTransfer indicating a higher priority ARP and PDU session ID to the AMF.

When the SMF receives a message from a new AMF (not the AMF to which the SMF previously called the Namf_Communication_N1N2MessageTransfer), while waiting for the user plane connection to be activated, the SMF may re-invoke Namf_Communication_ N1N2 MessageTransfer to the new AMF.

When supporting paging policy differentiation, the SMF may show a 5QI related to QFI of step 2a, packet received in step 2c, or a paging policy indication related to downlink data received from ARP or UPF or downlink data triggered a data notification message in the Namf_Communication_ N1N2MessageTransfer.

NOTE 1: The AMF may receive a request message to perform signaling to the UE/RAN (e.g., network-initiated deregistration, SMF initiated PDU session modification, etc.) from other network functions (NFs). When the UE is in the CM-CONNECTED state and the AMF delivers only an N1 message to the UE, the flow continues in step 6 below.

N2 SM information is optional. For example, when the SMF intends to transmit a PDU session modification command only to update the UE to the PCO, N2 SM information may be optional.

3b) [Conditional operation] The AMF may respond to the SMF.

If the UE is in the CM-IDLE state for the AMF and the AMF may page the UE, the AMF may directly transmit a Namf_Communication_N1N2MessageTransfer response to the SMF with the cause "Attempting to reach UE". The cause "Attempting to reach UE" may indicate to the SMF that the N2 SM information provided in step 3a may be ignored by the AMF if the UE is reachable and that the SMF is requested to provide the N2 SM information again.

While waiting for the UE to respond to the previous paging request, when the AMF receives a Namf_ Communication_N1N2MessageTransfer request message having the same priority or lower priority as the previous message triggering paging or when the AMF determines not to trigger an additional paging request for the UE based on a local policy, the AMF may reject the Namf_Communication_ N1N2MessageTransfer request message.

When the UE is in the CM-CONNECTED state in the AMF, the AMF may immediately transmit a Namf_ Communication_N1N2MessageTransfer response to the SMF with a "N1/N2 transfer success" cause.

If the UE is in the CM-IDLE state and the AMF determines that the UE is not reachable for paging, the AMF may transmit a Namf_Communication_N1N2MessageTransfer response to the SMF or other network functions (NF transmitting the request message to the AMF in step 3a). Alternatively, the AMF may perform asynchronous type communication and store UE context based on the received message. When asynchronous type communication is invoked, when the UE is reachable (e.g., when the UE enters the CM-CONNECTED state), the AMF may initiate communication with the UE and the (R)AN.

When the AMF determines that the UE is not reachable for the SMF (e.g., as the UE is in a mobile initiated connection only (MICO) mode or the UE is registered only through non-3GPP access and the UE is in the CM-IDLE state), the AMF may reject the request from the SMF. When the SMF does not subscribe to a UE reachability event, the AMF may include an indication (indication that the SMF does not need to trigger a Namf_Communication_ N1N2MessageTransfer request for the AMF) in the rejection message. The AMF may store the indication that the SMF has been informed that the UE is not reachable.

When the UE is not in the MICO mode and the AMF detects that the UE is in a non-allowed Area, the AMF may reject a request from the SMF and notify the SMF that the UE is reachable only for the regulatory prioritized service, unless the request from the SMF is for the regulation priority service. The AMF may store the indication that the SMF has been informed that the UE is only reachable for the regulatory prioritized service.

If a registration procedure with an AMF change is in progress when a previous AMF receives Namf_Communication_ N1N2MessageTransfer, the previous AMF may reject the request with an indication that Namf_Communication_N1N2MessageTransfer has been temporarily rejected.

When a Namf_Communication_N1N2MessageTransfer response is received with the indication that the request has been temporarily rejected, the SMF may start a locally set guard timer and may wait until a random message comes from the AMF. When a message from the AMF is received, the SMF may re-call Namf_Communication_ N1N2 MessageTransfer (together with N2 SM information) to the AMF that transmitted the message. In other cases, the SMF may perform step 3a when the guard timer expires. If the SMF determines that control region buffering is applied, the SMF may request the UPF to start transmitting a downlink data PDU to the SMF.

3c) [Conditional operation] SMF may respond to UPF. For example, the SMF may transmit a failure indication to the UPF.

The SMF may notify the UPF of a user plane setup failure.

When the SMF receives an indication that the UE is not reachable or that the UE is reachable only for the regulation priority service from the AMF, the SMF may perform the following operation based on the network policy:

The SMF may instruct the UPF to stop sending data notifications;

The SMF may instruct the UPF to stop buffering the DL data and discard the buffered data;

The SMF may instruct the UPF to stop sending data notifications, stop buffering DL data, and discard the buffered data; or While the UE is not reachable, the SMF suppresses transmitting an additional Namf_Communication_ N1N2MessageTransfer message for DL data.

Based on the operator policy, the SMF may apply a suspension of the charging procedure.

When the SMF receives an indication from the AMF that the Namf_Communication_N1N2MessageTransfer requested by the SMF has been temporarily rejected, the SMF may instruct the UPF to apply temporary buffering based on the network policy.

4a) [Conditional operation] When the UE is in the CM-CONNECTED state in the access related to the PDU session ID received from the SMF in step 3a, steps 12 to 22 of FIGS. 11a to 11c may be performed without transmitting a paging message to the (R)AN node and the UE to activate the user plane connection for the PDU session (e.g., radio resources and N3 tunnels may be established). In step 12 of FIGS. 11a to 11c, the AMF may not transmit a NAS service accept message to the UE. Parts other than steps 12 to 22 of FIGS. 11a to 11c may be omitted.

4b) [Conditional operation] Even when the UE is in the CM-IDLE state in 3GPP access, the PDU session ID received from the SMF in step 3a is related to the 3GPP access, and the UE is in the CM-CONNECTED state for non-3GPP access, if the AMF determines to notify the UE through 3GPP access based on the local policy, the AMF may transmit a paging message to the NG-RAN node through 3GPP access.

When the UE is simultaneously registered through 3GPP access and non-3GPP access in the same PLMN, the UE is in the CM-IDLE state in 3GPP access and non-3GPP access mode, and the PDU session ID of step 3a is related to the non-3GPP access, the AMF may transmit a paging message related to the access "non-3GPP" to the NG-RAN node through 3GPP access.

When the UE is in RM (Registration Management)-REGISTERED state and CM-IDLE state and the UE is reachable in 3GPP access, the AMF may transmit a paging message (including NAS ID for paging, registration area list, paging DRX length, paging priority indication, and access associated to the PDU session) to the (R)AN node belonging to the registration area in which the UE is registered. When the paging message is received from the AMF, the NG-RAN node may page the UE by including access related to the PDU session in the paging message.

For reference, two RM states of an RM-DEREGISTERED state and an RM-REGISTERED state are used in the UE and the AMF to reflect the registration state of the UE in the PLMN.

When supporting paging policy differentiation, the paging strategy may be set in the AMF for different combinations of DNN, paging policy indication, ARP, and 5QI.

For the RRC-inactive state, a paging strategy may be set in (R)AN for other combinations of paging policy indication, ARP, and 5QI.

The paging priority indication may be included only in the following cases:
When the AMF receives a Namf_Communication_ N1N2MessageTransfer message including an ARP value related to priority services (e.g., MPS, MCS) set by an operator.
One paging priority level may be used for multiple ARP values. Mapping of the ARP value for the paging priority level may be set in the AMF and NG-RAN according to an operator policy.

The (R)AN may prioritize paging of the UE according to the paging priority indication (or paging policy indicator).

While waiting for a response from the UE to the paging request message transmitted without a paging priority indication (or paging policy indicator), if the AMF receives a Namf_Communication_N1N2MessageTransfer message indicating an ARP value related to the priority service (e.g., MPS, MCS) set by the operator, the AMF may transmit another paging message together with an appropriate paging priority (or paging policy indicator). For the Namf_ Communication_N1N2MessageTransfer message received later having the same priority or higher priority, the AMF may determine whether to transmit a paging message with an appropriate paging priority based on the local policy.

Paging strategies may include the following:
Paging retransmission scheme (e.g., how often paging is repeated or at what time interval paging is repeated);

Determine whether to transmit a paging message to the (R)AN node during specific AMF high load conditions;

Whether to apply sub-area-based paging (e.g., first paging in the last known cell-id or TA and retransmission in all registered TAs)

NOTE 2: Setting a paging priority (or paging policy indicator) in the paging message is independent of any paging strategy.

In order to reduce the signaling load and network resources used to successfully page the UE, the AMF and (R)AN may support additional paging optimization using at least one or more of the following means:

By the AMF implementing specific paging strategies (e.g., the AMF may send an N2 paging message to the (R)AN node that has recently served the UE);

By that AMF taking into account information (information on recommended cells and NG-RAN nodes) on recommended cells and NG-RAN nodes provided by (R)AN when switching to the CM-IDLE state. The AMF may determine the (R)AN node to be paged by considering the (R)AN node-related part of the information, include the information on the recommended cells in the N2 paging message, and provide the information to each of the (R)AN nodes;

By the (R)AN taking into account paging attempt count information provided by the AMF in paging.

When the UE radio capability for paging information is available in the AMF, the AMF may include the UE radio capability for paging information in the N2 paging message and transmit the corresponding N2 paging message to the (R)AN node.

When information on recommended cells and NG-RAN nodes are available in the AMF, the AMF may determine the (R)AN node for paging in consideration of the information, and when paging the (R)AN node, the AMF may transparently transmit the information on the recommended cell to the (R)AN node.

The AMF may include paging attempt count information in the N2 paging message. The paging attempt count information may be the same for all (R)ANs selected for paging by the AMF.

4c) [Conditional operation] When the UE is simultaneously registered for 3GPP access and non-3GPP access in the same PLMN, the UE is in the CM-CONNECTED state in 3GPP access, and the PDU session ID of step 3a is associated with the non-3GPP access, the AMF may transmit a NAS notification message including a non-3GPP access type to the UE through 3GPP access and may set a notification timer. When step 4c is performed, step 5 may be omitted.

When the UE is simultaneously registered for 3GPP access and non-3GPP access in the same PLMN, the UE is in the CM-IDL state in 3GPP access and in the CM-CONNECTED state in non-3GPP access, the PDU session ID of step 3a is associated with 3GPP access, and the AMF determines to notify the UE through the non-3GPP access based on the local policy, the AMF may transmit a NAS notification message including the 3GPP access type to the UE through the non-3GPP access and set a notification timer.

5) [Conditional operation] Signaling from AMF to SMF: The AMF may transmit a notification related to failure of Namf_Communication_N1N2Transfer to the SMF. For example, the AMF may transmit a Namf_Communication_N1N2TransferFailure notification to the SMF.

The AMF oversees the paging procedure using a timer. If the AMF fails to receive a response with respect to the paging request message from the UE, the AMF may apply additional paging according to any available paging strategy described in step 4b.

If the UE does not respond to the paging, the AMF sends a Namf_Communications_N1N2MessageTransfer Failure notification to a notification target address provided by the SMF in step 3a to the SMF to notify the SMF unless the AMF recognizes an ongoing MM procedure that prevents the UE from responding to the SMF. Here, the AMF recognizes the ongoing MM procedure that prevents the UE from responding may be a case in which, for example, the AMF receives an N14 context request message indicating that the UE performs a registration procedure with another AMF.

When the Namf_Communication_N1N2TransferFailure notification is received, the SMF may notify the UPF.

6) When the UE is in the CM-IDLE state in 3GPP access and a paging request for a PDU session related to 3GPP access is received, the UE may initiate the UE initiated service request procedure described in FIGS. 11a to 11c. In step 4 of FIG. 12A, the AMF may call a Nsmf_PDUSession_UpdateSMContext request associated with a PDU session identified in the service request message (excluding the PDU session for the PDU session ID included in Namf_Communication_N1N2MessageTransfer in step 3a of FIG. 12) to the SMF. To support the transfer of buffered data, the SMF may instruct the UPF to establish a data transfer tunnel between the old UPF and the new UPF or PSA as described in steps 6a, 7a, and 8b of FIG. 12A.

When the UE is in the CM-IDLE state in both non-3GPP access and 3GPP access and receives a paging request for a PDU session associated with non-3GPP access, the UE may initiate the UE initiated service request procedure described in FIGS. 11a to 11c. Here, the UE initiated service request procedure may include a list of allowed PDU sessions that may be re-activated through 3GPP access according to the UE policy and whether an S-NSSAI of the PDU session is included in the allowed NSSAI for 3GPP access. If there is no PDU session that may be re-activated through 3GPP access, the UE may include a list of empty allowed PDU sessions. When the AMF receives a service request message from the UE through the non-3GPP access (e.g., due to the UE successfully connecting to the non-3GPP access), the AMF may stop the paging procedure and process the received service request procedure. When the AMF receives the service request message and the list of allowed PDU sessions provided by the UE does not include the PDU session for the UE that has been paged, the AMF may invoke the Namf_EventExposure_Notify service to notify the SMF that the UE is reachable but did not accept re-activation of the PDU session.

When the UE is in the CM-IDLE state in non-3GPP access and in the CM-CONNECTED state in 3GPP access, upon receiving the NAS notification message including the non-3GPP access type through 3GPP access, the UE may initiate UE initiated service request procedure described in FIGS. 11a to 11c. Here, the UE initiated service request procedure may include a list of allowed PDU sessions that may be re-activated through 3GPP access according to the UE policy and whether the S-NSSAI of this PDU session is included in the allowed NSSAI for 3GPP access. If there is no PDU session that may be re-activated through 3GPP access, the UE may include a list of empty allowed PDU sessions. When the AMF receives the service request message and the list of the allowed PDU sessions provided by the UE does not include a PDU session for the UE that has been notified, the AMF may call the Namf_EventExposure_Notify service to notify the SMF that the UE is reachable but did not accept re-activation of the PDU session. When the AMF receives the service request message from the UE through non-3GPP access, the AMF may stop the notification timer and process the received service request procedure.

When the UE is in the CM-IDLE state in 3GPP access and in the CM-CONNECTED state in non-3GPP access, upon receiving the NAS notification identifying the 3GPP access type through the non-3GPP access, the UE may initiate the UE initiated service request procedure described in FIGS. 11a to 11c through 3GPP access if the 3GPP access is available. If the AMF does not receive the service request message before the notification timer expires, the AMF may page the UE through 3GPP access or notify the SMF that the UE was unable to re-activate the PDU session.

7) The UPF may transmit buffered downlink data to the UE through the (R)AN node that has performed the service request procedure.

The network may transmit downlink signaling when a network initiated service request procedure is initiated according to a request from another network described in step 3a.

<Multi-Access (MA) PDU Session>

In the prior art, the MA PDU session is a session that can be serviced simultaneously with 3GPP access and non-3GPP access using one PDU session.

Figure 13:
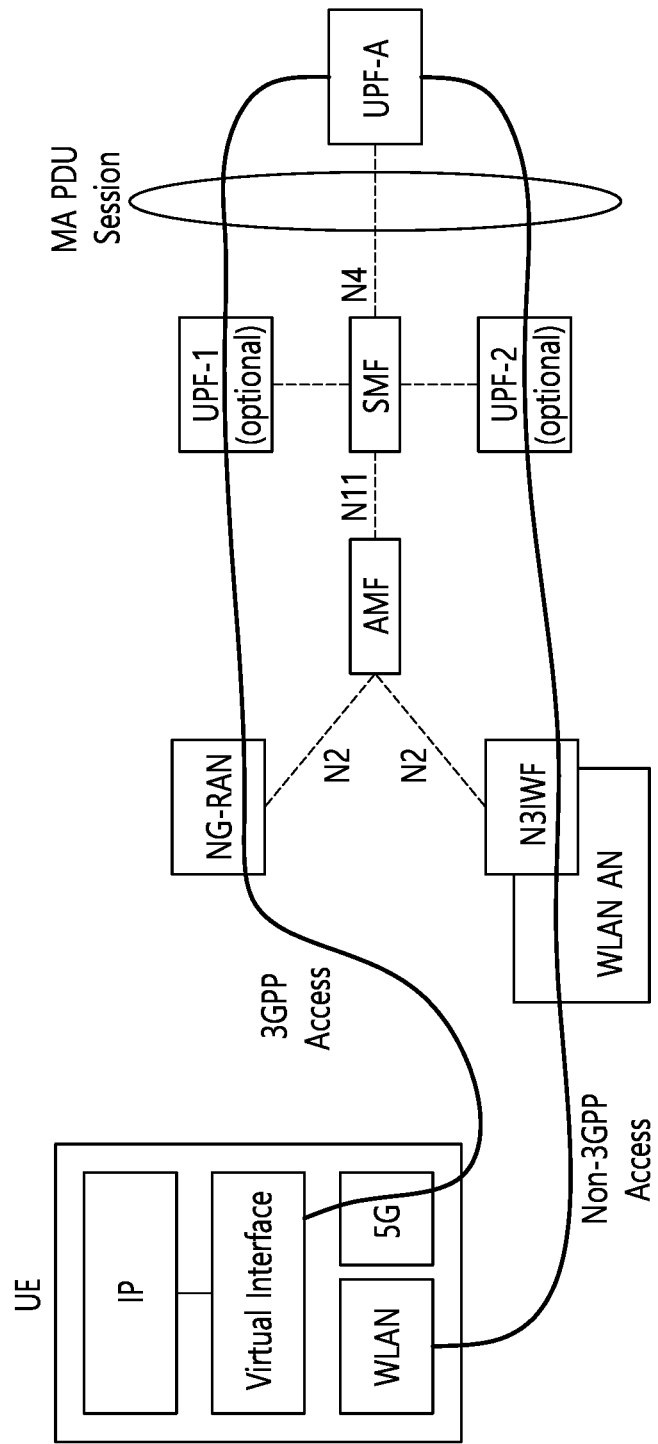
FIG. 13 shows an example in which a MA PDU session is generated.

FIG. 13 shows an example in which a MA PDU session is generated.

In FIG. 13, the MA PDU session is one PDU session and has a separate session tunnel for each access. One is established on 3GPP access, and the other PDU session is established on untrusted non-3GPP access (e.g., WLAN AN).

Since the MA PDU session is one session, the MA PDU session has the following characteristics.
(i) one DNN;
(ii) one UPF Anchor (UPF-A);
(iii) one PDU type (e.g., IPv6);
(iv) one session IP address
(v) one SSC mode
(vi) one HPLMN S-NSSAI.

The MA PDU session enables a multipath data link between the UE and UPF-A. This can be implemented below the IP layer.

A MA PDU session may be established through one of the following procedures.
(i) It can be established through two separate PDU session establishment procedures. This is called individual establishment.
(ii) It may be established through one MA PDU session establishment procedure. That is, the MA PDU session is simultaneously established in two accesses with one session establishment request. This is called binding establishment.

After the MA PDU session is established, Session Management (SM) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure on non-3GPP access in order to add non-3GPP access to the MA PDU session created on 3GPP access. The request type in the establishment request message for adding the second access may be set to "MA PDU Request".

B. Binding Establishment.

A MA PDU session may be simultaneously established for 3GPP access and non-3GPP access through one procedure. Such one procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

<Access Traffic Steering, Switching & Splitting (ATSSS)>

The ATSSS function may be an optional feature supported by the UE and the 5GC network.

The ATSSS function may enable a multi-access PDU Connectivity Service. For example, the ATSSS function may exchange PDUs between the UE and the data network by using one 3GPP access network and one non-3GPP access network simultaneously, and using two independent N3/N9 tunnels between the PSA and RAN/AN. The multi-access PDU connection service may be realized by establishing a Multi-Access PDU (MA PDU) Session. The MA PDU session may be, for example, a PDU session with user-plane resources in two access networks.

If the UE is registered through 3GPP and non-3GPP access, or if the UE is registered with only one access, the UE may request a MA PDU session.

After the MA PDU session is established, if user-plane resources exist in both access networks, in order to determine how to distribute uplink traffic through the two access networks, the UE applies network-provided policies (eg, ATSSS rules) and exchange local conditions (eg, network interface availability, signal loss conditions, user preferences, etc.). Similarly, the UPF anchor of the MA PDU session applies the network provision policy (e.g. N4 rule) and feedback information received from the UE through the user plane (e.g. access network unavailability or availability) to determine to distribute downlink traffic to two N3/N9 tunnel and to two access networks. If only one access network has a user plane resource, to trigger the establishment or activation of a user plane resource through the other access, the UE may apply the ATSSS rule, and may consider local conditions.

The MA PDU session type may be, for example, one of IPv4, IPv6, IPv4v6 and Ethernet. Unstructured types may not be supported in the current version.

ATSSS functionality can be supported over any type of access network. Here, all types of access networks may include untrusted non-3GPP access networks and trusted non-3GPP access networks, wireline 5G access networks, and the like. As long as the MA PDU session can be established over any type of access network, the ATSSS function can be supported over any type of access network.

Hereinafter, a function for enabling ATSSS will be described.

First, the MA PDU session will be described. MA PDU sessions can be managed using the session management function with the following additions and modifications:
1) If the UE wants to request a new MA PDU session:
When the UE is registered in the same PLMN through 3GPP access and non-3GPP access, the UE may transmit a PDU session establishment request message including "MA PDU Request" through one of the two accesses. The AMF may inform the SMF that the UE is registered via both accesses. The AMF notifying the SMF may trigger establishment of user-plane resources in both accesses and two N3/N9 tunnels between the PDU session anchor (PSA) and the RAN/AN.

When the UE is registered with different PLMNs through 3GPP access and non-3GPP access, the UE may transmit a PDU session establishment request message including "MA PDU Request" through one of the two accesses. After this PDU session is established in one N3/N9 tunnel between the PSA and (R)AN/AN, the UE may transmit a PDU session establishment request message including "MA PDU Request" and the same PDU session ID via the other access. User-plane resources in both accesses and two N3/N9 tunnels between PSA and RAN/AN may be established.

If the UE is registered through only one access, the UE may transmit a PDU session establishment request message including an indication of "MA PDU Request" through the access in which the UE is registered. One N3/N9 tunnel between PSA and RAN/AN and user-plane resources in this access may be established. After the UE is registered through the second access, the UE may establish user-plane resources in the second access.

In the PDU session establishment request message transmitted to request a new MA PDU session, the UE may provide ATSSS capability information of the UE. ATSSS capability (capabilities) information may include information about the steering mode and steering functionalities supported by the UE.

If the UE indicates that it can support ATSSS-LL (Low Layer) function with any steering mode, and the network accepts to activate this function, the network may provide UE Measurement Assistance Information to the UE. And, the network may provide one or more ATSSS rules to the UE.

The UE indicates that the UE can support the MPTCP function in any steering mode, and can support the ATSSS-LL function only in the Active-Standby steering mode, and the network may accept to activate these functions. In this case, the network provides MPTCP proxy information to the UE, the network may allocate one IP address/prefix for the MA PDU session and two additional IP addresses/prefixes called "link-specific multipath" to the UE. Additionally, the network may provide the UE with UE measurement assistance information and provide the UE with one or more ATSSS rules, including ATSSS rules for non-MPTCP traffic. ATSSS rules for non-MPTCP traffic can use the ATSSS-LL function and Active-Standby steering mode to indicate how non-MPTCP traffic is transmitted over 3GPP access and non-3GPP access in the uplink direction.

If the UE indicates that it can support MPTCP functions with all steering modes and ATSSS-LL functions with all steering modes, and the network accepts to enable these functions, the network may provide MPTCP proxy information to the UE. In addition, the network may allocate one IP address/prefix for the MA PDU session and two additional IP addresses/prefix called "link-specific multipath" to the UE. The network may provide UE measurement assistance information and one or more ATSSS rules to the UE.

If the UE requests S-NSSAI, S-NSSAI shall be allowed in both accesses. Otherwise, the MA PDU session may not be established.

The SMF may determine ATSSS capabilities supported for the MA PDU session, based on ATSSS capabilities provided by the UE and the DNN configuration of the SMF. The SMF may perform the following actions:

a) if the UE includes "MPTCP functionality with any steering mode and ATSSS-LL functionality with only Active-Standby steering mode" in the ATSSS capability; and a-1) If the DNN configuration allows MPTCP and ATSSS-LL for all steering modes, for the MA PDU session, (1) MPTCP and ATSSS-LL may be possible for all steering modes in downlink, (2) uplink MPTCP and ATSSS-LL may be possible in Active-Standby mode; or a-2) If the DNN configuration allows MPTCP for all steering mode and allows ATSSS-LL for Active-Standby mode, for MA PDU session, MPTCP and ATSSS-LL are possible in Active-Standby mode in uplink and downlink.

b) If the UE includes "ATSSS-LL functionality with any steering mode" in the ATSSS capability, and the DNN settings allow ATSSS-LL with any steering mode, the MA PDU session will cover all steering modes in uplink and downlink. ATSSS-LL may be possible.

c) If the UE includes "MPTCP functionality with any steering mode and ATSSS-LL functionality with any steering mode" in the ATSSS capability, and the DNN configuration allow MPTCP and ATSSS-LL for all steering modes, for the MA PDU session, MPTCP and ATSSS-LL may be possible with all steering modes in uplink and downlink.

The SMF may provide the ATSSS capability of the MA PDU session to the PCF while the PDU session establishment procedure is being performed.

Policy and charging control (PCC) rules provided by the PCF may include ATSSS control information. The PCC rule and ATSSS control information may be used by the SMF to derive the ATSSS rule for the UE and the N4 rule for the UPF. For MA PDU session, if dynamic PCC rule is not used, SMF may provide ATSSS rule and N4 rule to UE and UPF, respectively, based on local configuration (eg, local configuration based on DNN or S-NSSAI).

The UE may receive the ATSSS rule from the SMF. The ATSSS rule may indicate how to route uplink traffic through 3GPP access and non-3GPP access. Similarly, the UPF may receive the N4 rule from the SMF. The N4 rule may indicate how to route downlink traffic through 3GPP access and non-3GPP access.

When the SMF receives the PDU session establishment request message including the "MA PDU Request" indication, and if UP security protection is required for the PDU session, the SMF may confirm the establishment of the MA PDU session only if UP security protection requiring 3GPP access can be enforced. The SMF need not to check whether it can enforce UP security protections that require non-3GPP access.

2) After the MA PDU session establishment procedure (ie, after the MA PDU session is established), the following description may be applied:

at any given time, a MA PDU session may have user-plane resources in both 3GPP access and non-3GPP access, may have user-plane resources in only one access, or may not have user-plane resources in any access.

Even if the UE deregisters from one access, AMF, SMF, PCF and UPF can maintain their MA PDU session contexts if the UE is registered with another access When the UE deregisters from one access and the UE is registered for another access, the AMF may inform the SMF that the access type for the MA PDU session has become unavailable. Thereafter, the SMF may inform the UPF that the access type of the deregistered access has become unavailable and that the N3/N9 tunnel for the corresponding access type has been released.

When the UE wants to add a user-plane resource in one access of the MA PDU session (eg, based on access network performance measurement and/or ATSSS rules), the UE may transmit a PDU session establishment request message over this access. Here, the PDU session establishment request message may include a PDU session ID of the MA PDU session and an "MA PDU Request" indication. For this access, if N3/N9 do not exist, N3/N9 for this access may be established.

When the UE wants to re-activate a user-plane resource in one access of the MA PDU session (eg, based on access network performance measurement and/or ATSSS rules), the UE may initiate a UE Triggered Service Request procedure through this access.

3) When the network wants to re-activate the user-plane resource through 3GPP access or non-3GPP access of the MA PDU session, the network may initiate a Network Triggered Service Request procedure.

A MA PDU session may also be established in one of the following cases:

a) when the establishment of the MA PDU session is explicitly requested by the ATSSS-capable UE; or b) If the ATSSS-capable UE requests a single-access PDU session, but the network decides to establish the MA PDU session instead, the MA PDU session may be established. This example may correspond to an optional scenario, this example may occur when a UE that requires single access for a PDU session has requested a single-access PDU session, but when there are no a policy (e.g. UE route selection policy (URSP) rule) and local restrictions.

When the UE moves from EPS to 5GS, a MA PDU session may be established while the PDU session modification procedure is performed.

An ATSSS-capable UE may decide to request a MA PDU session based on the provided URSP rule. In particular, if the URSP rule triggers the UE to establish a new PDU session, and if the access type preference component of the URSP rule indicates "Multi-Access", the UE may request an MA PDU session when the UE applies the URSP rule.

Hereinafter, a policy for ATSSS control will be described.

While the establishment of the MA PDU session is being performed, if a dynamic PCC is used for the MA PDU session, the PCF may perform ATSSS policy determination and create a PCC rule including ATSSS policy control information. Here, the ATSS policy control information may be used to determine how uplink traffic and downlink traffic of the MA PDU session are distributed through 3GPP access and non-3GPP access.

The SMF may receive the PCC rule together with the ATSSS policy control information from the PCF. And, the SMF may map these rules to (a) the ATSSS rule transmitted to the UE and (b) the N4 rule transmitted to the UPF. The ATSSS rule may be a prioritized list of rules that the UE applies to enforce the ATSSS policy in the uplink direction. And, the N4 rule may be applied by the UPF to enforce the ATSSS policy in the downlink direction.

When a MA PDU session is created or the MA PDU session is updated by the SMF (for example, after the SMF receives an updated (or new) PCC rule from the PCF), the ATSSS rule may be transmitted to the UE along with the NAS message. Similarly, the N4 rule may be transmitted to the UPF when a MA PDU session is created or the MA PDU session is updated by the SMF.

For ATSSS, Quality of Service (QoS) may be supported. Hereinafter, QoS support (QoS support) will be described.

The 5G QoS model for single access PDU sessions can also be applied to MA PDU sessions. For example, the QoS flow may be the finest granularity of QoS differentiation in the MA PDU session. Compared to a single-access PDU session, one difference is that in the MA PDU session, there may be separate user plane tunnels between the AN and the PSA, and each user plane tunnel may be related to a specific access (either 3GPP access or non-3GPP access). However, QoS flows may not be associated with a particular access. That is, since QoS flows are access-agnostic, the same QoS can be supported when traffic is distributed through 3GPP access and non-3GPP access. SMF may provide the same QoS Flow ID (QFI) in 3GPP access and non-3GPP access, so that the same QoS is supported in both access.

In ATSSS, the Steering function may be supported. Hereinafter, the Steering function will be described.

The functionality of ATSSS-capable UE (ATSSS-capable UE) that ATSSS-capable UE (ATSSS-capable UE) can steer (coordinate), switch, and split the traffic of the MA PDU session through 3GPP access and non-3GPP access can be referred to as "steering functionality". An ATSSS capable UE may support one or more of the following types of steering functions:

1) A high-layer steering function that operates above the Internet Protocol (IP) layer may be supported. For example, a high-layer steering function "MPTCP functionality" applying a Multipath Transmission Control Protocol (MPTCP) protocol may be supported. Here, this steering function ("MPTCP functionality") can be applied to steer, switch, and split TCP traffic of applications that are allowed to use MPTCP. The MPTCP function of the UE may communicate with the associated MPTCP Proxy function of the UPF via the 3GPP user plane and/or the non-3GPP user plane.

2) A low-layer steering function that operates below the IP layer may be supported. For example, a low-layer steering function called "ATSSS Low-Layer functionality" or ATSSS-LL functionality may be supported. Here, this steering function ("ATSSS Low-Layer functionality" or ATSSS-LL functionality) can be applied to steer, switch, and split any type of traffic (including TCP traffic, User Datagram Protocol (UDP) traffic, Ethernet traffic, etc.). ATSSS-LL functionality must be suppurted in an Ethernet-type MA PDU session. In the network, one UPF supporting ATSSS-LL must exist in the data path of the MA PDU session.

The UE may indicate to the network the steering function and steering mode supported by the UE by including one of the following in the UE ATSSS Capability:

1) ATSSS-LL functionality with any steering mode. In this case, the UE may indicate that it can steer, switch and split all traffic of the MA PDU session using the ATSSS-LL function with all steering modes.

2) MPTCP functionality with any steering mode and ATSSS-LL functionality with only Active-Standby steering mode. In this case, ATSSS-LL function with only MPTCP function and Active-Standby steering mode with all steering modes can be supported. In this case, the UE may indicate:

2-a) The UE may use the MPTCP function with all steering modes to steer, switch and split the MPTCP traffic of the MA PDU session.

2-b) The UE may use the ATSSS-LL function with active-standby steering mode to steer, switch and split all other traffic (eg, non-MPTCP traffic) of the MA PDU session.

3) MPTCP functionality with any steering mode and ATSSS-LL functionality with any steering mode. In this case, the MPTCP function with all steering modes and the ATSSS-LL function with all steering modes may be supported. In this case, the UE may indicate:

3-a) The UE may use the MPTCP function with all steering modes to steer, switch and split the MPTCP traffic of the MA PDU session.

3-b) The UE can use the ATSSS-LL function with any steering mode to steer, switch and split all other traffic (i.e. non-MPTCP traffic) in the MA PDU session.

<Packet Switch (PS) Data Off>

With the vast increase in the data service usage of users, the data capacity in the mobile communication network is increasing. Accordingly, methods allowing operators to restrict unnecessary background traffic of a user equipment (UE) or allowing users to restrict unwanted usage of data (or signaling) have been discussed. As an example of such a solution, a feature referred to as "PS Data Off" may be implemented in some systems, such as in EPS and 5GS.

In some implementations, if 3GPP PS Data Off feature is activated by a user, then traffic through 3GPP access (e.g., all Internet Protocol (IP) packets, and all traffic for Unstructured and Ethernet data) is prevented, with the exception of data related to certain exempted services (e.g., 3GPP PS Data Off Exemption Services, hereinafter referred to as 'exemption services').

The exemption services, or 3GPP PS Data Off Exemption Services, are services that are allowed even if the 3GPP PS Data off feature is activated by the user. In some implementations, the 3GPP PS Data Off Exemption Services are a set of operator services. A 5GC may assist (or support) 3GPP PS Data Off operations in a non-roaming scenario mode and a roaming scenario mode.

Examples of 3GPP Data Off Exempt services are as listed below:
  Multimedia Telephony (MMTel) Voice;
  SMS over IP Multimedia Subsystem (IMS);
  Unstructured Supplementary Services Data (USSD) over IMS (USSD simulation service in IMS (US SI));
  MMTel Video;
  Particular IMS services not defined by 3GPP, where each of such IMS services is identified by an IMS communication service identifier;
  Device Management over PS; and
  IMS Supplementary Service configuration via the Ut interface using an Extensible Markup Language (XML) Configuration Application Protocol (XCAP)

As such, in case a UE activates the PS Data Off feature, then the UE cannot perform uplink transmission (e.g., mobile originating data transmission) and downlink data reception (e.g., mobile terminated data reception), with the exception of such exemption services.

The UE may maintain information regarding a status of the PS data off feature, referred to as a PS Data Off status (e.g., "activated" or "deactivated"). The UE may include the PS Data Off status to a Protocol Configuration Option (PCO) of Attach Request, PDN Connectivity Request (per PDN (APN)), Bearer Resource Modification Request (per PDN (APN)) messages, and PDU session establishment request message and may notify the network. The network may notify acceptance (Accept) of PS Data Off assistance (or support) of the corresponding PDN (APN) or may reject the assistance (or support).

In some implementations, even if PS Data Off related operations are performed between the UE and the network, the transmission of uplink data and downlink data shall be possible for the exemption services defined by the operator, even while the PS Data Off is in the active state. In some scenarios, a list of such exemption services may be pre-configured by a network of the operator, and may be provided to the UE, for example through a Management Object (MO) (a NAS configuration MO or a new MO configuration) via Open Mobile Alliance Device Management (OMADM) or USIM.

As such, in some implementations, if the user activates the PS Data Off feature, then the UE cannot perform uplink data transmission to a PDN for all services, except for services that are included in the exemption services list. In some implementations, the activation or deactivation of the PS Data Off feature may be generically configured by the user.

According to some implementations, a maximum of two lists of 3GPP Data Off Exemption services for the UE may be configured, and this list may be provided to the UE by a Home PLMN (HPLMN) via Device Management or UICC provisioning. If two lists are configured for the UE, then one list is valid for a UE camping on the HPLMN, and another list is valid in a random VPLMN where a UE is roaming In some implementations, without any indication of which PLMN this this is applicable to, if only one list is configured for the UE, then this list may be valid for the home PLMN and a random PLMN in which the UE intends to roam.

In some implementations, an operator shall ensure a list of GPP Data Off Exemption services are provided to the UE and configured in the network.

During a UE Requested PDU Session Establishment procedure, the UE may include its 3GPP PS Data Off status in a PCO, and the UE may report this to an (H-)SMF.

In some implementations, the reporting of the 3GPP PS Data Off status of the UE, by the UE, during a UE Requested PDU Session Establishment procedure, may also be applied to a scenario where a handover to a 3GPP access occurs after the user activates/deactivates the 3GPP PS Data Off, while the UE is in a connected state only via non-3GPP access.

In case the 3GPP PS Data Off feature is activated, according to implementations the UE prevents uplink transmission of uplink IP packets and unstructured and Ethernet data, based on a pre-configured list of 3GPP Data Off Exemption services.

The UE may include modifications (or shifts) in the 3GPP PS Data Off status of the UE in a PCO by using the UE Triggered PDU Session Modification procedure, and the UE shall report this immediately. This may also be applied to an inter-RAT mobility scenario to the NG-RAN and a scenario wherein the 3GPP PS Data Off status is change (or shifted) while a Session management back-off timer is being operated. In case the UE moves outside of the LADN area, and in case the PDU session is still maintained in the UE, the UE shall immediately report any change (or shift) in the 3GPP PS Data Off for a PDU session.

Additional operations of the SMF for the 3GPP Data Off may be controlled by a locate configuration or policy of the PCF.

In case of a PDU session being used in an IMS service, the 3GPP Data Off Exemption services are enforced in the IMS area. If a 3GPP Data Off status of the UE is set to "activated", a policy being configured in an (H-)SMF/PCF shall be ensured so that such services can always be allowed.

As described above, in some implementations, a maximum of two lists of 3GPP Data Off Exemption services for the UE supporting (or assisting) the 3GPP PS data off may be configured. A list of the Exemption services may also be configured by an EF3GPPPSDATAOFF USIM file. Herein, EF denotes an Elementary File, and EF3GPPPSDATAOFF represents an EF associated with the 3GPP Data Off. Examples of the two list of Exemption services are as described below:

A) a list of 3GPP PS Data Off Exemption services to be used in an HPLMN or equivalent HPLMN (EHPLMN); and B) a list of 3GPP PS Data Off Exemption services to be used in a VPLMN.

In some implementations, in case only the above-described described list is configured, then this list may also be used in the VPLMN.

In case the UE assists (or supports) the 3GPP PS Data Off feature, then during a UE Requested PDU Session Establishment procedure and a UE Requested PDU Session Modification procedure, the UE may provide the 3GPP PS Data Off UE status by including the status in an extended PCO IE, according to some implementations.

The UE may operate in a network that shall assist (or support) the 3GPP PS Data Off feature.

By using the UE Requested PDU Session Modification procedure, the UE may indicate a change (or shift) in the 3GPP PS data off status for a PDU session.

In case the 3GPP PS Data Off status is "activated", the UE may perform the following example operations, according to some implementations:

1) with the exception of the following exemptions, the UE does not transmit an uplink IP packet through a 3GPP access:

1-i) when the UE is within an HPLMN or EHPLMN of the UE, a service specified in a list of 3GPP PS Data Off Exemption services that are to be used in the HPLMN or EHPLMN;

1-ii) in case only the list of 3GPP PS Data Off Exemption services that are to be used in the HPLMN or EHPLMN is configured for the UE, when the UE is within a VPLMN of the UE, a service specified in a list of 3GPP PS Data Off Exemption services that are to be used in the HPLMN or EHPLMN;

1-iii) in case a list of 3GPP PS Data Off Exemption services that are to be used in the VPLMN is configured for the UE, a service specified in a list of 3GPP PS Data Off Exemption services that are to be used in the VPLMN;

1-iv) a service specified in the EF3GPPPSDATAOFF USIM file; and 1-vi) uplink traffic according to a procedure associated with an Extensible Markup Language (XML) Configuration Access Protocol (XCAP) over the Ut interface for Manipulating Supplementary Services.

2) the UE does not transmit any uplink Ethernet user data packet via 3GPP access; and 3) the UE does not transmit any uplink unstructured user data packet via 3GPP access.

In case the 3GPP PS Data Off status is not "activated", the UE may transmit uplink user data packets unrestrictedly.

The 3GPP PS Data Off feature does not limit the transmission of uplink user data packets via non-3GPP access, according to some implementations.

II. Problems to be Solved in the Disclosure of this Specification

Meanwhile, in 5G mobile communication, the 3rd Generation Partnership Project (3GPP) Packet Switch (PS) Data Off function may be used. However, conventionally, when 3GPP PS Data Off is used for a Packet Data Unit (PDU) session associated with non-3GPP access, a method for supporting efficient communication has not been discussed.

Hereinafter, examples of problems to be solved in the disclosure of the present specification will be described in detail.

For the MA PDU session, there was a discussion on whether to support PS Data Off. The following were discussed:

For the 3GPP access aspect of the MA PDU session, the 3GPP PS Data Off feature may be applied. For a UE with a MA PDU session, when 3GPP PS Data Off is activated (activated), uplink traffic and downlink traffic for the MA PDU session through non-3GPP access can continue to follow the intended ATSSS rule.

That is, when PS Data Off is supported for MA PDU Session, it has been discussed that PS Data Off is applied to 3GPP access and PS Data Off is not applied to non-3GPP access. However, there has been no discussion on how to make this possible. That is, for the MA PDU session, a method of applying PS Data Off only to 3GPP access without applying PS Data Off to non-3GPP access was not discussed at all.

For the MA PDU session, it is proposed to apply the content that PS Data Off is not applied to the non-3GPP access to the PDU session established in the non-3GPP access. Hereinafter, a PDU session established in non-3GPP access or a PDU session connected only to non-3GPP access will be referred to as a non-3GPP PDU session.

PS Data Off does not apply to non-3GPP PDU sessions. Therefore, the UE does not need to transmit a PS Data Off status report for a non-3GPP PDU session. Here, the PS Data Off status report may be a report for notifying the network of the PS Data Off status. For example, the PS Data Off status report may be transmitted to notify a change (eg, activation or activation) of PS Data Off status.

Meanwhile, according to the service request procedure (eg, the service request procedure described in the examples of FIGS. 11a to 11c and FIG. 12), the non-3GPP access PDU session of the terminal may be changed to a 3GPP access PDU session while the service request procedure is performed. That is, a PDU session established in non-3GPP access may be transferred to 3GPP access (eg, handover may be performed). In this case, since the network (eg, the network of 3GPP access) does not know the PS Data Off status of the PDU session, data of a service other than the 3GPP PS Data Off Exempt Service may be transmitted to the terminal.

For example, if the user activates PS Data Off after the terminal generates a non-3GPP access PDU session, the terminal does not need to transmit a PS Data Off status report. However, when the PDU Session is transferred from non-3GPP access to 3GPP access in the subsequent service request procedure, the PS Data Off status report for the PDU Session is not transmitted to the network (eg, the network of 3GPP access). Therefore, even if the user activates PS Data Off, the network does not know the PS Data Off state. For this reason, the network transmits data to the terminal even if the user activates PS Data Off. Even though the user activates PS Data Off, since the network transmits data to the terminal without considering PS Data Off, charging may be affected. For this reason, users may have to pay a fee even after PS Data Off is activated. The disclosure of the present specification proposes a method for solving this problem.

III. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

In this specification, the following methods are proposed to solve the problem. The methods below may be performed or used in combination or complementary.

Hereinafter, the disclosure of the present specification will be specifically described with reference to the first to fourth examples of the disclosure of the present specification. For reference, the first to fourth examples of the disclosure of the present specification may be implemented in combination with each other.

1. First Example of the Disclosure of the Present Specification

In a first example of the disclosure of the present specification, the UE may transmit a PS Data Off status report even for a non-3GPP access PDU Session. For example, the UE may transmit a PS Data Off status report in the process of generating (or establishing) a non-3GPP PDU Session, and whenever the PS Data Off status is changed, the UE may transmit a PS Data Off status report. In this case, in the process of generating (or establishing) the non-3GPP PDU Session, the UE may transmit a PS Data Off status report to the network. Meanwhile, the UE may receive a PS Data Off supported indication (or information) from the network. Also, in this case, the terminal may transmit a PS Data Off status report to the network. Here, the PS Data Off supported indication (or information) may be an indication (or information) indicating that the network (eg, SMF, UPF, AMF, PCF, etc.) supports PS Data Off. In addition, when the UE handovers a PDU session from non-3GPP access to 3GPP access, the UE may not need to transmit a PS Data Off status report again unless PS Data Off status is changed. Conversely, even when the UE handovers a PDU Session of 3GPP access to non-3GPP access, the UE does not need to transmit a PS Data Off status report unless the PS Data status is changed. To this end, the SMF stores the PS Data Off status report transmitted by the UE, and when the access is changed (eg, when the PDU session is handed over from 3GPP access to non-3GPP access, or when the PDU session is handed over from non-3GPP access from to 3GPP access), it is possible to determine whether to apply PS Data Off.

The SMF may receive a PS Data Off status report from the terminal. In this case, SMF may determine whether to apply PS Data Off in consideration of the access type (eg, non-3GPP access or 3GPP access) of the current PDU Session. For example, even if the terminal reports PS Data Off status as activated for non-3GPP access, the SMF may prevent PS Data Off from being applied for non-3GPP access. If PCF is used (eg, if PCF exists, PCF generates (or updates) a PCC rule in consideration of the access type of the current PDU Session (eg, non-3GPP access or 3GPP access), so that PS Data Off may be activated only in the case of 3GPP access, and PS Data Off may not be activated in case of non-3GPP access. For reference, if there is no PCF, the SMF may operate based on the PCC rule set in the SMF.

The UE may transmit a PS Data Off status report for the non-3GPP access PDU session when there is a possibility that the non-3GPP access PDU session will be handed over to the 3GPP access. For example, the UE considers whether the URSP rule or NSSAI of non-3GPP access is included in 3GPP access, and only when handover is possible from non-GPP access to 3GPP access in the PDU Session PS Data Off, the UE may transmit PS Data Off status report. If the URSP rule or allowed NSSAI of 3GPP access is updated, the UE may determine whether to transmit a PS Data Off status report again for a non-3GPP access PDU session. In this way, the UE does not perform a PS Data Off status report for all non-3GPP access PDU Sessions, and performs a PS Data Off status report for non-3GPP access PDU sessions that are likely to be handed over to 3GPP access.

When the UE transmits the PS Data Off status report to the SMF for the non-3GPP access PDU Session, the SMF may not notify the PCF of the PS Data Off status report. This may be due to the local configuration of the SMF or due to that the PCF may not request a PS Data Status report for non-3GPP access. That is, the SMF may not transmit the PS Data Off status report to the PCF based on the local configuration of the SMF or based on the case where the PCF does not request the PS Data Status report for non-3GPP access. For example, the PCF may request the SMF to reports 3GPP PS Data Off status change (eg, when 3GPP PS Data Off status is changed) for 3GPP access PDU Session, and the PCF may request the SMF to not report PS Data Off status change for non-3GPP access PDU Session. For this (e.g., to report PS Data Off status change to PCF in a situation where PDU non-3GPP PDU session is handed over to 3GPP access), the SMF may store the PS Data Off status report transmitted by the UE. When the non-3GPP access PDU Session is handed over to 3GPP access, the SMF may inform (or transmit) the PS Data Off status to the PCF. In this case, the SMF may perform a report only when the status is changed from the last reported status. For example, if the SMF previously transmitted a PS Data Off status report to the PCF, only when the PS Data Off status of the PS Data Off status report last transmitted by the SMF and the current PS Data Off status are different, the SMF may transmit the PS Data Off status report to the PCF. To this end, the SMF may store the PS Data Off status last reported to the PCF. If the SMF reports only when there is a change in the last reported PS Data Off status, the PCF may always store the PS Data Off status previously reported by the SMF. For example, when the terminal reports that the PS Data Off status is activated in 3GPP access, the PCF may store that the PS Data Off status is activated. When the SMF notifies the PCF of the event that the access type is changed to non-3GPP, the PCF may update the PCC rule based on the PS Data Off status (eg, activated) previously reported by the SMF. For example, since PS Data Off is not applied in non-3GPP access, the PCF may update the PCC rule so that data can be transmitted to the terminal regardless of PS Data Off.

According to the first example of the disclosure of the present specification, even though PS Data Off is not applied to the PDU session in non-3GPP access, the UE must perform a PS Data Off status report whenever the PS Data Off status is changed, signaling may increase.

Hereinafter, an example of the operation of the terminal and the network according to the first example of the disclosure of the present specification will be described in detail with reference to FIGS. 14*a*, 14*b* and 15.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14A:
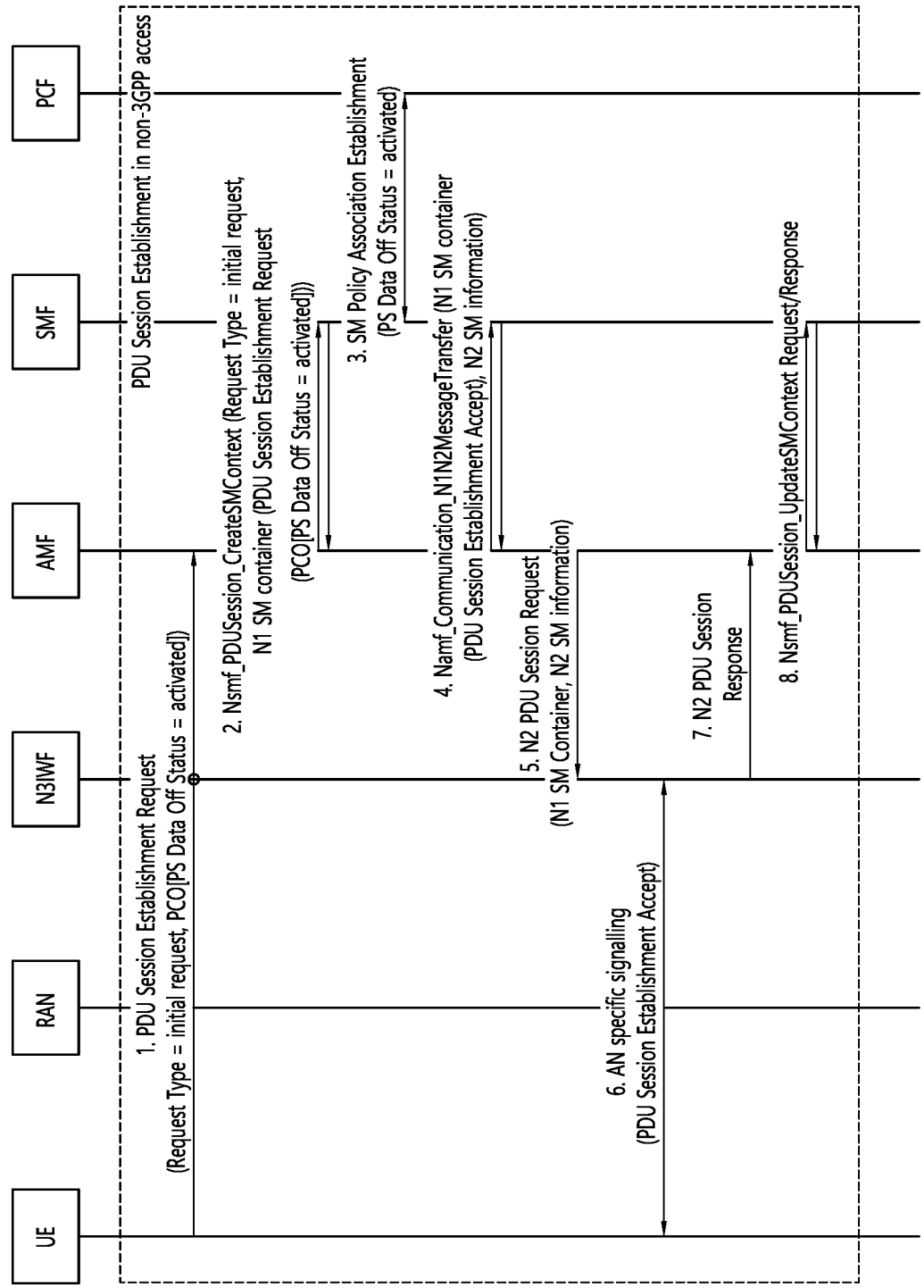
FIGS. 14a and 14b show examples of operations of a terminal and a network according to a first example of the disclosure of the present specification.
Figure 14B:
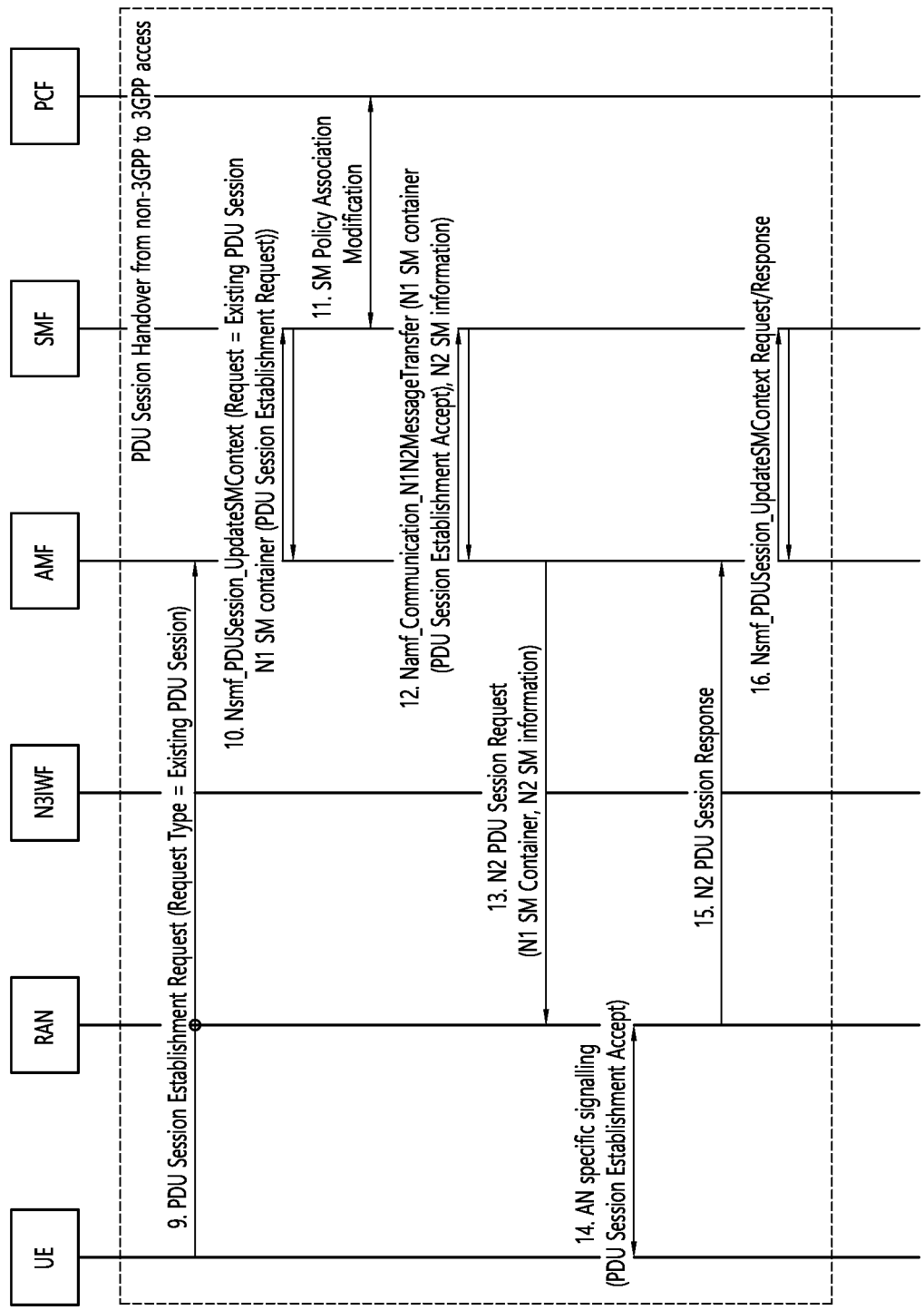

FIGS. 14a and 14b show examples of operations of a terminal and a network according to a first example of the disclosure of the present specification.

FIGS. 14a and 14b show an example of handover of the PDU Session to 3GPP access after the UE generates (or establishes) a PDU session in non-3GPP access. The examples of FIGS. 14a and 14b may basically follow the PDU session establishment procedure described above with reference to the examples of FIGS. 9a and 9b. In the example of FIGS. 14a and 14b, the UE may report the PS Data Off status as activated while generating (or establishing) a PDU Session in non-3GPP access. Afterwards, when the UE handovers the PDU Session to 3GPP access, since the previously reported PS Data Off status has not been changed (eg, when the previously reported PS Data Off status and the current PS Data Off status are the same), a situation is assumed that the UE has not reported the PS Data Off status separately.

1) The UE may transmit a PDU session establishment request message to create (or establish) a PDU Session in non-3GPP access. At this time, the terminal may confgirued the PS Data Off status to activated. The PDU session establishment request message may include Request Type information and PCO. The Request Type information may include an initial request indicating that a PDU session is newly established. The PCO may include information indicating that PS Data Off status is activated.

2) The AMF transmits the PDU session establishment request message transmitted by the UE to the SMF. For example, the AMF may transmit an Nsmf_PDUSession_CreateSMContext message including a PDU session establishment request message and Request Type information (eg, "initial request") to the SMF.

3) The SMF may report the PS Data Off status transmitted by the terminal to the PCF. In this case, the SMF may inform the PCF of access type information (i.e. non-3GPP access) of the PDU Session together in the same manner as in the prior art. Although the UE reports PS Data Off status as activated, since the PDU Session is a non-3GPP access PDU Session, the PCF may not generate a PCC rule for activating PS Data Off.

4) The SMF may transmit a PDU session establishment accept message for accepting the UE's request (eg, a PDU session establishment request message) and N2 SM information for setting up resources of non-3GPP access to the N3IWF. For example, the SMF may transmit a PDU session establishment accept message and N2 SM information to the N3IWF via the AMF. As an example, the SMF may transmit a Namf_Communication_N1N2MessageTransfer message (including N1 SM container including a PDU session establishment accept message and N2 SM information) to the AMF.

5) The AMF may transmit the N2 SM information and the PDU session establishment accept message transmitted by the SMF to the N3IWF.

6) The N3IWF may transmit and receive AN signaling for setting up a resource for a PDU session with the UE. The N3IWF may transmit a PDU session establishment accept message to the UE in this process. Even though the UE reports the PS Data Off status of the corresponding PDU Session as activated, since the PDU session is a non-3GPP access PDU Session, data not belonging to a service of the 3GPP PS Data Off Exempt Service can also be transmitted without blocking data. That is, in a state in which PS Data Off is activated, the UE may process an operation related to a PDU session in the same manner as in a state in which PS Data Off is not activated.

7~8) N3IWF may inform SMF through AMF that AN resource setup has been successfully performed.

Hereinafter, an operation according to a first example of the disclosure of the present specification in a situation in which the terminal handovers a PDU session from non-3GPP access to 3GPP access will be described.

9) The UE may transmit a PDU session establishment request message to handover a PDU Session generated (or established) in non-3GPP access to 3GPP access. In this case, in order to inform that the PDU session establishment request message is a message for handover of a PDU Session, the UE may set the Request Type to "Existing PDU Session" and transmit a PDU Session ID for handover together. In addition, since it is assumed in FIGS. 14a and 14b that the PS Data Off status reported in step 1) is not changed, the UE may not include the PS Data Off status in the PDU session establishment request message. If, before step 9) is performed, when the UE changes the PS Data Off status to deactivated, the UE may transmit a PDU session establishment request message including PS Data Off status information.

10) The AMF transmits the PDU Session Establishment Request message sent by the UE to the SMF. For example, the AMF may transmit an Nsmf_PDUSession_CreateSM-Context message including a PDU session establishment request message and Request Type information (eg, "Existing PDU Session") to the SMF.

11) The SMF may inform the PCF of information (eg, information that the PDU session is handed over from non-3GPP access to 3GPP access) that the PDU Session is changed to 3GPP access by that the UE performed handover the PDU Session to 3GPP access. Upon receiving the information from the SMF that the PDU Session has been changed to 3GPP access, the PCF generates (or updates) a PCC rule for activating the PS Data Off based on the UE reporting the PS Data Off status as activated, and the PCF may transmit the PCC rule to the SMF. Here, the PCC rule for activating PS Data Off may mean a PCC rule for transmitting or not transmitting data to the UE depending on whether data is included in the PS Data Off exempt service while the PS Data Off status is activated.

12) The SMF may generate an N4 rule based on the updated PCC rule (eg, the PCC rule received from the PCF in step 11), and transmit the N4 rule to the UPF (not shown). The SMF may transmit a PDU session establishment accept message for accepting the UE's request (eg, a PDU session establishment request message) and N2 SM information for setting up resources of 3GPP access to the RAN. For example, the SMF may transmit a PDU session establishment accept message and N2 SM information to the RAN via the AMF. As an example, the SMF may transmit a Namf_Communication_N1N2MessageTransfer message (including N1 SM container including a PDU session establishment accept message and N2 SM information) to the AMF.

13) The AMF may transmit the N2 SM information and the PDU session establishment accept message transmitted by the SMF to the RAN.

14) The RAN may transmit and receive AN signaling for setting up a resource for a PDU session with the UE. The RAN may transmit a PDU session establishment accept message to the UE in this process. Since the PDU Session is changed from a non-3GPP access PDU session to a 3GPP access PDU session, the UE may not transmit data that does not belong to a service of the 3GPP PS Data Off Exempt Service to the network, and may transmit only data belonging to the 3GPP PS Data Off Exempt Service to the network.

15~16) The RAN may inform the SMF through the AMF that the AN resource setup has been successfully performed.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
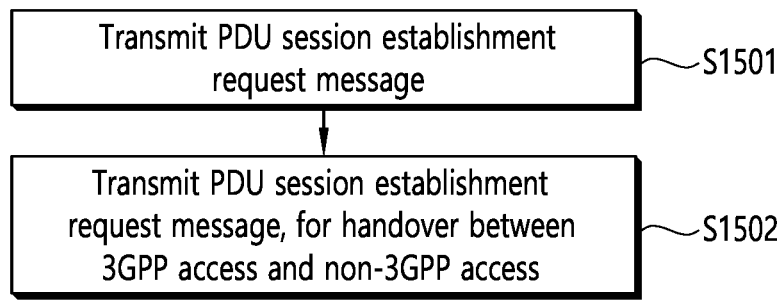
FIG. 15 shows an example of the operation of the terminal according to the first example of the disclosure of the present specification.

FIG. 15 shows an example of the operation of the terminal according to the first example of the disclosure of the present specification.

The example of FIG. 15 is only an example of an operation performed by the terminal, and in addition to the operation shown in FIG. 15, the terminal may perform the operation of the terminal (eg, UE) described in the first example of the disclosure of the present specification. In addition, the terminal may perform the operation of the terminal in the following description with reference to the second to fourth examples of the disclosure of the present specification.

In step S1601, the terminal may transmit a PDU session establishment request message. The UE may transmit a PDU session establishment request message to establish a PDU session related to 3GPP access and/or non-3GPP access. The UE may transmit the PDU session establishment request message by including PS Data Off status information of the UE in the PDU session establishment request message. PS Data Off status information of the UE may be transmitted by being included in the PCO in the PDU session establishment request message.

In step S1602, for handover between 3GPP access and non-3GPP access, the UE may transmit a PDU session establishment request message. The UE may transmit the PDU session establishment request message by including PS Data Off status information of the UE in the PDU session establishment request message. At this time, if the PS Data Off status has not changed since the last report (that is, if the last reported PS Data Off status and the current PS Data Off status are the same), the UE may not transmit PS Data Off status information.

For reference, step S1602 may be selectively performed. For example, step S1602 may be performed only when handover between 3GPP access and non-3GPP access is required.

For reference, the PS Data Off status for the PDU session may not affect data transmission through non-3GPP access. For example, even if PS Data Off status is activated, since PS Data Off is not applied to communication through non-3GPP access, networks and terminals cannot communicate through non-3GPP access regardless of PS Data Off status.

Upon receiving the PDU session establishment request message from the terminal, the SMF may determine whether to apply PS Data Off based on the access type of the PDU session and the PS Data Off status.

2. Second Example of the Disclosure of the Present Specification

In the second example of the disclosure of the present specification, when the terminal receives paging or NAS Notification related to non-3GPP access through 3GPP access, the operation of transmitting the PS Data Off status report while performing the Service Request procedure will be explained.

Hereinafter, a second example of the disclosure of the present specification will be specifically described with reference to the first example and the second example of the second example of the disclosure of the present specification.

2-1. A First Example of a Second Example of the Disclosure of the Present Specification According to the first example of the second example of the disclosure of the present specification, the terminal may transmit a service request message including a PS Data Off status report.

Specifically, the terminal may receive Paging or NAS Notification for non-3GPP access. In this case, the terminal may transmit the Service Request message by including the PS Data Off status report in the Service Request message while transmitting the Service Request message.

Upon receiving the Service Request message including the PS Data Off status report, the AMF may transmit the PS Data Off status report for all PDU Sessions. For example, the AMF may transmit a PS Data Off status report to SMFs related to all PDU sessions that the UE has. Alternatively, the AMF may transmit a PS Data Off status report only for non-3GPP access PDU Sessions, not for all PDU Sessions. For example, the AMF may transmit a PS Data Off status report to SMFs related to the non-3GPP access PDU Session possessed by the UE. Alternatively, the AMF may transmit a PS Data Off status report only for non-3GPP access PDU Sessions in which mobile terminating (MT) data arrives and triggers a network-initiated service request procedure. For example, the AMF may transmit a PS Data Off status report to SMFs related to a non-3GPP access PDU Session related to the received MT data.

Upon receiving the PS Data Off status report from the AMF, the SMF may inform the UE of whether PS Data Off is supported for the PDU Session. For example, if PS Data Off is supported for the PDU session, the SMF may transmit a PS Data Off supported indication to the terminal through the PCO by performing the SMF initiated PDU session modification procedure. Alternatively, when PS Data Off is supported for the PDU session, the SMF may inform the AMF by including the PS Data Off status supported indication in the Nsmf_PDUSession_UpdateSMContext Response message. For reference, here the PS Data Off status supported indication may be information indicating that PS Data Off is supported for the PDU session. For example, the SMF may transmit an Nsmf_PDUSession_UpdateSMContext Response message including a PS Data Off status supported indication to the AMF. The AMF may inform (ie, transmit) the PS Data Off supported indication received from each of the SMFs to the terminal.

2-2. A Second Example of a Second Example of the Disclosure of the Present Specification According to the second example of the second example of the disclosure of the present specification, the UE may transmit a service request message including the SM container. Here, the SM container may include a PDU session modification request message including a PS Data Off status report.

Specifically, the terminal may transmit a service request message including the SM container. Here, the SM container may include a PDU session modification request message including a PS Data Off status report. The UE may transmit a PS Data Off status report for each PDU session by transmitting a PDU session modification request message including a PS Data Off status report through the service request message.

Upon receiving the service request message, the AMF may transmit an SM message (eg, a PDU session modification request message) included in the SM container of the service request message to the SMF in charge of each PDU session. The SMF may transmit a PDU session modification command message including a PS Data Off supported indication to the UE. For reference, here the PS Data Off status supported indication may be information indicating that PS Data Off is supported for the PDU session. In addition, when the SMF receiving the SM message needs to move the PDU session from the non-3GPP access to the 3GPP access (eg, when the SMF receives "Indication of Access Type can be changed" from the AMF), the SMF may determine whether to transmit data to the terminal according to PS Data Off status. For example, if the terminal transmits PS Data Off status to "activated", the SMF transmits only data related to the service included in the 3GPP PS Data Off Exempt Service to the terminal, and the SMF blocks data for service other than the service included in the 3GPP PS Data Off Exempt Service. In this case, the SMF may determine whether to move the corresponding non-3GPP access PDU Session to 3GPP access. For reference, "Indication of Access Type can be changed" may be information indicating that a PDU session associated with non-3GPP access may be moved to 3GPP access. After "Indication of Access Type can be changed" is transmitted to the network (eg SMF), the SMF and/or PCF may determine whether to transfer the non-3GPP access PDU Session to 3GPP access based on "Indication of Access Type can be changed".

Hereinafter, an example of operation of a specific terminal and network according to a second example of the disclosure of the present specification will be described with reference to FIG. 16.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
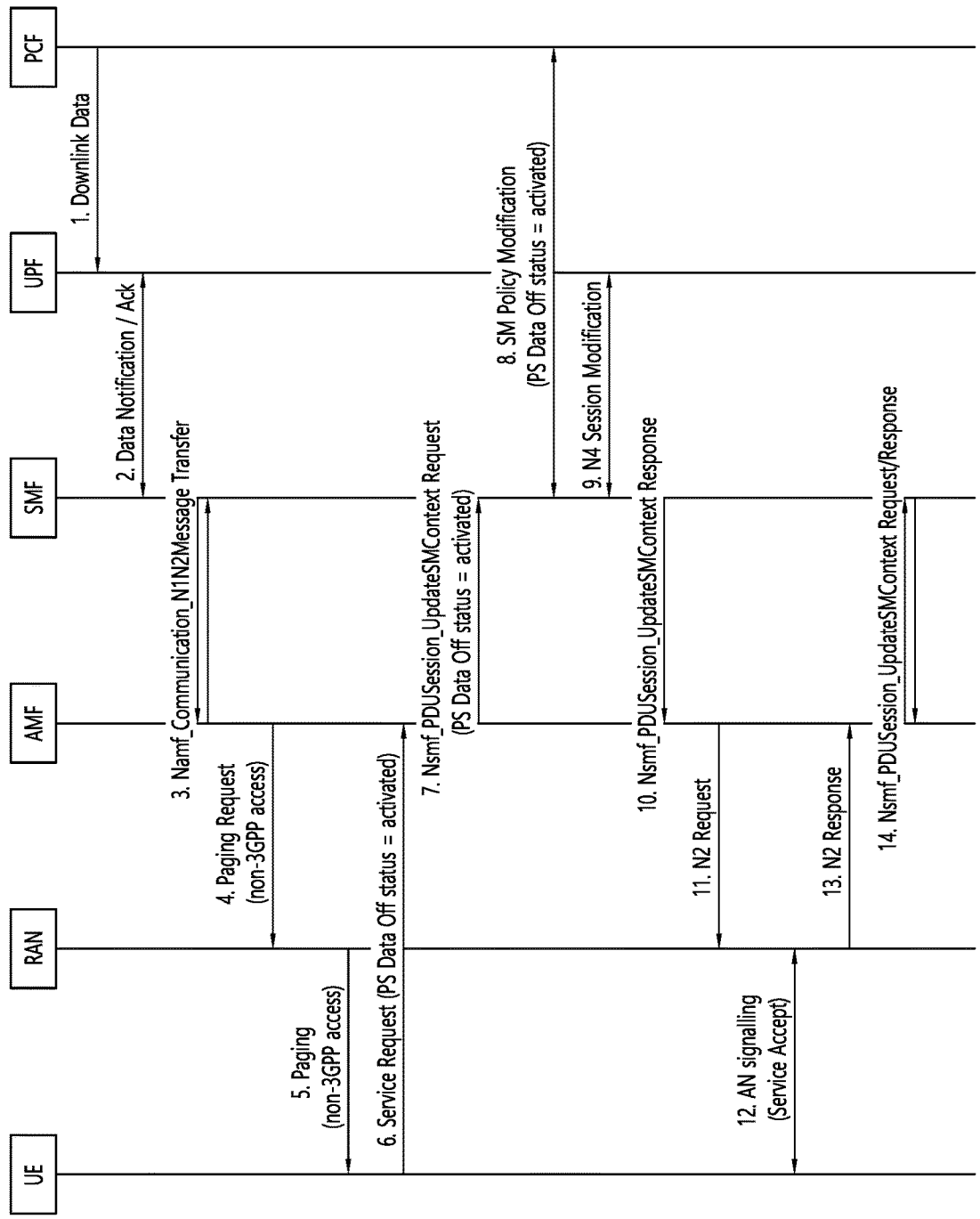
FIG. 16 shows an example of operation of a terminal and a network according to a second example of the disclosure of the present specification.

FIG. 16 shows an example of operation of a terminal and a network according to a second example of the disclosure of the present specification.

The example of FIG. 16 describes an example in which the terminal reports PS Data Off status while performing a service request procedure. The example of FIG. 16 may basically follow the service request procedure described above with reference to the example of FIG. 12.

1) Downlink data for non-3GPP access PDU Session may arrive in UPF. For example, the UPF may receive downlink data related to the non-3GPP access PDU session of the terminal.

2) The UPF may inform the SMF that downlink data has arrived. For example, the UPF may transmit a Data Notification message, and the SMF may transmit an Ack message to the UPF.

3) The SMF may transmit an N2 message (eg, a Namf_CommunicationN1N2MessageTransfer message) to the AMF for setup of a user plane resource of a non-3GPP access PDU Session.

4) In the example of FIG. 16, it is assumed that the terminal is in a CM (Connection Management)-IDLE state in non-3GPP access. The AMF may know that the terminal is CM-IDLE in non-3GPP access, and may transmit a paging request message to the RAN through 3GPP access in order to paging the terminal. In this case, the AMF may set the access type information to non-3GPP access in order to inform that the paging is paging for non-3GPP access. This access type information may be included in the paging request message and transmitted.

5) The RAN may perform paging for the UE. At this time. The RAN may include information indicating that it is paging for non-3GPP access in a paging message transmitted to the terminal according to the information transmitted by the AMF (eg, access type information for informing that it is paging for non-3GPP access). For example, the RAN may transmit a paging message including information indicating that paging is paging for non-3GPP access to the terminal.

6) The UE may receive a paging message for non-3GPP access. And, the terminal may perform the Service Request procedure in response to the paging message. For example, the terminal may transmit a service request message to the AMF. At this time, since the UE knows that the PDU Session can be handed over to 3GPP access, the UE may set the PS Data Off status report to activated and transmits the PS Data Off status report together with the service request message. For example, when the user activates PS Data Off status, the terminal receives a paging message for non-3GPP access through 3GPP access, and then sends a service request message including information that PS Data Off status report is activated to the AMF. For example, the UE may transmit a service request message including a list of PDU sessions likely to be handed over to 3GPP access (eg, List Of Allowed PDU Sessions) to the AMF. Then, the AMF may transmit an "Indication of Access Type can be changed" to the SMF based on the list of PDU sessions (eg, List Of Allowed PDU Sessions).

Here, the terminal may transmit the service request message including the PS Data Off status report, as described above in item 2-1 (the first example of the second example of the disclosure of the present specification). Alternatively, the terminal may also transmit service request message including a PDU session modification request message, by including the PS Data Off status in the PCO of the PDU session modification request message, as described in item 2-2 (the second example of the second example of the disclosure of the present specification).

7) The AMF may inform the SMF that the UE can move the non-3GPP PDU Session to 3GPP access. For reference, since the AMF has received a service request message including a list of PDU sessions (eg List Of Allowed PDU Sessions) that are likely to be handed over to 3GPP access, the AMF may know that the terminal can move a non-3GPP PDU Session to 3GPP access. For example, the AMF may transmit an Nsmf_PDUSession_UpdateSMContext Request message including information indicating that the UE can move a non-3GPP PDU Session to 3GPP access. In this case, when the operation according to the above-described item 2-1 (the first example of the second example of the disclosure of the present specification) is performed, the AMF may transmit the PS Data Off status transmitted by the terminal to the SMF together. When the operation as described above in item 2-2 (the second example of the second example of the disclosure of the present specification) is performed, the AMF may transmit the PDU Session Modification Request message transmitted by the terminal to the SMF together.

8) The SMF may notify the PCF that the PS Data Off status of the terminal is activated. The PCF may generate (or update) a PCC rule for applying PS Data Off. The PCF may transmit the generated (or updated) PCC rule to the SMF.

9) The SMF may generate an N4 rule based on the PCC rule received from the PCF. For example, the SMF may generate the N4 rule so that traffic that does not belong to the 3GPP PS Data Off Exempt Service is not transmitted to the UE.

10) The SMF may transmit an N2 message for setting up a user plane resource of the PDU session to the AMF in order to move the PDU Session to 3GPP access.

11) The AMF may transmit the N2 message sent by the SMF to the RAN. In addition, in order to notify the terminal that the Service Request has been successful, the AMF may transmit a service accept message to the terminal together.

12) The RAN may perform AN signaling for setup of user plane resources. In this case, the RAN may transmit a service accept message to the terminal.

13-14) The RAN may inform the SMF through the AMF that the setup of the user plane resource has been successfully performed.

3. Third Example of the Disclosure of the Present Specification

In the second example of the disclosure of the present specification, when the terminal receives a Paging or NAS Notification related to non-3GPP access, when transmitting a List Of Allowed PDU Session, operation for configuring a List Of Allowed PDU Session in consideration of the PS Data Off status will be described.

According to the prior art, when the terminal receives a Paging or NAS Notification related to non-3GPP access through 3GPP access, the terminal may check whether UE policies and S-NSSAI of PDU Session are allowed in 3GPP access. As a result of checking, if the PDU Session can be used in 3GPP access, the UE transmits a service request message by including non-3GPP access PDU Session information in the List Of Allowed PDU Session.

A third example of the disclosure of the present specification includes an operation in which the terminal additionally considers the PS Data Off status at this time.

For example, when the user activates the PS Data Off status, all services used in a specific non-3GPP access PDU session may not be included in the 3GPP PS Data Off Exempt Service. In this case, even if the PDU session is moved to 3GPP access, since the UE cannot receive a service for this PDU session, the UE may not include the non-3GPP PDU Session in the List Of Allowed PDU Session. For example, all services used in a specific non-3GPP access PDU Session may be included in the 3GPP PS Data Off Exempt Service. In this case, the UE may transmit the non-3GPP PDU Session by including it in the List Of Allowed PDU Session.

If a specific non-3GPP PDU Session uses both a service included in the 3GPP PS Data Off Exempt Service and a service not included in the 3GPP PS Data Off Exempt Service, the operation of the terminal may vary depending on whether the first example or the second example of the disclosure of the present specification is performed. If the first example or the second example of the disclosure of this specification is performed, if even one service used by a specific non-3GPP PDU Session is included in the 3GPP PS Data Off Exempt Service, the UE may transmit the list of Allowed PDU Session by including the corresponding non-3GPP PDU Session. If neither the first example nor the second example of the disclosure of the present specification is performed, the terminal may not include the corresponding non-3GPP PDU Session in the List Of Allowed PDU Session.

Alternatively, when neither the first example nor the second example of the disclosure of the present specification is performed, when the user activates the PS Data Off status in order for the terminal to perform a simple operation, the UE may not include any PDU Session information in the List Of Allowed PDU Session. That is, the UE may transmit an empty List Of Allowed PDU Session.

Hereinafter, an example of operation of a specific terminal and a network according to a third example of the disclosure of the present specification will be described with reference to FIG. 17.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 17:
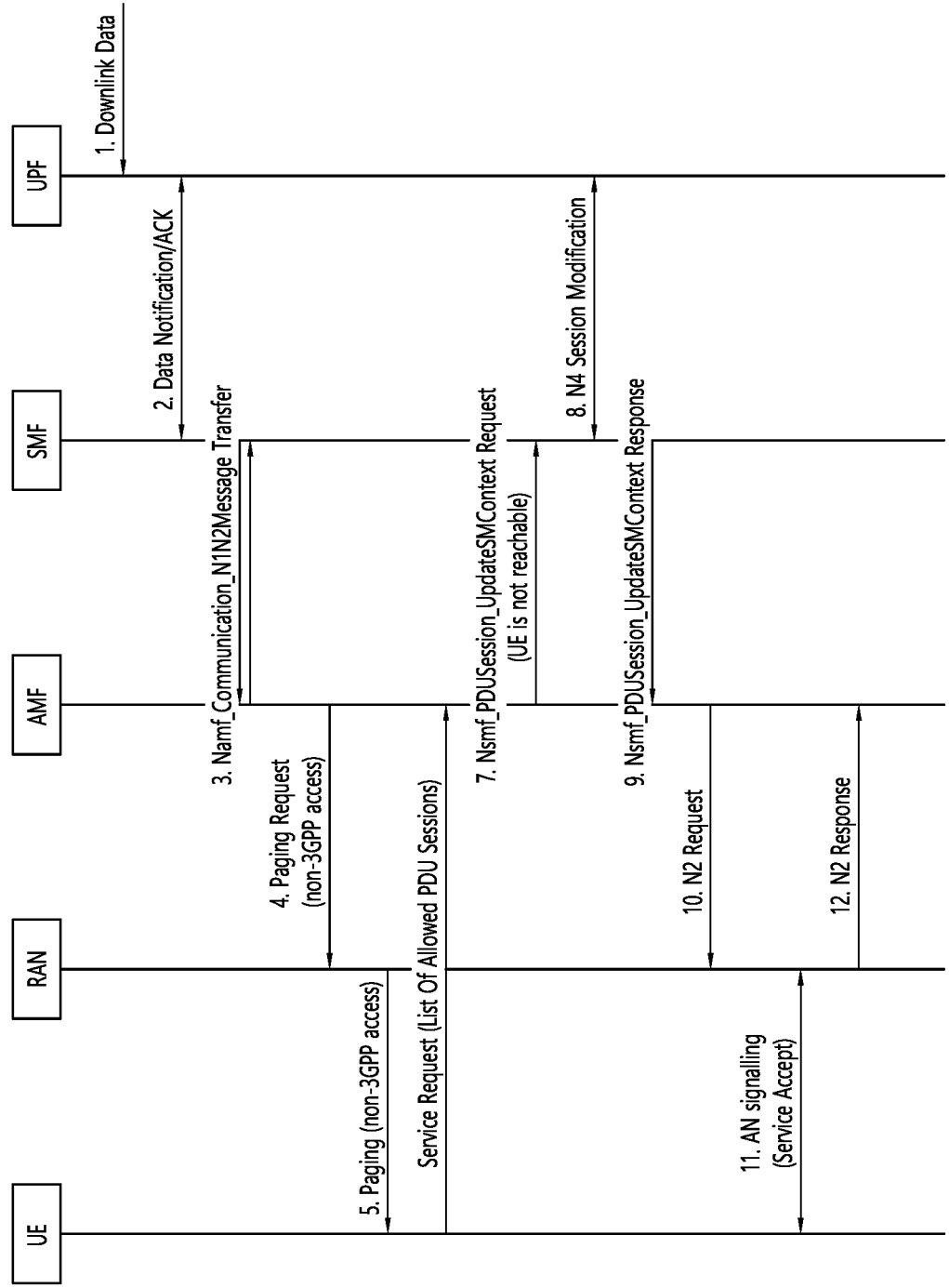
FIG. 17 shows an example of operation of a terminal and a network according to a third example of the disclosure of the present specification.

FIG. 17 shows an example of operation of a terminal and a network according to a third example of the disclosure of the present specification.

The example of FIG. 17 describes an example of an operation in which the PS Data Off status is considered when the UE establishes a List Of Allowed PDU Session while performing a service request procedure. The example of FIG. 17 may basically follow the service request procedure described with reference to the example of FIG. 12.

1) Downlink data for non-3GPP access PDU Session may arrive in UPF. For example, the UPF may receive downlink data related to the non-3GPP access PDU session of the terminal.

2) The UPF may inform the SMF that downlink data has arrived. For example, the UPF may transmit a Data Notification message, and the SMF may transmit an Ack message to the UPF.

3) The SMF may transmit an N2 message (eg, a Namf_CommunicationN1N2MessageTransfer message) to the AMF for setup of a user plane resource of a non-3GPP access PDU Session.

4) In the example of FIG. 16, it is assumed that the terminal is in a CM (Connection Management)-IDLE state in non-3GPP access. The AMF may know that the terminal is CM-IDLE in non-3GPP access, and may transmit a paging request message to the RAN through 3GPP access in order to paging the terminal. In this case, the AMF may set the access type information to non-3GPP access in order to inform that the paging is paging for non-3GPP access. This access type information may be included in the paging request message and transmitted.

5) The RAN may perform paging for the UE. At this time. The RAN may include information indicating that it is paging for non-3GPP access in the paging message transmitted to the terminal according to the information transmitted by the AMF (eg, access type information for informing that it is paging for non-3GPP access). For example, the RAN may transmit a paging message including information indicating that paging is paging for non-3GPP access to the terminal.

6) The UE may receive a paging message for non-3GPP access. And, the UE may perform the Service Request procedure in response to the paging message. In this case, according to the prior art, the UE may transmit a List Of Allowed PDU Session including PDU Session information that can be handover to 3GPP access among non-3GPP PDU Sessions to the AMF. According to the third example of the disclosure, unlike the prior art, when PS Data Off status is activated, only when all services used by non-3GPP access PDU Session are included in 3GPP PS Data Off Exempt Service, the UE may transmit the list of Allowed PDU Session by including the corresponding non-3GPP PDU Session. If a service used by a certain non-3GPP PDU Session is not included in the 3GPP PS Data Off Exempt Service, even if the corresponding PDU Session is capable of handover to 3GPP, the UE may not include the non-3GPP PDU Session information in the List Of Allowed PDU Session.

7) The AMF may inform the SMF that the UE is not reachable based on the List Of Allowed PDU Session information transmitted by the terminal. When all services used by the Non-3GPP access PDU Session are included in the 3GPP PS Data Off Exempt Service and the UE transmits the non-3GPP PDU Session by including the corresponding non-3GPP PDU Session in the List Of Allowed PDU Session, the AMF sends "Indication of Access Type can be changed" to the SMF, to inform that the PDU Session can be moved to 3GPP access.

8) The SMF may instruct the UPF to discard downlink traffic.

9) The SMF may transmit the response to step 7 to the AMF.

10~42) AMF may transmit a Service Accept message to the terminal to inform that the Service Request has been successful.

A fourth example of the disclosure of the present specification described below is an example in which the contents described in the disclosure of the present specification are applied to the description related to 3GPP PS Data Off. The contents described in the first to third examples of the disclosure of the present specification may be applied to the fourth example of the disclosure of the present specification. In addition, the contents described in the fourth example of the disclosure of the present specification may also be applied to the disclosure of the present specification (eg, including the first to third examples of the disclosure of the present specification).

4. Fourth Example of the Disclosure of the Present Specification

A fourth example of the disclosure of the present specification describes the contents of PS Data Off for a non-3GPP access PDU session.

For the MA PDU session, PS Data Off status does not affect data transport through non-3GPP access.

Conventionally, it was not clear whether the UE transmits a PS Data Off status for a PDU session associated with non-3GPP access. In general, in order for the UE to hand over a PDU session from non-3GPP access to 3GPP access, the UE sends a PDU session establishment request message. In this case, the UE may report the PS Data Off status in the handover process by indicating the PS Data Off status in the PDU Session Establishment Request message.

However, if the UE indicates "List Of Allowed PDU Sessions" while the service request procedure is being performed, PDU sessions related to non-3GPP access may be moved to 3GPP access. In this case, the network cannot know whether the UE has activated the PS Data Off status or not. Therefore, even though the user has activated PS Data Off and the buffered DL traffic does not belong to 3GPP PS Data Off Exempt Services, there may be a case where the network transmits the buffered DL traffic to the UE.

To prevent this situation, the UE should report PS Data Off status even for non-3GPP access PDU sessions.

PS Data Off status does not affect data transfer through non-3GPP access. The report of PS Data Off status when the PDU session is associated with non-3GPP access also does not affect data transfer through non-3GPP access. The report of the PS Data Off status when the PDU session is related to non-3GPP access is for addressing the scenario described above (eg, a case in which the PDU session is transferred from non-3GPP access to 3GPP access while the service request procedure is performed).

The UE may report PS Data Off status even for non-3GPP access PDU sessions. If the UE fails to report the PS Data Off status even for the non-3GPP access PDU session, the following results may occur. If a non-3GPP access PDU session is moved to 3GPP access while the service request procedure is being performed, the DL traffic can be transmitted to the UE even though the user has PS Data Off enabled and the DL traffic does not belong to 3GPP PS Data Off Exempt Services.

When 3GPP PS Data Off is enabled by the user, 3GPP PS Data Off prevents traffic (traffic for all Internet Protocol (IP) packets, unstructured and Ethernet data) over 3GPP access excluding data related to 3GPP PS Data Off Exempt Services.

3GPP Data Off Exempt Services is a service that is allowed even if 3GPP PS Data off is activated by the user. 3GPP PS Data Off Exempt Services is a set of operator services. 5GC supports 3GPP PS Data Off operation in non-roaming scenario and roaming scenario mode.

Up to two lists of 3GPP PS Data Off Exempt Services can be set for the UE, and this list can be provided to the UE through Device Management or UICC Provisioning by HPLMN (Home PLMN). If two lists are configured for the UE, one list is valid for the UE camping in the HPLMN, and the other list may be valid for any VPLMN in which the UE roams. If only one list is configured for the UE, without an indication of which PLMN this list is applicable, this list may be valid for the home PLMN and any PLMN to which the UE intends to roam.

Note 1: The operator must ensure that the 3GPP PS Data Off Exempt Services configured in the network and the UE match.

During the UE request PDU session establishment procedure, the UE may include its 3GPP PS Data Off state in the PCO and report it to the (H-)SMF. Here, the PDU session establishment procedure may be a PDU session establishment procedure for a PDU session related to 3GPP access and a PDU session establishment procedure for a PDU session related to non-3GPP access.

Note 2: If the 3GPP PS Data Off status has not changed since the last report, the UE may not report the PS Data Off status during the PDU session establishment procedure for handover of the PDU session. Here, the last report may mean that the UE last reported 3GPP PS Data Off status. Reporting of PS Data Off status for a PDU session related to non-3GPP access does not affect data delivery through non-3GPP access. When 3GPP PS Data Off is activated, the UE prevents uplink transmission of uplink IP packets, unstructured and Ethernet data based on a pre-configured list(s) of Data Off Exempt Services (pre-configured list(s) of Data Off Exempt Services), except for data related to 3GPP PS Data Off Exempt Services.

The UE may use the PDU session modification procedure requested by the UE, include the change of 3GPP Data Off status in the PCO, and report immediately. This can also be applied to the scenario of inter-RAT mobility to NG-RAN and the scenario in which 3GPP Data Off status is changed when the session management back-off timer is running. If the UE is located in a non-allowed area (Non-Allowed Area) or is located in an area which is not an allowed area, the UE must also immediately report a change in the 3GPP PS data off state for the PDU session. When the UE leaves the LADN area and the PDU session of the UE is maintained, the UE shall also immediately report the change of 3GPP PS data off state for the PDU session.

An additional operation of the SMF for 3GPP PS Data Off may be controlled according to a local setting or a policy provided from the PCF.

Note 3: For a PDU session used for an IMS (IP Multimedia Subsystem) service, 3GPP Data Off Exempt Services may be applied in the IMS domain. The policy set in (H-)SMF/PCF may allow the IMS service to be always allowed when the UE's 3GPP Data Off status is set to "activated".

According to the disclosure of the present specification, by applying PS Data Off only to 3GPP access, even if the terminal activates PS Data Off, data transmission is performed through non-3GPP access, so that service continuity can be guaranteed.

As described in the first example of the disclosure of the present specification, the UE may transmit a PS Data Off status report even for a non-3GPP access PDU Session. For example, the UE may perform a PS Data Off status report even for a non-3GPP access PDU Session. When the UE reports the PS Data Off status report as activated, by considering the access type of the PDU Session, the SMF and/or PCF applies the PS Data Off policy only when the access type is 3GPP access, and the SMF and/or PCF may provide a service regardless of the PS Data Off status report, when the access type is non-3GPP access, the SMF and/or PCF.

As described in the second example of the disclosure of the present specification, the terminal may transmit a PS Data Off status report while performing a Service Request. For example, when the terminal receives a Paging or NAS Notification related to non-3GPP access, the terminal may transmit the service request message by including the PS Data status report in the Service Request message. When the terminal receives a Paging or NAS Notification related to non-3GPP access, the terminal may transmit the Service Request message including the SM Container in the Service Request message. Here, the SM container may include a PDU Session Modification Request message for each non-3GPP access PDU Session, and the PDU session modification request message may include a PCO (including PS Data Off status report). When SMF and/or PCF receives "access type can be changed" from AMF and receives PS Data Off status report, when PS Data Off is activated, SMF and/or PCF may transmit downlink data to the terminal only when downlink data is 3GPP PS Data Off Exempt Service.

As described in the third example of the disclosure of the present specification, the UE may transmit the List Of Allowed PDU Session while considering the PS Data Off status. For example, when the terminal receives a Paging or NAS Notification related to non-3GPP access, the terminal may transmit a Service Request message including a List Of Allowed PDU Session in consideration of the PS Data Off status. For example, when PS Data Off status is activated, the UE may transmit an empty List Of Allowed PDU Session. The terminal may transmit the PS Data Off status report to the SMF by performing the first example or the second example of the disclosure of the present specification. In this case, when the terminal receives a Paging or NAS Notification related to non-3GPP access, the terminal may transmit a List Of Allowed PDU Session in a Service Request message. In this case, when the PS Data Off status is activated, the UE may transmit the List Of Allowed PDU Session by including only the PDU Sessions using the service belonging to the 3GPP PS Data Off Exempt Service in the List Of Allowed PDU Session.

For reference, the operation of the terminal (eg, UE) described in this specification may be implemented by the apparatus of FIGS. 1 to 3 described above. For example, the terminal (eg, UE) may be the first device 100 or the second device 200 of FIG. 1. For example, an operation of a terminal (eg, UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (eg, UE) described herein by executing instructions/programs stored in one or more memories 104 or 204.

In addition, instructions for performing an operation of a terminal (eg, UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (eg, UE) described in the disclosure of the present specification.

For reference, the operation of a network node (eg, AMF, SMF, UPF, PCF, N3IWF, etc.) or base station (eg, NG-RAN, gNB, gNB (NB-IoT), gNB (NR) eNB, RAN, etc.) described herein may be implemented by the apparatus of FIGS. 1 to 3 to be described below. For example, a network node (eg AMF, SMF, UPF, PCF, N3IWF, etc.) or a base station (eg NG-RAN, gNB, gNB(NB-IoT), gNB(NR) eNB, RAN, etc.) may be the first device 100a of FIG. 1 or the second device 100b of FIG. 1. For example, the operation of a network node (eg, AMF, SMF, UPF, PCF, N3IWF, etc.) or base station (eg, NG-RAN, gNB, gNB (NB-IoT), gNB (NR) eNB, RAN, etc.) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node (eg, AMF, SMF, UPF, PCF, N3IWF, etc.) or a base station (eg, NG-RAN, gNB, gNB (NB-IoT), gNB (NR) eNB, RAN, etc.) described herein, by controlling one or more memories 104 or 204 and one or more transceivers 106 or 206 and executing instructions/programs stored in one or more memories 104 or 204.

In addition, instructions for performing the operation of the network node (eg, AMF, SMF, UPF, PCF, N3IWF, etc.) or base station (eg, NG-RAN, gNB, gNB (NB-IoT), gNB (NR) eNB, RAN, etc.) described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node (eg, AMF, SMF, UPF, PCF, N3IWF, etc.) or a base station (eg, NG-RAN, gNB, gNB (NB-IoT), gNB (NR) eNB, RAN, etc.) are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:
   transmitting a first PDU session establishment request message for establishment of a PDU session associated with non-3rd Generation Partnership Project (3GPP) access or 3GPP access,
   wherein the first PDU session establishment request message includes first report information related to 3GPP Packet Switch (PS) Data Off status of a User Equipment (UE),
   wherein the first report information is included in the first PDU session establishment request, regardless of whether the PDU session is associated with the 3GPP access or the non-3GPP access,
   wherein the 3GPP PS Data Off status for the first PDU session does not affect data transfer over the non-3GPP access,
   wherein the 3GPP PS Data Off prevents traffic via the 3GPP access except for traffic related to 3GPP PS Data Off Exempt services, when the 3GPP PS Data Off is activated; and
   transmitting a second PDU session establishment request message for handover of the PDU session between the 3GPP access and the non-3GPP access,
   wherein the second PDU session establishment request message is not needed to include a second report information related to the 3GPP PS Data Off status, based on that the 3GPP PS Data Off status of the UE is not changed since a last report information.

2. The method of claim 1,
   wherein the second PDU session establishment request message includes the second report information related to the 3GPP PS Data Off status of the UE, based on that the 3GPP PS Data Off status of the UE is changed from a 3GPP PS Data Off status included in the last report information.

3. The method of claim 1,
   wherein the second PDU session establishment request message does not include the second report information related to the 3GPP PS Data Off status of the UE, based on that the 3GPP PS Data Off status of the UE is not changed since a last report information.

4. The method of claim 1, further comprising:
   determining whether to include the second report information related to 3GPP PS Data Off status of the UE in the second PDU session establishment request message, based on the 3GPP PS Data Off status of the UE and the 3GPP PS Data Off status included in last report information.

5. The method of claim 1,
   wherein the last report information is the first report information, when the report information related to the 3GPP PS Data Off status of the UE is not transmitted after the first report information is transmitted,
   wherein the last report information is the last transmitted report information among one or more of report information, when one or more of report information related to the 3GPP PS Data Off status of the UE are transmitted after the first report information is transmitted.

6. The method of claim 1,
   although the first report information includes information indicating that the 3GPP PS Data Off status of the UE is activated, when the PDU session is associated with the non-3GPP access, the 3GPP PS Data Off does not affect the PDU session.

7. The method of claim 1,
   wherein the first report information is included in the Protocol Configuration Option (PCO) of the first PDU session establishment request message.

8. The method of claim 1,
   wherein the first PDU session establishment request message includes is transmitted with request type information configured as "initial request".

9. The method of claim 1,
   wherein the second PDU session establishment request message is transmitted with request type information configured as "Existing PDU session".

10. A method comprising:
    receiving a first PDU session establishment request message for establishment of a PDU session associated with non-3rd Generation Partnership Project (3GPP) access or 3GPP access from a User Equipment (UE),
    wherein the first PDU session establishment request message includes first report information related to 3GPP Packet Switch (PS) Data Off status of the UE,
    wherein the first report information is included in the first PDU session establishment request, regardless of whether the PDU session is associated with the 3GPP access or the non-3GPP access,
    wherein the 3GPP PS Data Off status for the first PDU session does not affect data transfer over the non-3GPP access, and
    wherein the 3GPP PS Data Off prevents traffic via the 3GPP access except for traffic related to 3GPP PS Data Off Exempt services, when the 3GPP PS Data Off is activated; and
    receiving a second PDU session establishment request message for handover of the PDU session between the 3GPP access and the non-3GPP access from the UE,
    wherein the second PDU session establishment request message is not needed to include a second report information related to the 3GPP PS Data Off status, based on that the 3GPP PS Data Off status of the UE is not changed since a last report information.

11. The method of claim 10,
    wherein the last report information is the first report information, when report information related to the 3GPP PS Data Off status of the UE is not transmitted from the UE after the first report information is transmitted, wherein the last report information is the last transmitted report information among one or more of report information, when one or more of report information related to the 3GPP PS Data Off status of the UE are transmitted from the UE after the first report information is transmitted.

12. A User Equipment (UE) comprising:

at least one processor; and at least one memory for storing instructions and operably electrically connectable with the at least one processor;

wherein the operations performed based on execution of the instructions by the at least one processor include:

transmitting a first PDU session establishment request message for establishment of a PDU session associated with non-3rd Generation Partnership Project (3GPP) access or 3GPP access, wherein the first PDU session establishment request message includes first report information related to 3GPP PS Data Off status of the UE, wherein the first report information is included in the first PDU session establishment request, regardless of whether the PDU session is associated with the 3GPP access or the non-3GPP access, wherein the 3GPP PS Data Off status for the first PDU session does not affect data transfer over the non-3GPP access, and wherein the 3GPP PS Data Off prevents traffic via the 3GPP access except for traffic related to 3GPP PS Data Off Exempt services, when the 3GPP PS Data Off is activated; and transmitting a second PDU session establishment request message for handover of the PDU session between the 3GPP access and the non-3GPP access, wherein the second PDU session establishment request message is not needed to include a second report information related to the 3GPP PS Data Off status, based on that the 3GPP PS Data Off status of the UE is not changed since a last report information.

13. The UE of claim 12, wherein the UE is an autonomous driving device communicating with at least one of a mobile terminal, a network and an autonomous vehicle other than the UE.

* * * * *